(12) United States Patent
Frank et al.

(10) Patent No.: US 9,086,884 B1
(45) Date of Patent: *Jul. 21, 2015

(54) UTILIZING ANALYSIS OF CONTENT TO REDUCE POWER CONSUMPTION OF A SENSOR THAT MEASURES AFFECTIVE RESPONSE TO THE CONTENT

(71) Applicants: Ari M Frank, Haifa (IL); Gil Thieberger, Kiryat Tivon (IL)

(72) Inventors: Ari M Frank, Haifa (IL); Gil Thieberger, Kiryat Tivon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,911

(22) Filed: Apr. 29, 2015

Related U.S. Application Data

(63) Continuation of application No. 14/516,833, filed on Oct. 17, 2014, which is a continuation of application No. 14/227,020, filed on Mar. 27, 2014, now Pat. No. 8,898,344, which is a continuation of application No. 14/052,758, filed on Oct. 13, 2013.

(60) Provisional application No. 61/713,557, filed on Oct. 14, 2012, provisional application No. 61/713,558, filed on Oct. 14, 2012, provisional application No. 61/713,559, filed on Oct. 14, 2012, provisional application No. 61/713,560, filed on Oct. 14, 2012, provisional application No. 61/713,561, filed on Oct. 14, 2012, provisional application No. 61/713,563, filed on Oct. 14, 2012.

(51) Int. Cl.

| G06F 15/177 | (2006.01) |
|---|---|
| G06F 1/32 | (2006.01) |
| G06F 1/28 | (2006.01) |
| G06N 5/04 | (2006.01) |

(52) U.S. Cl.
CPC ............... *G06F 1/3296* (2013.01); *G06F 1/28* (2013.01); *G06F 1/3206* (2013.01); *G06N 5/04* (2013.01); *G06F 1/3234* (2013.01); *G06F 2203/011* (2013.01)

(58) Field of Classification Search
CPC ........... G06F 9/46; G06F 1/3296; G06F 1/28; G06N 5/04
See application file for complete search history.

(56) References Cited

U.S. PATENT DOCUMENTS

| 5,350,412 A | 9/1994 | Budgifvars et al. |
|---|---|---|
| 6,377,185 B1 | 4/2002 | Halleck et al. |
| 6,585,521 B1 | 7/2003 | Obrador |
| 6,622,140 B1 | 9/2003 | Kantrowitz |

(Continued)

OTHER PUBLICATIONS

"Multimodal Emotion Recognition in Response to Videos", by Soleymani, M. et al. IEEE Transactions on Affective Computing, vol. 3, No. 2, Apr.-Jun. 2012, pp. 211-223.

*Primary Examiner* — Henry Tsai
*Assistant Examiner* — John Roche

(57) ABSTRACT

Disclosed herein are systems, methods, and computer program products that utilize analysis of content in order to reduce power consumption of a sensor that measures affective response of a user. A content emotional response analyzer receives and analyzes a segment of content, and outputs an indication that is indicative of whether a predefined threshold related to an emotional response to the segment is reached. A controller selects a mode of operation for the sensor based on the indication. The mode of operation is selected from a set comprising first and second modes of operation. The sensor is configured to consume significantly less power while operating at the first mode of operation compared to the power it is configured to consume while operating at the second mode of operation.

20 Claims, 12 Drawing Sheets

(56) References Cited

U.S. PATENT DOCUMENTS

| | | | |
|---|---|---|---|
| 7,284,201 | B2 | 10/2007 | Cohen-solal |
| 7,379,560 | B2 | 5/2008 | Bradski et al. |
| 7,848,729 | B2 | 12/2010 | Lim et al. |
| 7,983,701 | B2 | 7/2011 | Bell et al. |
| 8,037,011 | B2 | 10/2011 | Gadanho et al. |
| 8,308,562 | B2 | 11/2012 | Patton |
| 8,392,735 | B2 | 3/2013 | Mucignat et al. |
| 8,407,055 | B2 | 3/2013 | Asano et al. |
| 8,494,982 | B2 | 7/2013 | Jung et al. |
| 2002/0120925 | A1 | 8/2002 | Logan |
| 2006/0229520 | A1 | 10/2006 | Yamashita et al. |
| 2007/0066916 | A1 | 3/2007 | Lemos |
| 2007/0245375 | A1 | 10/2007 | Tian et al. |
| 2008/0091512 | A1 | 4/2008 | Marci et al. |
| 2008/0169930 | A1 | 7/2008 | Mallinson et al. |
| 2009/0088610 | A1 | 4/2009 | Lee et al. |
| 2009/0117922 | A1 | 5/2009 | Bell et al. |
| 2009/0234718 | A1 | 9/2009 | Green |
| 2010/0250554 | A1 | 9/2010 | Shu |
| 2010/0278318 | A1 | 11/2010 | Flockhart et al. |
| 2011/0009193 | A1 | 1/2011 | Bond et al. |
| 2011/0087483 | A1 | 4/2011 | Hsieh et al. |
| 2012/0010474 | A1 | 1/2012 | Olsen et al. |
| 2012/0034904 | A1 | 2/2012 | Lebeau et al. |
| 2012/0072938 | A1 | 3/2012 | Seong et al. |
| 2012/0203491 | A1 | 8/2012 | Sun et al. |
| 2012/0246261 | A1 | 9/2012 | Roh et al. |
| 2012/0289788 | A1 | 11/2012 | Jain et al. |
| 2013/0044233 | A1 | 2/2013 | Bai |
| 2013/0103212 | A1 | 4/2013 | Andiappan |
| 2013/0124891 | A1 | 5/2013 | Donaldson |
| 2013/0137946 | A1 | 5/2013 | Geske et al. |
| 2013/0143185 | A1 | 6/2013 | Liu et al. |
| 2013/0150117 | A1 | 6/2013 | Rodriguez et al. |

UTILIZING ANALYSIS OF CONTENT TO REDUCE POWER CONSUMPTION OF A SENSOR THAT MEASURES AFFECTIVE RESPONSE TO THE CONTENT

BACKGROUND

The continuous miniaturization of electronics has led to the development of many mobile and ubiquitous computing devices. Not only do people carry with them a wide array of computers, including cell phones and tablets, they also interact with these computers in new ways. Instead of using traditional I/O devices such as keyboards, users can now interact with computers using human-computer interfaces that allow users to express themselves using gestures, voice, and even with their thoughts (via measurement of brainwaves). To enable these new interaction techniques, computer systems need to monitor and measure users, for example, using cameras or physiological sensors. Such measurements not only enable computer systems to receive input and commands from users, but also allows the computer systems to evaluate the users' emotional state. This paves the way to affective computing applications that take into account the user's emotional state, enabling them to be more accurate and prompt with their responses to users' needs.

Through the numerous interactions with computer systems in their day-to-day lives, users are exposed to a wide array of content. Some examples of content users are likely to be exposed to include communications with other users (e.g., video conversations and instant messages), communications with a computer (e.g., interaction with a user's virtual agent), and/or various forms of digital media (e.g., internet sites, television shows, movies, and/or interactive computer games). Throughout these many interactions, it may be useful for computer systems to measure the user's affective response to the content in order to gain insight about how the user feels towards the content.

The advances in human-computer interaction provide multiple devices that may be utilized to measure a person's affective response. For example, systems like Microsoft Kinect™ that involve inexpensive cameras and advanced analysis methods are able to track a user's movement, allowing the user to interact with computers using gestures. Similarly, eye tracking is another technology that is finding its way into more and more computing. Tracking a user's gaze with one or more cameras enables computer systems to detect what content or objects the user is paying attention to. Other technologies that are found in an increasing number of consumer applications include various sensors that can measure physiological signals such as heart rate, blood-volume pulse, galvanic skin response (GSR), skin temperature, respiration, or brainwave activity such as electroencephalography (EEG). These sensors come in many forms, and can be attached to, or embedded in, devices, clothing, and even implanted in the human body.

Analyzing the signals measured by such sensors can enable a computerized system to accurately gauge a user's affective response, and from that, deduce the user's emotional response and feelings (e.g., excitement, boredom, anger, happiness, anxiety, etc.) With this additional understanding of how a user feels, the computerized system can improve the user experience, and customize services for the user; e.g., choose content the user is expected to like. As the use of mobile and ubiquitous computing grows and involves more facets of daily life, there will be a growing need to measure users' physiological signals and communicate this information to affective computing applications.

Since the sensors used to measure users are typically mobile and/or wireless (e.g., bracelets with GSR sensors, cameras, headsets with EEG sensors, or implants), they often rely on batteries for power. However, continuous measurements of a user can consume a lot of power, which drains the sensors' power source. Thus, enabling computer systems to continually receive user's measurements can be problematic when battery powered sensors are involved.

The need to supply sufficient power for operating the sensors and/or analyzing the data they produce is currently met by unsatisfactory means. For example, the size of the battery powering a sensor may be increased, but this is undesirable since it makes the mobile devices more cumbersome and less comfortable for the user. Another inconvenient possibility is to recharge power sources more often to meet the power demands. Yet another possibility is to measure users less or decrease the quality of the measurements, thus reducing the sensors' power demands. But this is also problematic, since it means that the computer systems may reduce the quality of service provided to the users.

Thus, there is a need to reduce the power consumption of sensors used to measure affective response, and to do so in a way that does not severely inconvenience the users or dramatically reduces the quality of data provided by the sensors.

BRIEF SUMMARY

Some aspects of this disclosure involve systems and/or methods that enable a sensor, used to measure affective response, to operate effectively with reduced power consumption. The reduction in power consumption is achieved by automatically determining how to select a mode of operation for the sensor. Additionally, the reduction in power consumption may be achieved without significantly diminishing from the effectiveness of the measurements to the system.

Some embodiments include a content Emotional Response Analyzer (content ERA), which analyzes at least some of the content a user is exposed to in order to evaluate whether it is beneficial to measure the user's affective response to the content. Based on its analysis, the content ERA outputs an indication indicative of whether a certain threshold, related to an emotional response to the analyzed content, is reached. The content ERA may evaluate various aspects of the emotional response to the content. For example, the content ERA may evaluate how much confidence there is in a prediction of the emotional response to the content, how discernible the emotional response is expected to be if measured, whether the emotional response is of a desired type, and/or how beneficial it is to the system to determine the user's emotional response to the content.

Some embodiments include a controller that receives an indication generated by the content ERA after analyzing the content. The controller may utilize the indication in order to select a mode of operation for a sensor used to measure the user's affective response to the content. The controller may base its selection of the mode of operation on whether the indication indicates that a threshold related to the emotional response to the content was reached or not. In a case in which the indication indicates that the threshold was not reached, the controller may select a first mode of operation in which the sensor consumes significantly less power. In a case in which the indication indicates that the threshold was reached, the controller may select a second mode of operation, in which the sensor consumes significantly more power compared to the consumption when it operates in the first mode of operation.

In one embodiment, a system configured to reduce power consumption of a sensor according to analysis of content, includes a content emotional response analyzer (content ERA) that is configured to: receive a segment of content, analyze the segment, and output an indication that is indicative of whether a predefined threshold related to an emotional response to the segment is reached. The system also includes a controller configured to select a mode of operation for the sensor based on the indication. The sensor is operable to measure affective response of a user, and the mode of operation is selected from a set comprising first and second modes of operation. The sensor is configured to consume significantly less power while operating at the first mode of operation compared to the power it is configured to consume while operating at the second mode of operation.

In one embodiment, a method for reducing power consumption of a sensor that measures affective response to content includes several steps. One step involves receiving first and second indications derived from analysis of first and second segments of content, respectively. The first indication indicates that a prediction of emotional response to the first segment does not reach a predefined threshold related to emotional response; and the second indication indicates that a prediction of emotional response to the second segment does reach the predefined threshold. Another step involves selecting, based on the first indication, a first mode of operation for a sensor to measure affective response to the first segment. Yet another step involves selecting, based on the second indication, a second mode of operation for the sensor to measure affective response to the second segment. And another step involves tuning the power consumption of the sensor according to the selected modes of operation, so that, per unit of measurement time, power consumed for measuring the affective response of a user to the first segment, is significantly lower than power consumed for measuring the affective response of the user to the second segment.

In one embodiment, an apparatus configured to reduce power consumption of a sensor that measures affective response to content includes a receiver configured to receive first and second indications of analysis of first and second segments of content, respectively. The first and second indication are functions of expected emotional responses to the first and second segments, respectively. The apparatus also includes a processor that is configured to select, based on the first and second indications, first and second modes of operation for a sensor for measuring affective responses of a user to the first and second segments, respectively. The apparatus also includes a controller that is configured to manage power consumption of the sensor according to the mode of operation selected by the processor. Consequently, per unit of measurement time, the power consumed by the sensor for measuring the affective response of the user to the first segment is significantly lower than the power consumed by the sensor for measuring the affective response of the user to the second segment.

BRIEF DESCRIPTION OF THE DRAWINGS

The embodiments are herein described, by way of example only, with reference to the accompanying drawings. In the drawings.

DETAILED DESCRIPTION

Figure 1:
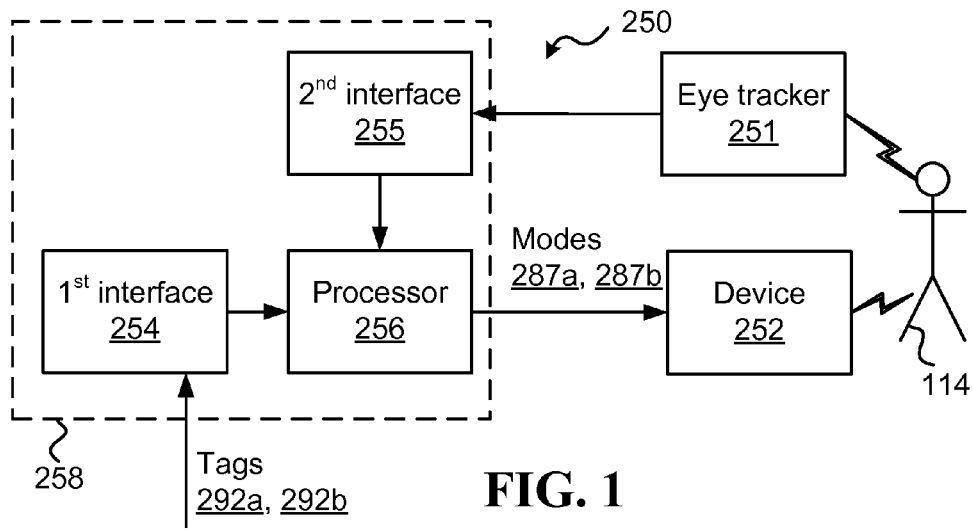
FIG. 1 illustrates a system that includes a controller configured to utilize eye tracking data to reduce power consumption of a device operative to measure affective response.

Affective response measurements of a user refer to measurements of physiological signals of the user and/or behavioral measurements of the user, which may be raw measurement values and/or processed measurement values (e.g., resulting from filtration, calibration, and/or feature extraction). Measuring affective response may be done utilizing various existing, and/or yet to be invented, devices such as sensors, which can be attached to a user's body, clothing (such as gloves, shirts, helmets), implanted in the user's body, and/or be placed remotely from the user's body. Herein, the phrase "measurements of affective response" may be used interchangeably with the phrase "affective response measurements" and has the same meaning as the later phrase.

Herein, "affect" and "affective response" refer to physiological and/or behavioral manifestation of an entity's emotional state. The terms "affective response/state" and "emotional response/state" may be used herein interchangeably. However, affective response typically refers to values obtained from measurements and/or observations of an entity, while emotional responses are typically predicted from models or reported by the entity feeling the emotions. In addition, the terms "state" and "response", when used in phrases such as "emotional state"/"emotional response" and "affective state"/"affective response", may be used herein interchangeably; however, in the way the terms are typically used, the term "state" is used to designate a condition in which a user is in, and the term "response" is used to describe an expression of the user due to the condition the user is in or due to a change in the condition the user is in. For example, according to how terms are typically used in this document, it by be said that a person's emotional state (or emotional response) is predicted based on measurements of the person's affective response.

Phrases like "an affective response of a user to content", or "a user's affective response to content", or "a user's affective response to being exposed to content" refer to the physiological and/or behavioral manifestations of an entity's emotional response to the content due to consuming the content with one or more of the senses (e.g., by seeing it, hearing it, feeling it). Optionally, the affective response of a user to content is due to a change in the emotional state of the user due to the user being exposed to the content.

In some embodiments, content refers to information (e.g., data and/or media) which a user may consume, such as communications (e.g., conversations, messages), video clips, movies, music, augmented reality objects, virtual reality objects, and/or computers games. A segment of content may include one or more portions of content that the user may be exposed to over a period of time, and/or portions of multiple content items.

In some embodiment, content may comprise data representing text. Herein, data representing text may be data that includes text and/or data that may be converted to text. In one example, a video may be considered data representing text, since the video may be converted to a transcript which describes a dialogue in the video and/or events occurring in the video. In another example, a voice conversation may be considered data representing text, since the conversation may be transcribed. In yet another example, a web page may be considered data representing text since text may be extracted from certain portions of the code and/or data objects used to generate the web page (e.g., text may be extracted from XML code or scripts utilized to generate the web page).

FIG. 1 illustrates a controller 258 configured to utilize eye tracking data to reduce power consumption of a device 252 operative to measure affective response. Optionally, the eye tracking data is acquired utilizing an eye tracker 251, and the eye tracking data is data of a user 114. Optionally, the device 252 measures affective response of the user 114. The controller 258 includes at least a first interface 254, a second interface 255, and a processor 256.

In some embodiments, the first interface 254 receives tags corresponding to segments of content to which the user 114 is exposed. Optionally, the first interface 254 is implemented, at least in part, in software. Optionally, the software runs on the processor 256. In one embodiment, the first interface 254 is configured to receive at least a first tag 292a and a second tag 292b. The first tag 292a indicates a first duration during which to measure affective response to a first segment of content by operating the device 252 in a first mode of operation. The second tag 292b indicates a second duration during which to measure affective response to a second segment of content by operating the device 252 in the first mode of operation.

Herein, a first segment of content and a second segment of content are not necessarily segments of the same content item. For example, the segment may be a clip from a first movie, and the segment may be a clip of a second, different, movie. In another example, the first segment may be a portion of a video game play, and the second segment may be from a different type of content, such as a web page. Optionally, the first and second segments may be different segments of the same content item. For example, the first segment and the second segment may correspond to first and second scenes in the same movie.

A tag, such as the tags 292a and/or 292b, may comprise data that may be used to convey information regarding a segment of content. The information can be related to various aspects, such as details about the segment of content and/or information that may be used by system elements in order to perform actions related to the segment of content.

Figure 3:
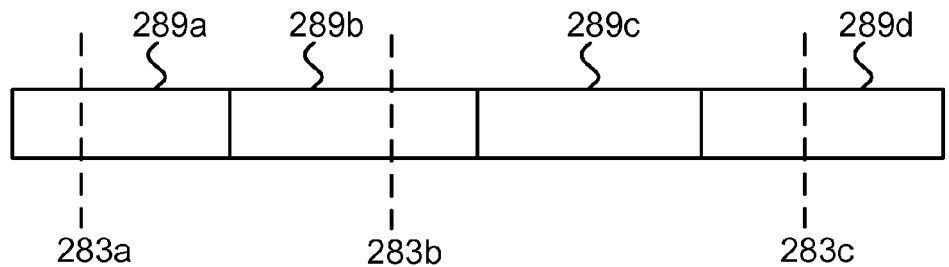
FIG. 3 illustrates media content having four segments and three tags.

FIG. 3 illustrates a media content having four segments (289a, 289b, 289c, 289d), and three tags (283a, 283b, 283c). The tags are indicative of durations in which to measure the affective response of the user to the segments by operating a device, such as the device 252, in a first mode of operation. In some embodiments, some segments may not have a tag associated with them (e.g., segment 289c). Optionally, a segment may have more than one tag associated with it, and/or a tag may be associated with more than one segment.

In one embodiment, a tag, such as the tags 292a and/or 292b, may indicate starting times, ending times, and/or lengths of time for taking measurements of the affective response of the user 114 with a device, such as the device 252. Optionally, a tag may indicate a duration relative to when the tag was and/or to when a segment is expected to be exposed to the user. For example, the fact that the tag is received, indicates to start measuring with the device or to start measuring after a certain predetermined time. In another example, the tag may provide the length of the duration during which the device should measure. Optionally, a tag may define an absolute time and/or duration (e.g., from 9:42:12 until 9:42:56 that same day).

It is noted that phrases like "to indicate something" or "indicative of something" are to be interpreted as directly and/or indirectly signaling the something. For example, a phrase like "the tag indicates a mode of operation", means that the tag directly or indirectly signals the mode of operation.

The second interface 255 receives eye tracking data of the user 114 taken by an eye tracker 251 in temporal vicinity of durations indicated by the tags. Optionally, the second interface 255 is implemented, at least in part, in software. Optionally, the software runs on the processor 256. In one embodiment, the second interface 255 is configured to receive at least first and second eye tracking data of the user 114: The first eye tracking data is acquired in temporal vicinity of the first duration indicated by the first tag 292a. The second eye tracking data is acquired in temporal vicinity of the second duration indicated by the second tag 292b.

Temporal vicinity refers to closeness in time. For example, two events that occur in temporal vicinity, occur at times close to each other. The difference in the time between the occurrences required for the two events to be considered in temporal vicinity depends on the context of the events and/or the duration of the events. In one example, stating that eye tracking data is acquired in temporal vicinity of a duration means that the tracking of the user that produced the eye tracking data occurred essentially during the duration. For example, the time the tracking took place might have been up to two seconds before the start of the duration, during the duration, and/or up to two seconds after the duration. In another example, stating that a measurement of the user is taken in temporal vicinity of an exposure to a segment of content (e.g., a video clip) may mean that the measurement is taken slightly before the clip starts (e.g., less than a minute before) and/or during the presentation of the clip. In some cases, it may mean that the measurement is taken, at least in part, during a period that extends shortly after the exposure to the segment of content (e.g., a few seconds after the clip ends).

In one embodiment, a duration, indicated by a tag is a time period during which a user is to be measured by a device, such as the device 252. Optionally, the duration may overlap with a period of time in which the user 114 is exposed a segment of content corresponding to the tag. Optionally, the duration may span part of the period during which the user is exposed to the segment of content corresponding to the tag. Alternatively or additionally, the duration may span a period that ends, and possibly even starts, after the user 114 is exposed to segment of content corresponding to the tag. In one example, a segment of content may be short (e.g., a couple of seconds long), while the device used to measure the user may be a device with a relatively slow changing signal such as GSR. In this case, the affective response may be reflected in the measurement values of the device substantially after the segment of content was already exposed to the user 114 (e.g., the affective response may be reflected in measurements ten seconds after the exposure).

In one embodiment, the first and second eye tracking data of the user 114 acquired in temporal vicinity of the first and second durations are processed prior to being evaluated by the processor 256. Optionally, the eye tracking data may undergo filtration, normalization, and/or feature extraction. Optionally, processing the first and second eye tracking data may involve analysis of the eye tracking data to determine for different times directions of gaze of the user and/or objects the user was looking at. Optionally, at least some of the processing of the eye tracking data is performed by the processor 256. Alternatively or additionally, at least some of the processing is performed by the second interface 255 and/or the eye tracker 251.

The processor 256 is configured to analyze the first and second eye tracking data, and to select a mode of operation for the device 252 based on the evaluation. The processor 256 may compare the eye tracking data of the user 114 and/or data derived from the eye tracking data to a predetermined threshold in order to determine whether the predetermined threshold is reached. Optionally, given a duration indicated by a tag, the processor 256 may assign an appropriate mode of operation based on whether or not the eye tracking data, which correspond to the duration, reach the predetermined threshold.

In one embodiment, the processor 256 analyzes the first eye tracking data and determines that a gaze-based attention level to the first segment reaches a first predetermined threshold. Optionally, based on the fact that the first predetermined threshold is reached, the processor 256 selects the first mode of operation 287a for operating the device 252, during the first duration indicated in the first tag 292a, to measure affective response of the user 114 to the first segment. Additionally or alternatively, the processor 256 analyzes the second eye tracking data and determines that a gaze-based attention level to the second segment does not reach a second predetermined threshold. Optionally, based on the fact that the second predetermined threshold is not reached, the processor 256 selects a second mode of operation 287b for operating the device 252, during the second duration indicated in the second tag 292b, to measure affective response of the user 114 to the second segment.

In one embodiment, the processor 256 utilizes a value representing a gaze-based attention level from eye tracking data. Optionally, the value is compared to a predetermined threshold in order to determine if the gaze-based attention level reaches the predetermined threshold. Optionally, at least part of the computation involved in computing the value representing the gaze-based attention level is performed by the processor 256. Additionally or alternatively, at least some of the computation involved in determining the value representing the gaze-based attention level is performed by other modules, such as the eye tracker 251 and/or a remote processor (e.g., a cloud-base service). Additional information regarding eye tracking and computing the gaze-based attention level is given below.

Herein, by stating that a value reaches a predetermined threshold, it is meant that the value equals or exceeds the predetermined threshold. In addition, a predetermined threshold to which a value a measurement of affective response is compared, refers to a value of which there is prior knowledge. For example, the threshold value itself is known and/or computed prior to when the comparison is made. Additionally or alternatively, a predetermined threshold may utilize a threshold value that is computed according to logic (such as function) that is known prior to when the comparison is made.

In one embodiment, the first predetermined threshold and the second predetermined threshold may represent different thresholds. For example, reaching the first predetermined threshold is based on achieving different value than is required to pass the second predetermined threshold. Thus, there may be cases in which a certain value may reach the first predetermined threshold, but not reach the second predetermined threshold. Alternatively, in another embodiment, the first predetermined threshold and the second predetermined threshold may represent essentially the same predetermined threshold. Thus, in this embodiment, a value that reaches the first predetermined threshold also reaches the second predetermined. Similarly, in this embodiment, a value that does not reach the first predetermined threshold also does not reach the second predetermined threshold.

In one embodiment, a predetermined threshold, such as the first or second predetermined thresholds, has a fixed value. For example, the predetermined threshold may be 50%, representing that a user's eye tracking data should indicate that the user looked at the content for at least half of the time. In another example, the predetermined threshold may be 7, and represent the fact that a user's gaze-based attention level, as determined by a certain function that computes gazed-based attention level from eye tracking data on a scale of 1 to 10, is 7 or more.

In another embodiment, when a predetermined threshold is computed various factors may be taken into account, such as the length of the duration during which eye tracking data was acquired, the type of content the use was exposed to, and/or characteristics of the user and/or the environment. Thus, based on one or more of these factors, the predetermined threshold may represent lower or higher degrees of required attention in order for the predetermined threshold to be considered reached. In one example, a longer duration in which eye tracking is acquired may lead to a decrease in a predetermined threshold that represents a percentage of time a user looks at the content; it may be difficult in some situations to continually look at content (e.g., when outside in the company of other people), so the threshold can be relaxed in such situations. In another example, the predetermined threshold used with a user that is a child may be lower than that of an adult, since for some children, it is more difficult to stay concentrated for long. In another example, the predetermined threshold used with content that is a commercial may be lower than the predetermined threshold used for content that is a movie or television program, since users tend to pay less attention to commercials (though often measurements in these situations are desired). In still another example, the type of display on which content is consumed may influence the predetermined threshold. For instance, a display that is head-mounted (e.g., an augmented reality display) may have a different, possibly higher, predetermined threshold associated with it, compared to a display on a smartphone, since content on an augmented reality display may be clearer and easy to see if the user desires to look at it.

In some embodiments, a selected mode of operation has preset operation parameters (such as voltage, resolution, sampling rate). Alternatively or additionally, the mode of operation may include certain operation parameters that are computed according to a received tag, measurement values of the device 252, and/or other data that is available at the time of computation. Optionally, selecting a mode of operation may involve computing certain parameters related to the mode of operation. Thus, for example, when the processor 256 selects the first mode 287a or the second mode 287b, this may involve computing certain parameters for the modes of operation (e.g., duration of measurements, voltage of a sensor, and/or a sensor sampling rate).

In some embodiments, power consumption of a device, such as the device 252, while operating in the first mode of operation 287a may be significantly higher than its power consumption while operating in the second mode of operation 287b. Consequently, by selecting for certain durations, the second mode of operation 287b for the device 252 to operate in, instead of the intended first mode of operation 287a, the total amount of energy consumed over time by the device 252 may be reduced. Additionally, the controller 258 may reduce the power consumption of other elements that participate in the processing of the affective response measurements taken by the device 252, such as a processor that processes the data comprising the measurements of the device 252. Optionally, the power consumption of the device 252 while operating at the second mode of operation 287b is essentially zero. For example, by essentially zero it is meant that the power consumption is at most 5% of the power consumption of the device 252 when operating at the first mode of operation 287a.

In one embodiment, two modes of operation may be considered different modes of operation, and be referred to as "a first mode of operation" and "a second mode of operation" in the claims, if the difference between power consumption of a device operating in each of the modes is significant. If the difference in power consumption of the device when operating in the two modes is not significant, then the two modes are not "a first mode of operation" and "a second mode of operation" as used in the claims. In one example, a significant difference refers to a difference of at least 100% in the power consumption, e.g., the power consumption of the device 252 operating in the first mode of operation 287a is at least double the power consumption of the device 252 operating in the second mode of operation 287b. In another example, a significant difference refers to a difference of at least tenfold in the power consumption, e.g., the power consumption of the device 252 operating in the first mode of operation 287a is at least ten times the power consumption of the device 252 operating in the second mode of operation 287b. In yet another example, if when operating in the second mode of operation 287b, power consumption of the device 252 is essentially zero, while power consumption of the device 252 operating in the first mode of operation 287a is not essentially zero, then the difference in power consumption of the two modes of operation is considered significant.

In one embodiment, a mode of operation is selected from a set that includes at least two modes of operation: a first mode of operation that is a standby mode of operation, and a second mode of operation that is a normal mode of operation. In this example, as is the case with many devices, when the device operates in the standby mode, it consumes significantly less power compared to when it operates in the normal mode of operation.

In one embodiment, the mode of operation that is selected may determine parameters for operating, such as a resolution of images captured by a device which is a camera. If the predetermined threshold is reached, a first mode of operation in which the camera captures high-resolution images (e.g., 1920×1080 pixels) may be selected. In this case, using high resolution images may enable better analysis of the user's affective response, since it can enable better detection of gestures and/or facial expressions. However, If the predetermined threshold is not reached (indicating that the user is not paying sufficient attention), the processor may select a second mode of operation in which a camera captures low-resolution images (e.g., 320×240 pixels), which enables only basic image analysis. In some cases, different resolutions lead to different power consumptions for acquiring images. For instance, the lower resolution of the second mode of operation can cause a camera to utilize significantly less CMOS gates, compared to the number of CMOS gates it needs to utilize in the first mode of operation. Thus, in this example, the power consumption of the device operating in the first mode of operation is significantly higher than the power consumption of the device operating in the second mode of operation.

In another example, the device may be a battery operated headset that measures brainwaves with EEG. If the threshold is reached, a first mode of operation in which the user's brainwaves are measured extensively (e.g., by measuring multiple bands of frequencies) may be selected. For example, measuring the user with the EEG may help determine to more precisely how the user felt towards elements in the content. However, if the predetermined threshold is not reached, the EEG measurements are not likely to reflect the user's attitude towards the content, so a second mode of operation may be selected in which the user is not measured at all, or measured rudimentary (e.g., by monitoring less bands of frequencies).

In one embodiment, a mode of operation for a device, such as the modes 287a and/or 287b, may be implicitly or explicitly selected. For example, an implicit selection of the mode of operation may occur if the device 252 does not receive a signal that may indicate and/or influence a mode of operation at which it operates. By contrast, an explicit selection of the mode of operation may involve sending the device 252 information that indicates which mode of operation to operate in and/or parameter values that determine how the device 252 is to operate.

A device, such as the device 252, may operate in different modes of operation, which can dramatically change its power consumption. For example, the controller can cause the device to change from an operable mode to a substantially inoperable mode (or standby mode), which consumes significantly less power, and vice versa. It is to be noted that a term such as "significantly more" or "significantly higher", when referring to power consumption of the device, refers to a difference greater than a factor of two between the lower and higher values of power consumption being compared. To illustrate this point, consider a device capable of operating in two modes of operation: A and B. When it is stated that the device consumes significantly more power while operating in mode of operation A compared to the power it consumes while operating in mode of operation B, it is meant that the energy consumed by the device, per unit of measurement time, while operating in mode of operation A, is at least double the energy consumed by the device, per unit of measurement time, while operating in mode of operation B. Similarly, a phrase like "significantly less", when referring to power consumption of a device, refers to a factor of at least two between the higher and lower values of power consumption.

It is to be noted that the phrase "per unit of measurement time" refers to a period of time in which the device may be operated and used to measure affective response. In this phrase, "measurement time" refers to a slot of time, during which the user may be measured with the device; however, in some cases, the system may elect not to measure the user with the device (e.g., by keeping it off or in standby mode). In one example, a unit of measurement time may be one second or one minute.

The value of power consumption may be computed as the energy consumption per unit of measurement time. The power consumption of a device may be computed by dividing the total energy consumed by the device by the duration of the measurement time (e.g., expressed in seconds). This value serves as a normalized value that enables the comparison of power consumption of different devices, and/or of the same device when utilized to measure affective response for varying durations and/or while operating in different modes of operation.

Therefore, when a device operating in mode of operation A is said to consume significantly more power than when it operates in mode of operation B, it is meant that for equivalent measurement times, the energy consumed by the device when operating in mode of operation A is at least double the energy consumed by the device when operating in mode of operation B.

In one embodiment, a unit of measurement time may refer to a contiguous period of time in which the device may operate. Thus, for example, if in a fixed period of time, such as one second, the device (or a component of the device) may rapidly alternate between being turned on and off, so that half of the time it is on and half of the time it is off, the measurement time of the device is considered to be the full second.

Figure 2:
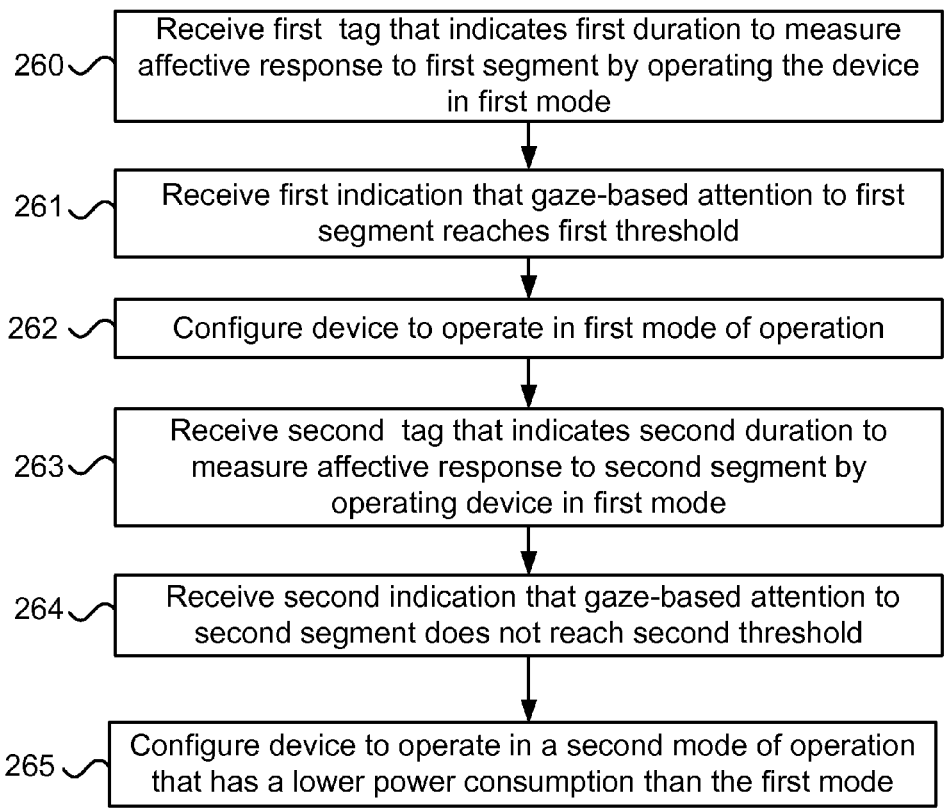
FIG. 2 illustrates one embodiment of a method to utilize eye tracking data to reduce power consumption of a device used to measure affective response.

FIG. 2 illustrates one embodiment of a method for utilizing eye tracking data to reduce power consumption of a device used to measure affective response. The method includes the following steps:

In step 260, receiving a first tag that indicates a first duration during which to measure affective response to a first segment of content by operating the device in a first mode of operation.

In step 261, receiving a first indication, derived from first eye tracking data of a user acquired in temporal vicinity of the first duration, indicating that a gaze-based attention level to the first segment reaches a first predetermined threshold.

In step 262, configuring the device to operate in the first mode of operation to measure affective response of the user to the first segment.

In step 263, receiving a second tag that indicates a second duration during which to measure affective response to a second segment of content by operating the device in the first mode of operation.

In step 264, receiving a second indication, derived from second eye tracking data of the user acquired in temporal vicinity of the second duration, indicating that a gaze-based attention level to the second segment does not reach a second predetermined threshold.

And in step 265, configuring the device to operate in a second mode of operation to measure affective response of the user to the second segment.

In one embodiment, power consumption of the device when operating in the first mode of operation is significantly higher than the power consumption of the device when operating in the second mode of operation. Thus, operating the device in the second mode of operation, during at least part of the time tags indicated it should be operated in the first mode of operation, may result is reducing the power consumed by the device.

In one embodiment, the first tag includes a representation of an expected emotional response to being exposed to the first segment. Optionally, the method described in FIG. 2 includes an additional step of forwarding, to a module that trains an emotional response model, the first tag and measurements of the affective response of the user to being exposed to the first segment. Optionally, the module that trains an emotional response model generates a training sample form measurements of the affective response of the user to being exposed to the first segment, and corresponding label is generated from the first tag.

In one embodiment, the method described in FIG. 2 includes an additional step of generating the first segment and the first tag by an interactive computer game having an element whose actions in the game are at least partially controlled by the user. Optionally, the first tag corresponds to a certain event occurring in the first segment. For example, the first tag indicates to measure the user while the user is exposed to an exciting action sequence that takes place in the first segment.

Tags that correspond to segments of content, such as the one illustrated in FIG. 3, may have various properties and characteristics.

In one embodiment, a tag, such as the tags 292a and/or 292b, may be indicative of a condition and/or event that should occur in order for measurements of affective response of a user to be taken with a device, such as the device 252. For example, a tag may be indicated that if a user selects a certain option, which leads to the user's exposure to a specific segment of content, the user's affective response should be measured during a specified duration after the start of the presentation.

In one embodiment, tags, such as the tags 292a and/or 292b, are generated substantially independently of behavior of the user 114 when the 114 user is exposed to segments of content corresponding to the tags. For example, the tags may be generated prior to the user's exposure to the segments and provided as meta information corresponding to the segments (e.g., the tags may indicate to which scenes in a movie the user's response should be measures, and they are determined before the movie is played to the user). In another example, a computer game may provide tags for certain portions of the game in which it is anticipated that users are likely to have noticeable affective responses.

In one embodiment, a tag may contain information pertaining to a mode of operation in which a device, such as the device 252, may operate. For example, the tags 292a and/or 292b may identify the first mode of operation 287a and/or a second mode of operation 287b (e.g., by stating that the device should operate at a "normal" mode of operation or and "extensive measurement" mode of operation). In another example, the tags 292a and/or 292b may provide certain parameters pertaining to the first mode of operation 287a (e.g., desired sampling rate, resolution, and/or voltage to operate the device at). Alternatively or additionally, tags may imply what the first mode of operation 287a should be. For example, by not providing instructions and/or detail pertaining to the first mode of operation, it may be implied that the first mode of operation 287a should be a default mode of operation.

In one embodiment, tags may be received and/or sent individually, i.e., they may be sent by a sender and/or received by a recipient one at a time. In one example, the tags 292a and 292b are sent one at a time and/or are received by the first interface 254 one at a time. Additionally, in some embodiments, tags may be received sporadically, without the recipient of the tags having prior knowledge regarding when each tag is to be sent and/or how many tags to expect.

In another embodiment, tags, such as the tags 292a and/or 292b, may be sent and/or received in batches, i.e., more than one tag is sent and/or received at a time (e.g., tags are sent in files or messages that contain multiple tags). For example, the first interface 254 may receive the first and second tags together (e.g., they may be sent in the same file). Optionally, the batches comprising multiple tags may be sent and/or received sporadically. Optionally, a recipient and/or sender of batches of tags may not have prior information of when batches are to be sent and/or received, and/or how many tags and/or batches to expect.

In one embodiment, a tag, such as the tags 292a and/or 292b, may include a representation of an expected emotional response of a user to the segment of content. For example, the tag may describe a segment as likely to excite, frighten, and/or bore a user.

In some embodiments, a device, such as the device 252, is used to measure affective response of the user 114. Optionally, the device includes a sensor and/or is a sensor. Optionally, the sensor may be a physiological sensor (e.g., a sensor that measures heart rate, galvanic skin response, and/or brainwave activity), and/or a sensor that measures the user's behavior (e.g., a camera, and/or a motion detector). Optionally, the device may include additional components to the sensor, such as a memory, a processor, a battery, a transmitter, and/or a receiver. Optionally, the device may be coupled to a user. Herein a phrase like "a device coupled to a user" refers to a device that is attached to the user (e.g., on clothing, a bracelet, headgear), in contact with the user's body (e.g., a sticker on a user's skin), and/or implanted in the user's body (e.g., an implanted heart-rate sensor or implanted EEG electrodes).

In one embodiment, the first and second eye tracking data are acquired utilizing an eye tracker, such as the eye tracker 251, which includes image capturing device. Optionally, the device 252 may be a battery powered sensor that measures a physiological signal and is coupled to the user. Optionally, the first and second eye tracking data are collected substantially independently of whether the user is exposed to segments of content identified by tags, and the device 252 comprises a battery powered sensor that is mainly used to measure affective response of the user while exposed to segments identified by tags.

In one embodiment, the eye tracker 251 operates substantially independently of whether the user 114 is exposed to segments of content identified by tags. Optionally, the device 252 is a battery powered sensor that is mainly used to measure affective response of the user while exposed to segments identified by tags. In one example, by "substantially independently of whether the user is exposed . . . " it is meant that the normal behavior, unless specifically overridden by the user or software, is for the eye tracker 251 to operate without respect to tags. In another example, "substantially independently of whether the user is exposed . . . " it is meant that the eye tracker 251 has a controller that may not necessarily take into consideration instructions or indications that appear in tags.

In some embodiments, a battery refers to an object that can store energy and provide it in the form of electrical energy. In one example, a battery includes one or more electrochemical cells that convert stored chemical energy into electrical energy. In another example, a battery includes a capacitor that can store electrical energy.

Herein, a device is considered to be a battery powered device (also referred to as a "battery operated device"), when a battery is able to supply the device's power consumption while the device operates in a regular mode (i.e., not a sleep mode). Furthermore, the battery needs to be able to meet the device's power demands for at least one second, without the battery or the device receiving power from an external power source at that time (though at other times the device may receive power from an external source). For example, the main battery of a mobile phone or a Bluetooth earpiece is considered a battery for the purpose of the present embodiments, but a current stabilizer or a capacitor, which may be able to operate a circuit for just a tiny fraction of a second, is not considered as a battery.

In one embodiment, a segment of content may include visual content, such as images and/or video. A content delivery module may be used to expose the segments to the user 114. Examples of content delivery modules via which the user may be exposed to visual content include a screen embedded in a mobile device such as a tablet or a smart phone, a non-mobile display such as a wall-mounted television, or a head-mounted display such as virtual reality or augmented reality display glasses.

In one example, a device used to measure the user 114, such as the device 252, includes at least one component that is not shared with the content delivery module. The device in this example may be a bracelet worn by the user 114 which can measure the user's heart rate, while the content delivery module is a screen embedded in the user's phone (which is a different device than the bracelet).

In another example, a device used to measure the user 114, such as the device 252, may include at least one component that is shared with the content delivery module. In this example, a head-mounted device may include both an EEG sensor and a display serving as a content delivery module, which can display augmented-reality, virtual reality, and/or video content, to the user.

In yet another example, a device used to measure the user 114, such as the device 252, may be a battery powered sensor, and the content delivery module and the battery powered sensor are realized in the same device. For example, the user 114 may be wearing a computing device nearby or on his wrist, such as a phone. The wrist-worn computing device in this case may include both a sensor for measuring GSR and a flexible touch screen display that serves as the content delivery module.

In one embodiment, at least one element of the controller 258 is implemented as a dedicated hardware element. For example, the controller 258 may be a component coupled to the eye tracker 251 and/or the device 252. Alternatively or additionally, at least some of the functionality of the controller 258 is implemented in software running on a general purpose processor (for example, the processor 256 may be a general purpose processor). In some cases, the controller 258 may run, at least in part, on a device belonging to the user 114, such as a mobile phone. In some cases, the controller 258 may run, at least in part, on a system remote of the user, such as on a cloud-based server.

In one embodiment, the controller 258 is realized as hardware that is embedded in the housing of the device 252. For example, a controller for a mobile EEG measuring headset may be embedded in the headset itself, and communicate data wirelessly. Additionally, at least some of the functionality of the controller 258 may be realized as software that runs on a processor that belongs to the device 252 and/or the eye tracker 251. In one example, the controller for a device that is a mobile EEG measuring headset may run on a processor that belongs to the headset and may be used to process EEG measurements.

In one embodiment, the system 250 includes a measurement Emotional Response Predictor (measurement ERP) configured to predict the user's emotional response from data comprising measurements of affective response of the user 114 taken with the device 252. Optionally, the measurements of the device 252 are processed prior to being sent to the measurement ERP for prediction. For example, the measurements may undergo filtering and/or feature extraction.

Figure 4:
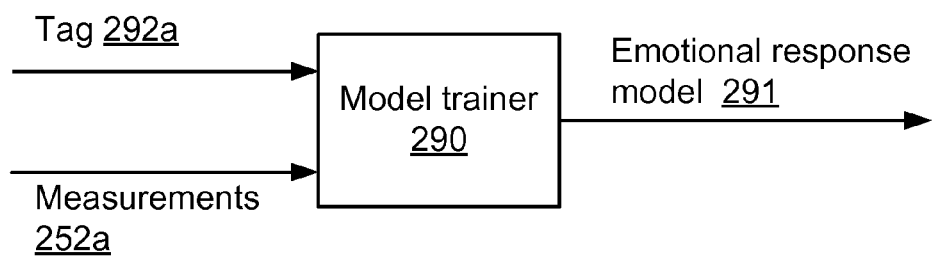
FIG. 4 illustrates one embodiment that includes a module for training a model for a measurement Emotional Response Predictor (measurement ERP)

FIG. 4 illustrates one embodiment that includes a model trainer 290 for training a model for a measurement Emotional Response Predictor (measurement ERP). The model trainer 290 receives as input the measurements taken by a device that measures the user 114, such as the measurements 252a taken by the device 252. The received measurements are taken in temporal vicinity of the first duration indicated by the tag 292a. The measurements include affective response of the user 114 to the first segment of content corresponding to the tag 292a. Optionally, the measurements may be processed prior to being sent to the module to be used for training; for instance, the measurements undergo filtering and/or feature extraction in order to produce feature values that are included in one or more training samples utilized by the module.

In one embodiment, a tag may include a value indicative of an expected emotional response to a segment of content to which the user 114 was exposed essentially during a duration indicated by the tag. Thus, the model trainer 290 may be used to create training samples that include measurement values along with the corresponding emotional response a user is likely to experience. The training samples can then be utilized by a machine learning-based algorithm that trains an emotional response model 291.

In one embodiment, a training sample that includes values derived from measurements of a user, along with the corresponding emotional response, is generated from the tag 292a and measurements received by the model trainer 290 (e.g., the measurements 252a). The training sample is provided to an algorithm that trains the emotional response model 291 that may be used for predicting emotional response from measurements of affective response. For example, algorithm may train a model utilized by a predictor such as a neural network, Naive Bayes classifier, and/or decision trees. Optionally, the trained model is utilized by a measurement ERP to predict emotional response from certain measurements of affective response. Optionally, the certain measurements of affective response utilized by the measurement ERP to make predictions of emotional response are measurements taken by a device that measures the user, such as the device 252.

Figure 5:
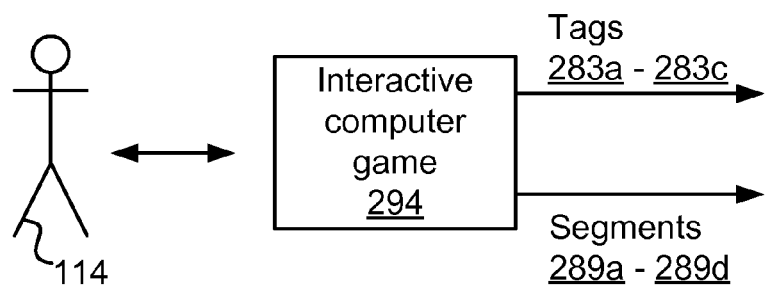
FIG. 5 illustrates an interactive computer game that generates segments and tags.

FIG. 5 illustrates an interactive computer game 294 that generates the segments (289a to 289d) and the tags (283a to 283c). The interactive computer game has an element whose actions in the game are at least partially controlled by the user 114. Being able to measure the affective response of the user 114 to segments of content (289a to 289d) generated by the computer game can be beneficial since it can help guide the system towards alterations that can improve the user's playing experience. For example, if the user's affective response indicates that the user is losing interest and is not excited by playing at a certain level of difficulty, the game can increase the difficulty and add surprising effects and/or plot twists in order to make the game more exciting for the user.

In one embodiment, at least some of the tags 283a to 283c are generated by the interactive computer game 294 are generated in order to gauge affective response of the user 114 to events occurring in a game which the user 114 is playing. The computer game 294 may generate a tag that is indicative of a duration during which a device is to measure affective response of the user, and/or indicate a mode of operation for the device to operate in. For example, tag 283a may indicate that the device 252 is to be operated at a first mode of operation 287a in order to measure the user's affective response to the segment 289a.

In one embodiment, measurements of the user, taken by a device, such as the device 252, during a duration indicated by a tag may be utilized by the interactive computer game in order to determine emotional response of the user 114 (e.g., by providing the measurements to a measurement ERP). The predicted emotional response may be used in order to determine if elements in the game need to be changed in order to improve the user experience. For example, if in an action game, the measurements of the affective response of the user 114 reveal that the user is becoming frustrated, possibly due to not being able to complete a level, the computer game may reduce the difficulty of the level to allow the user to succeed. In another example, the user 114 controls a character in a virtual world that is part of a larger group of other characters that may be controlled by the computer game. In this game, some of the characters may be killed off, e.g., in a fight with monsters in the virtual world. The computer game may generate tags that initiate measuring of the affective response of the user 114 when interacting with different virtual characters in order to determine which characters the user 114 likes. Using this information, the computer game may select specific characters, such as ones the user does not in particularly like, to be characters that fall prey to a rampaging dragon.

In one embodiment, the functionality of the controller 258 is included in the interactive computer game 294. In this embodiment, the computer game sets a mode of operation for the device 252. For example, the controller 258 is implemented, at least in part, as software running on a processor belonging to a game console. In another example, the controller 258 is implemented, at least in part, as software running on a server running a game such as an online multiplayer game.

Figure 6:
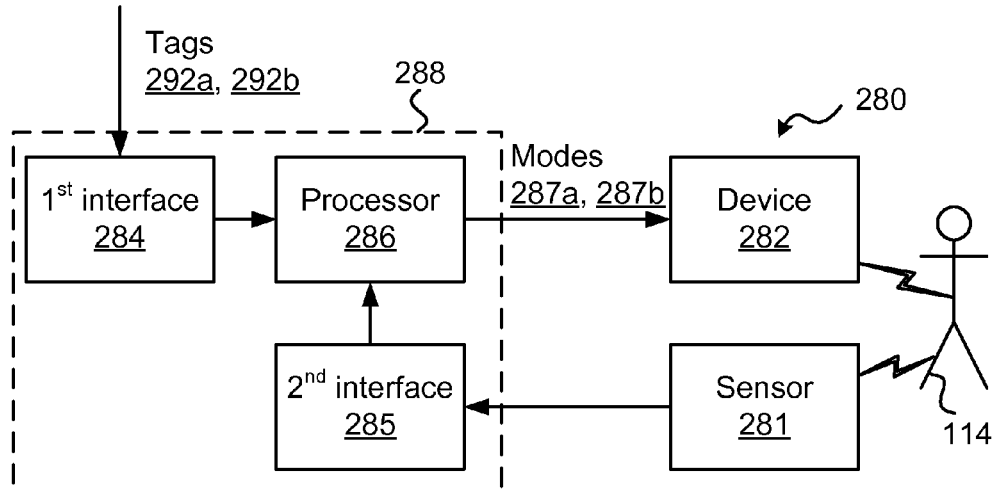
FIG. 6 illustrates a system that includes a controller that utilizes measurements of a sensor to reduce power consumption of a device operative to measure affective response.

FIG. 6 illustrates a controller 288 that utilizes measurements of a sensor 281 to reduce power consumption of a device 282 operative to measure affective response. The controller 288 includes at least a first interface 284, a second interface 285, and a processor 286.

The first interface 284 receives tags, such as the tags illustrated in FIG. 4, which correspond to segments of content to which the user 114 is exposed. Optionally, the first interface 284 is implemented, at least in part, in software. Optionally, the software runs on the processor 286. In one embodiment, the first interface 284 is configured to receive at least a first tag 292a and a second tag 292b: The first tag 292a indicates a first duration during which to measure affective response to a first segment of content by operating the device 282 in a first mode of operation. The second tag 292b indicates a second duration during which to measure affective response to a second segment of content by operating the device 282 in the first mode of operation.

The second interface 285 receives measurements of the user 114 taken by the sensor 281 in temporal vicinity of durations indicated by the tags. Optionally, the second interface 285 is implemented, at least in part, in software. Optionally, the software runs on the processor 286. In one embodiment, the second interface 285 is configured to receive at least first and second measurements: The first measurement is a measurement of the user 114 taken by the sensor 281 in temporal vicinity of the first duration indicated by the first tag 292a. The second measurement is a measurement of the user 114 taken by the sensor 281 in temporal vicinity of the second duration indicated by the second tag 292b.

In one embodiment, measurements of the user 114 taken by the sensor 281 in temporal vicinity of the durations are processed prior to being evaluated by the processor 286. For example, the measurements may undergo filtration, normalization, and/or feature extraction. Optionally, at least some of the processing of the measurements is performed by the processor 286. Alternatively or additionally, at least some of the processing is performed by the interface 285 and/or the sensor 281.

The processor 286 selects a mode of operation for the device 282, based on the evaluation of measurements of the user 114 taken by the sensor 281 in temporal vicinity of durations indicated by tags. The processor 286 may compare the measurements and/or data derived from the measurements to a predetermined threshold in order to determine whether the predetermined threshold is reached. Thus, given a duration indicated by a tag, the processor 286 may assign an appropriate mode of operation based on whether or not the measurements of the sensor 281, which correspond to the duration, reach the predetermined threshold. In one embodiment, the processor 286 is configured to receive first and second measurements taken by the sensor 281. Optionally, the processor 286 may determine that the first measurement reaches a first predetermined threshold, and accordingly selects a first mode of operation 287a for the device 282 to operate in order to measure affective response of the user 114 to the first segment during the first duration. Additionally or alternatively, the processor 286 may determine that the second measurement does not reach a second predetermined threshold, and accordingly selects a second mode of operation 287b for the device 282 to operate in order to measure affective response of the user 114 to the second segment during the second duration.

Herein, by stating that a value reaches a predetermined threshold, it is meant that the value equals or exceeds the predetermined threshold. In addition, a predetermined threshold to which a value a measurement of affective response is compared, refers to a value of which there is prior knowledge. For example, the threshold value itself is known and/or computed prior to when the comparison is made. Additionally or alternatively, a predetermined threshold may utilize a threshold value that is computed according to logic (such as function) that is known prior to when the comparison is made.

In one embodiment, the first predetermined threshold and the second predetermined threshold may represent different thresholds. For example, reaching the first predetermined threshold is based on achieving different value than is required to pass the second predetermined threshold. Thus, there may be cases in which a certain value may reach the first predetermined threshold, but not reach the second predetermined threshold. Alternatively, in another embodiment, the first predetermined threshold and the second predetermined threshold may represent essentially the same predetermined threshold. Thus, in this embodiment, a value that reaches the first predetermined threshold also reaches the second predetermined. Similarly, in this embodiment, a value that does not reach the first predetermined threshold also does not reach the second predetermined threshold.

In one embodiment, a predetermined threshold is a value of a physiological signal. For example, the sensor may measure heart rate, and the predetermined threshold is a value of a specific heart rate. If the sensor measures a heart rate that exceeds the value of the predetermined threshold, the threshold is considered to be reached. In another example, the predetermined threshold is a value representing a specific level of electrical conductance of skin, as measured by a GSR sensor (Galvanic Skin Response). In yet another example, the predetermined threshold is a level of movement, and the sensor is an accelerometer.

In another embodiment, a predetermined threshold is a value that is computed in temporal vicinity to when measurements of the user 114 are taken by a sensor. For example, the predetermined threshold may be a heart rate that is a function of a baseline value that is a running average heart rate of the preceding 10 minutes. In this example, the predetermined threshold may me set to represent a significant increase over the baseline; for instance, the predetermined threshold is set to be 115% of the baseline value. In another example, the predetermined threshold may be a level of skin conductivity that is proportional to the maximum value previously detected for the user 114.

In yet another embodiment, a predetermined threshold is derived from a behavioral cue. In one example, the predetermined threshold may represent a minimum duration in which the user does not make substantial movements (which could be detected by sensors such as cameras or EMG). In another example, the predetermined threshold is based on detecting a specific facial expression such as a smile or a cringe (e.g., from being exposed to a frightening scene). In this example, if the required expression is identified, e.g., by analyzing images captured with a camera, the threshold may be considered to be reached.

In still another embodiment, a predetermined threshold includes a value representing an emotional response that can be computed from data comprising measurements of a sensor, such as the sensor 281. Optionally, the emotional response is predicted from measurements of the sensor utilizing a measurement ERP (Emotional Response Predictor). In one example, the predetermined threshold may involve a specific level of arousal, which is computed from measurements of the sensor which in this example may be a GSR sensor. In another example, the predetermined threshold involves a minimal level of interest the user should display in order for the threshold to be reached. In this example, the interest may be predicted from images captured by the sensor (e.g., the sensor may be a camera).

In one embodiment, computing a predetermined threshold is done utilizing additional information to measurements received from a sensor, such as the sensor 281. In one example, the predetermined threshold may be computed using external information that pertains to the context or situation the user is in, e.g., information indicating what activity is the user partaking in and/or what type of media the content is. In another example, a predetermined threshold involving a heart rate may change depending on the level of the user's activity at the time (e.g., walking in the park or sitting on the couch). In yet another example, computing the predetermined threshold may utilize historical information such as medical records, in order to determine the predetermined threshold. For example, predetermined thresholds involving brainwave measurements may consult medical records of a user in order to determine whether the threshold needs to be adjusted according to certain mental conditions or personality traits of the user.

In one embodiment, the processor 286 selects a mode of operation, from two modes of operation: a first mode of operation that is a standby mode of operation, and a second mode of operation that is a normal mode of operation. In this example, as is the case with many devices, when the device 282 operates in the standby mode, it consumes significantly less power compared to when it operates in the normal mode of operation.

In another embodiment, selecting a mode of operation may involve selecting different parameter settings for the operation of a device, such as the device 282.

In one example, a predetermined threshold that is used may indicate whether a user is paying attention or not (e.g., as detected by a sensor that measures the rate of the user's movements while sitting down). The processor 286 may select, according to whether the predetermined threshold was reached, parameters that define the mode of operation, such as a resolution of images captured by the device which may be a camera. If the predetermined threshold is reached, the processor may select a first mode of operation in which the camera captures high-resolution images (e.g., 1920×1080 pixels). In this case, using high resolution images may enable better analysis of the user's affective response, since it can enable better detection of gestures and/or facial expressions. However, If the predetermined threshold is not reached (indicating that the user is not paying sufficient attention), the processor may select a second mode of operation in which a camera captures low-resolution images (e.g., 320×240 pixels), which enables only basic image analysis. In some cases, different resolutions lead to different power consumptions for acquiring images. For instance, the lower resolution of the second mode of operation can cause a camera to utilize significantly less CMOS gates, compared to the number of CMOS gates it needs to utilize in the first mode of operation. Thus, in this example, the power consumption of the device operating in the first mode of operation is significantly higher than the power consumption of the device operating in the second mode of operation.

In another example, the predetermined threshold may involve reaching a certain level of excitement, for example, as determined by an arousal level measured by a GSR sensor. In this example, the user 114 is presented with content that can frighten and/or excite the user. The device 282 may be a battery operated headset that measures brainwaves with EEG. If the threshold is reached, it means that the content being viewed by the user 114 at the time causes the user to be excited; thus, the processor 286 may select a first mode of operation in which the user's brainwaves are measured extensively (e.g., by measuring multiple bands of frequencies). Measuring the user with the EEG may help determine to what extent the user was really frightened while watching the content, and maybe better characterize the emotions the user felt. However, if the threshold is not reached, it is not likely that the user 114 is frightened or excited by the content, and thus the processor may choose a second mode of operation in which the user is not measured at all, or measured rudimentary (e.g., by monitoring less bands of frequencies).

In one embodiment, the sensor 281 comprises an image capturing device and the device 282 is a battery powered sensor that measures a physiological signal and is coupled to the user (e.g., GSR or EEG). Optionally, the measurements of the camera are utilized in order to determine whether the user is paying attention to content, and the mode of operation for the device 282 is selected accordingly.

In another embodiment, the sensor 281 is coupled to the user 114 and measures a physiological signal.

In yet another, the device 282 may be a battery powered sensor that is coupled to the user, and measures a physiological signal. For example, the device 282 may be a GSR sensor embedded in a bracelet or an EEG sensor implanted in the scalp or embedded in headgear.

In one embodiment, the sensor 281 operates substantially independently of whether the user 114 is exposed to segments of content identified by tags; and the device 282 is a battery powered sensor that is mainly used to measure affective response of the user while exposed to segments identified by tags. In one example, the sensor 281 may be a movement sensor (e.g., an accelerometer in a mobile phone that works substantially all the time), and the device 282 may be a battery operated EEG sensor embedded in headgear. In another example, the sensor 281 may be a camera embedded in a television, such as a camera that enables gesture control of the television and thus operates substantially whenever the television is on; the device 282 in this example may be bracelet with embedded sensors that monitor heart rate and/or GSR. In one example, by "substantially independently of whether the user is exposed . . . " it is meant that the normal behavior, unless specifically overridden by the user or software, is for the sensor 281 to operate without respect to tags. In another example, "substantially independently of whether the user is exposed . . . " it is meant that the sensor 281 has a controller that may not necessarily take into consideration instructions or indications that appear in tags.

In one embodiment, a segment of content may include visual content, such as images and/or video. A content delivery module may be used to expose the segments to the user 114. Optionally, the device 282 has at least one component that is not shared with the content delivery module. Additionally or alternatively, the device 282 may include at least one component that is shared with the content delivery module. Additionally or alternatively, the device 282 may be a battery powered sensor, and the content delivery module and the battery powered sensor are realized in the same device.

In one embodiment, at least one element of the controller 288 is implemented as a dedicated hardware element. For example, the controller 288 may be a component coupled to the sensor 281 and/or the device 282. Alternatively or additionally, at least some of the functionality of the controller 288 is implemented in software running on a general purpose processor (for example, the processor 286 may be a general purpose processor). In some cases, the controller 288 may run, at least in part, on a device belonging to the user 114, such as a mobile phone. In some cases, the controller 288 may run, at least in part, on a system remote of the user, such as on a cloud-based server.

In one embodiment, the controller 288 is realized as hardware that is embedded in the housing of the sensor 281 and/or is part of the device 282. For example, the controller for a mobile EEG measuring headset may be embedded in the headset itself, and communicate data wirelessly. Additionally, at least some of the functionality of the controller 288 may be realized as software that runs on a processor that belongs to the sensor 281 and/or the device 282. For example, the controller for a mobile EEG measuring headset may run on a processor that belongs to the headset and is used to process EEG measurements.

In one embodiment, the system 280 includes a measurement Emotional Response Predictor (measurement ERP) configured to predict the user's emotional response from data comprising measurements of affective response of the user 114 taken with the device 282. Optionally, the measurements taken by the device are processed prior to being sent to the measurement ERP for prediction. For example, the measurements may undergo filtering and/or feature extraction. Additionally, the measurement ERP may receive and utilize measurements of affective response of the user 114 taken with the sensor 281 during at least some of the durations in which the measurements of the user 114 were taken with the device 282.

In one embodiment, the system 280 includes a model trainer 290, as illustrated in FIG. Optionally, the model trainer 290 may receive as input measurements taken by the device 282, in temporal vicinity of the first duration indicated by the tag 292a. The measurements may include affective response of the user 114 to the first segment of content corresponding to the tag 292a.

In one embodiment, the computer game 294, which is illustrated in FIG. 5, generates the tags 292a and 292b received by the first interface 284. Measurements taken with the device 282 during the first duration, indicated by the tag 292a, may then be utilized by the interactive computer game in order to determine emotional response of the user 114 (e.g., by providing the measurements to a measurement ERP). The predicted emotional response may be used in order to determine if elements in the game need to be changed in order to improve the user experience.

In one embodiment, the functionality of the controller 288 is included in the interactive computer game 294. In this embodiment, the computer game sets a mode of operation for the device 282. For example, the controller 288 is implemented, at least in part, as software running on a processor belonging to a game console. In another example, the controller 288 is implemented, at least in part, as software running on a server running a game such as an online multiplayer game.

Figure 7:
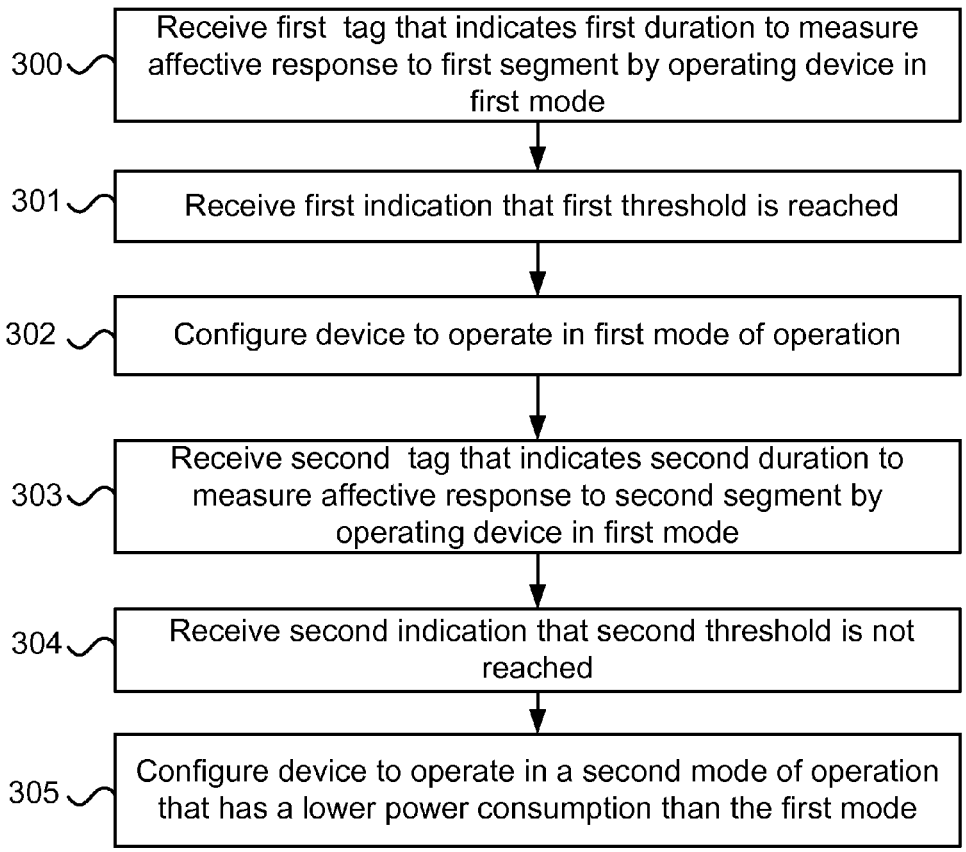
FIG. 7 illustrates one embodiment of a method for utilizing a sensor to reduce power consumption of a device used to measure affective response.

FIG. 7 illustrates one embodiment of a method for utilizing a sensor to reduce power consumption of a device used to measure affective response. The method includes the following steps:

In step 300, receiving a first tag that indicates a first duration during which to measure affective response to a first segment of content by operating the device in a first mode of operation.

In step 301, receiving a first indication that a first measurement of the user, taken by the sensor in temporal vicinity of the first duration, reaches a first predetermined threshold. Optionally, the first measurement is taken during a period that ends after the end of the exposure of the user to the first segment. Alternatively or additionally, the first measurement may be taken during a period that starts before the start of the exposure of the user to the first segment.

In step 302, configuring the device to operate in the first mode of operation while measuring affective response of the user to the first segment. In step 303, receiving a second tag that indicates a second duration during which to measure affective response to a second segment of content by operating the device in the first mode of operation.

In step 304, receiving a second indication that a second measurement of the user, taken by the sensor in temporal vicinity of the second duration, does not reach a second predetermined threshold. Optionally, the second measurement is taken during a period that ends after the end of the exposure of the user to the second segment. Alternatively or additionally, the second measurement may be taken during a period that starts before the start of the exposure of the user to the second segment.

An in step 305, configuring the device to operate in a second mode of operation while measuring affective response of the user to the second segment.

In one embodiment, power consumption of the device when operating in the first mode of operation is significantly higher than the power consumption of the device when operating in the second mode of operation. Thus, operating the device in the second mode of operation, during at least part of the time tags indicated it should be operated in the first mode of operation, may result is reducing power consumed by the device.

In one example, the first predetermined threshold may involve a specific measurement value such as a heart rate. In this example, the first indication indicates that the heart rate of the user 114 measured by the sensor in temporal vicinity of the first duration, reaches the predetermined threshold's value. Additionally, the second predetermined threshold may also involve a specific measurement value such as a heart rate (this value may optionally be different than the value involved in the first predetermined threshold). In this example, the second indication may indicate that the heart rate of the user 114 measured by the sensor in temporal vicinity of the second duration, does not reach the second predetermined threshold's value.

In another example, the first and second predetermined thresholds may involve, possible different, emotional responses a user should feel. Optionally, the prediction of emotional response is performed by the processor utilizing a measurement ERP (Emotional Response Predictor). In this example, measurement of the affective response of the user taken with the sensor is provided to the processor in order to predict the user's likely emotional response, and generate indications accordingly. Optionally, the indications are used internally by the processor, for instance, by passing values and/or messages between different procedures and/or regions in memory that are involved in running the controller. In this example, the first indication indicates that the user likely feels the required emotional response according to the first predetermined threshold, so the first measurement taken in temporal vicinity of the first duration reaches the first predetermined threshold. In contrast, the second indication indicates that the user does not likely feel the required emotional response according to the second predetermined threshold, so the second measurement taken in temporal vicinity of the second duration does not reach the second predetermined threshold.

In one embodiment, the first tag includes a representation of an expected emotional response to being exposed to the first segment. Optionally, the method described in FIG. 7 includes an additional step of forwarding, to a module that trains an emotional response model, the first tag and measurements of the affective response of the user to being exposed to the first segment. Optionally, the module that trains an emotional response model generates a training sample form measurements of the affective response of the user to being exposed to the first segment and corresponding label is generated from the first tag.

In one embodiment, the method described in FIG. 7 includes an additional step of generating the first segment and the first tag by an interactive computer game having an element whose actions in the game are at least partially controlled by the user. Optionally, the first tag corresponds to a certain event occurring in the first segment. For example, the first tag indicates to measure the user while the user is exposed to an exciting action sequence that takes place in the first segment.

In one embodiment, a controller configured to utilize measurements of a sensor to reduce power consumption of a device operative to measure affective response, comprising: a first interface configured to receive a first tag that indicates a first duration during which to measure affective response to a first segment of content by operating the device in a first mode of operation; a second interface configured to receive a first measurement of a user, taken by the sensor in temporal vicinity of the first duration; and a processor configured to: determine that the first measurement reaches a first predetermined threshold, and to select the first mode of operation for operating the device, during the first duration, to measure affective response of the user to the first segment; the first interface is further configured to receive a second tag that indicates a second duration during which to measure affective response to a second segment of content by operating the device in the first mode of operation; the second interface is further configured to receive a second measurement of the user taken by the sensor in temporal vicinity of the second duration; the processor is further configured to determine that the second measurement does not reach a second predetermined threshold, and to select a second mode of operation for operating the device during the second duration while measuring affective response of the user to the second segment; wherein power consumption of the device when operating in the first mode of operation is significantly higher than power consumption of the device when operating in the second mode of operation. Optionally, the first tag further comprises a representation of expected emotional response to the first segment. Optionally, the controller further comprises a training module configured to receive the first tag and measurements taken by the device during the first duration, and to train an emotional response model utilizing the first tag and the measurements. Optionally, the first tag depends on information conveyed by the first segment, and does not depend mainly on behavior of the user while being exposed to the first segment. Optionally, the sensor comprises an image capturing device and the device is a battery powered sensor that measures a physiological signal and is coupled to the user. Optionally, the device is a battery powered sensor that is coupled to the user and measures a physiological signal. Optionally, the sensor is coupled to the user and measures a physiological signal of the user. Optionally, the sensor operates substantially independently of whether the user is exposed to segments of content identified by tags; and the device is a battery powered sensor that is mainly used to measure affective response of the user while the user is exposed to segments identified by tags. Optionally, the first and second segments and the first and second tags are generated by an interactive computer game having an element whose actions in the game are at least partially controlled by the user. Optionally, the power consumption of the device when operating in the second mode of operation is essentially zero.

In one embodiment, a method for utilizing a sensor to reduce power consumption of a device used to measure affective response, comprising: receiving a first tag that indicates a first duration during which to measure affective response to a first segment of content by operating the device in a first mode of operation; receiving a first indication that a first measurement of a user, taken by the sensor in temporal vicinity of the first duration, reaches a first predetermined threshold; configuring the device to operate in the first mode of operation to measure affective response of the user to the first segment; receiving a second tag that indicates a second duration during which to measure affective response to a second segment of content by operating the device in the first mode of operation; receiving a second indication that a second measurement of the user, taken by the sensor in temporal vicinity of the second duration, does not reach a second predetermined threshold; and configuring the device to operate in a second mode of operation to measure affective response of the user to the second segment; wherein power consumption of the device when operating in the first mode of operation is significantly higher than the power consumption of the device when operating in the second mode of operation. Optionally, the first tag further comprises a representation of an expected emotional response to being exposed to the first segment. Optionally, the method further comprises forwarding, to a module that trains an emotional response model, the first tag and measurements of the affective response of the user to being exposed to the first segment. Optionally, the first tag depends on information conveyed by the first segment, and does not depend mainly on behavior of the user while being exposed to the first segment. Optionally, the sensor comprises an image capturing device and the device is a battery powered sensor that measures a physiological signal and coupled to the user. Optionally, the device is a battery powered sensor that is coupled to the user and measures a physiological signal. Optionally, the sensor is coupled to the user and measures a physiological signal of the user. Optionally, the sensor operates substantially independently of whether the user is exposed to segments of content identified by tags; and the device is a battery powered sensor that is mainly used to measure affective response of the user while exposed to segments identified by tags. Optionally, the method further comprises generating the first segment and the first tag by an interactive computer game having an element whose actions in the game are at least partially controlled by the user; wherein the first tag corresponds to a certain event occurring in the first segment.

In one embodiment, a controller configured to utilize a sensor to reduce power consumption of a device operative to measure affective response, comprising: a first interface configured to receive a first tag that indicates a first duration during which to measure affective response to a first segment of content by operating the device in a first mode of operation; wherein the device is battery powered and measures a physiological signal; a second interface configured to receive a first measurement of a user taken by the sensor in temporal vicinity of the first duration; and a processor configured to: determine that the first measurement reaches a first predetermined threshold, and to select the first mode of operation for operating the device during the first duration while measuring affective response of the user to the first segment; the first interface is further configured to receive a second tag that indicates a second duration during which to measure affective response to a second segment of content by operating the device in the first mode of operation; the second interface is further configured to receive a second measurement of the user taken by the sensor in temporal vicinity of the second duration; the processor is further configured to determine that the second measurement does not reach a second predetermined threshold, and to select a second mode of operation for operating the device during the second duration while measuring affective response of the user to the second segment; wherein power consumption of the device when operating in the first mode of operation is significantly higher than power consumption of the device when operating in the second mode of operation.

Figure 8:
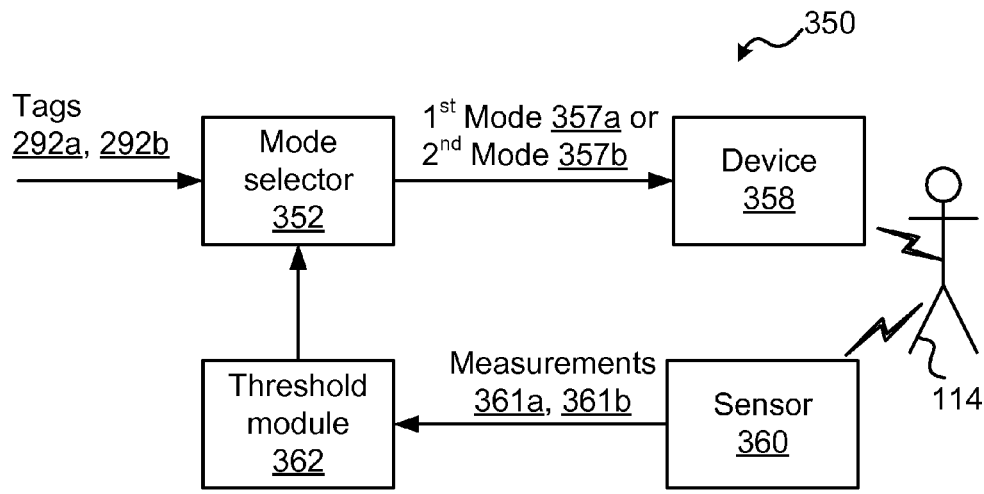
FIG. 8 illustrates one embodiment of a system configured to reduce power consumption by overriding an instruction to measure conveyed by a tag.

FIG. 8 illustrates one embodiment of a system 350 that is configured to reduce power consumption of a device 358 by overriding instructions to measure indicated by tags. The system 350 includes at least a mode-selector 352 and a threshold module 362.

The mode-selector 352 is configured to receive tags corresponding to segments of content, such as the tags illustrated in FIG. 3. In one embodiment, the mode-selector 352 is configured to receive the first tag 292a and the second tag 292b corresponding to first and second segments of content, respectively. The first tag 292a indicates to operate the device 358 in a first mode of operation 357a to measure affective response to the first segment. The second tag 292b indicates to operate the device 358 in a first mode of operation 357a to measure affective response to the second segment.

The threshold module 362 is configured to receive, from a sensor 360, measurements of affective response of the user 114, taken in period corresponding to an exposure of the user to segments of content. Optionally, a measurement corresponding to a certain segment of content is taken essentially before the end of exposure of the user to the segment. Thus, the measurement may reflect a condition of the user 114 during the time of exposure to a segment of content, such as a state of affective response of the user. Optionally, the threshold module 362 is also configured to determine whether the measurement reaches a predetermined threshold.

In one embodiment, a measurement taken essentially before end of exposure of the user to a segment of content means that the measurement is taken during a period spanning when the user is exposed to the segment, and possibly before that. For example, the measurement may be taken over a period spanning from 10 seconds before exposure to the segment starts and until half of the segment has been exposed to the user. Optionally, a period in which the measurement is taken may also extend a bit after the end of exposure, for example, a measurement taken 5 seconds after the end of exposure may still be considered as being taken essentially before end of exposure.

In another embodiment, a measurement of a user 114 taken by a sensor, such as the sensor 360, essentially before end of exposure of the user to a segment of content, may be taken during a period that starts, and possibly ends, prior to the beginning of the exposure to the segment. Thus, for example, a measurement taken with the sensor 360 may be indicative of the state and/or expected state of the user 114 during the exposure to the segment of content.

Measurements of the user 114 taken by a sensor, such as the sensor 360, may be processed, in some embodiments, prior to being evaluated by the threshold module 362. For example, the measurements may undergo filtration, normalization, and/or feature extraction. Optionally, at least some of the processing of the measurements is performed by the threshold module 362. Alternatively or additionally, at least some of the processing is performed by the sensor 360.

In one embodiment, the threshold module 362 is configured to receive a first measurement 361a and a second measurement 361b of a user taken by the sensor 360 essentially before end of exposure of the user to the first and second segments, respectively. That is, the first measurement 361a is taken essentially before the end of exposure of the user to the first segment, and the second measurement 361b is taken essentially before the end of exposure of the user to the second segment. Optionally, the threshold module 362 may determine that the first measurement 361a reaches a first predetermined threshold, and may optionally indicate thereof to the mode-selector 352 (i.e., that the first measurement 361a reaches the first predetermined threshold). Optionally, the threshold module 362 may determine that the second measurement 361b does not reach a second predetermined threshold, and may optionally indicate to the mode-selector 352 thereof (i.e., that the second measurement 361b does not reach the second predetermined threshold).

In one example, a predetermined threshold is a value of a physiological signal. In another example, the predetermined threshold is a value that is computed in temporal vicinity to when measurements of the user 114 are taken by a sensor. In yet another example, a predetermined threshold is derived from a behavioral cue. In still another example, a predetermined threshold includes a value representing an emotional response that can be computed from data comprising measurements of a sensor, such as the sensor 360. Optionally, computing a predetermined threshold is done utilizing additional information to the measurements received from a sensor, such as the sensor 360.

The threshold module 362 may indicate to the mode-selector 352 whether a measurement taken by the sensor 360 reaches a predetermined threshold. There may be different ways in which the threshold module 362 may make such indications. In one example, the threshold module 362 signals (e.g., via a message communicated to the mode-selector 352) a value that describes if the measurement reached the threshold, and/or the actual measurement value and/or the difference between the measurement value and the threshold. In another example, the threshold module 362 sends a signal to the mode-selector 352 when the measurement reaches the threshold, and if no signal is sent, the mode-selector 352 operates under the assumption that the measurement did not reach the threshold. Alternatively, the threshold module 362 may send a signal to the mode-selector 352 when the measurement does not reach the threshold, and if no signal is sent, the mode-selector 352 operates under the assumption that the measurement reached the threshold.

The mode-selector 352 is configured to select a mode of operation for the device 358 to operate in when measuring affective response of the user 114. Optionally, the selection of a mode of operation may be done according to an indication in a received tag, such as the tags 292a and/or 292b. Optionally, the mode-selector 352 may make a selection of the mode of operation also according to other information such as an indication from the threshold module 362 regarding whether or not a measurement value of the sensor 360 reaches a predetermined threshold. Optionally, a mode of operation for the device 358 is chosen from a set that includes the first mode of operation 357a and a second mode of operation 357b.

In one embodiment, the mode-selector 352 selects the first mode of operation 357a, as indicated by the first tag 292a, for measuring the affective response of the user to the first segment of content. The mode-selector makes this selection because the threshold module indicates that the measurement 361a reaches a first predetermined threshold. However, the mode-selector 352 overrides the first mode of operation 357a, indicated by the second tag 292b, based on indication of the threshold module 362 that the second measurement 361b does not reach a second predetermined threshold. The power consumption of the device 358 when operating in the second mode of operation 357b is significantly lower than the power consumption of the device 358 when operating in the first mode of operation 357a. Thus, by switching modes of operation of the device 358, the mode-selector 352 is able to help reduce the power consumption of the device 358.

In one example, the mode-selector 352 may override a tentative choice of the first mode of operation 357a (as indicated by a tag), by replacing the selected first mode of operation 357a with the second mode of operation 357b. For instance, this may be done by changing parameters originally set by the mode-selector 352 according to information received from the threshold module 362. In another example, overriding may be achieved by the threshold module 362 running before the mode-selector 352 receives a tag indicating the desired mode of operation. If the threshold module 362 determines that a measurement of the user taken with the sensor 360 does not reach a predetermined threshold, it may prevent the tag from reaching the mode-selector 352, thus casing the mode-selector 352 not to select the first mode of operation 357a for the device 358. In this example, the default behavior of the device 358 may be to operate in the second mode of operation 357b; thus blocking the tag from reaching the mode-selector 352 and/or blocking the mode-selector 352 from acting according to the tag is equivalent to selecting the second mode of operation for the device 358.

In some embodiments, the power consumption of the device 358 while operating in the first mode of operation 357a may be significantly higher than its power consumption while operating in the second mode of operation 357b. Consequently, by selecting for certain durations, the second mode of operation 357b for the device 358 to operate in, instead of the intended first mode of operation 357a, the total amount of energy consumed over time by the device 358 may be reduced. Additionally, the mode-selector 352 may reduce the power consumption of other elements that participate in the processing of the affective response measurements taken by the device 358, such as a processor that processes the data comprising the measurements. Optionally, the power consumption of the device 358 while operating at the second mode of operation 357b is essentially zero. For example, by essentially zero it is meant that the power consumption is at most 5% of the power consumption of the device 358 when operating at the first mode of operation 357a.

In one embodiment, the mode-selector 352 selects a mode of operation, from two modes of operation: a first mode of operation that is a standby mode of operation, and a second mode of operation that is a normal mode of operation. In this example, as is the case with many sensors and/or devices, when the device 358 operates in the standby mode, it consumes significantly less power compared to when it operates in the normal mode of operation.

In another embodiment, selecting a mode of operation, by the mode-selector 352, may involve selecting different parameter settings for the operation of a device, such as setting resolution of images captured by a camera, or brainwave frequencies that are to be monitored using EEG.

In one embodiment, the system 350 includes a measurement Emotional Response Predictor (measurement ERP) configured to predict the user's emotional response from data comprising measurements of affective response of the user 114 taken with the device 358.

In one embodiment, the system 350 includes a module for training a model for a measurement Emotional Response Predictor (measurement ERP), such as the model trainer 290 illustrated in FIG. 4. The module receives as input measurements of affective response of the user 114 to segment of content corresponding to tags, which were taken by the device 358. Optionally, the measurements may be processed prior to being sent to the module to be used for training; for instance, the measurements undergo filtering and/or feature extraction in order to produce feature values that are included in one or more training samples utilized by the module. The module may also receive tags as input. For example, the tag 292a may include values indicative of an expected emotional response to the first segment of content to which the user 114 was exposed while the measurements were taken. Thus, the module can create a training sample that includes measurement values along with the corresponding emotional response a user is likely to experience. The training sample can then be utilized by a machine learning-based algorithm that trains an emotional response model.

In one embodiment, the sensor 360 comprises an image capturing device and the device 358 is a battery powered sensor that measures a physiological signal and is attached to or implanted in the user (e.g., GSR or EEG). Optionally, the image capturing device is directed at a location in which the user is expected to be in order to look at a displayed content. Images captured by the device 358 may be utilized in order to determine whether the user is present and/or paying attention to the content, and the mode of operation for the device 358 is selected accordingly.

In one embodiment, the device 358 is a battery powered sensor that is attached to or implanted in the user, and measures a physiological signal (e.g., a bracelet with an embedded GSR sensor, or headgear with embedded EEG sensors). Additionally, the sensor 360 may be a sensor that is attached to or implanted in the user, and measures a physiological signal (e.g., a bracelet with an embedded GSR sensor, or headgear with embedded EEG sensors).

In one embodiment, the sensor 360 operates substantially independently of whether the user 114 is exposed to segments of content identified by tags. Optionally, the device 358 is a battery powered sensor that is mainly used to measure affective response of the user while exposed to segments identified by tags. For example, the sensor 360 may be a movement sensor (e.g., an accelerometer in a mobile phone that works substantially all the time), and the device 358 may be a battery operated EEG sensor embedded in headgear. In another example, the sensor 360 may be a camera embedded in a television, such as a camera that enables gesture control of the television and thus operates substantially whenever the television is on; the device 358 in this example may be a bracelet with embedded sensors that monitor heart rate and/or GSR. In one example, by "substantially independently of whether the user is exposed . . . " it is meant that the normal behavior, unless specifically overridden by the user or software, is for the sensor 360 to operate without respect to tags. In another example, by "substantially independently of whether the user is exposed . . . " it is meant that the sensor 360 has a controller that does not take into consideration instructions or indications that appear in tags.

In one embodiment, the mode-selector 352 and/or the threshold module 362 are part of a device belonging to the user 114. Optionally, the device is a mobile device, such as a smart phone or tablet computer. Optionally, the mode-selector 352, and/or the threshold module 362, are implemented, at least in part, as software running on a processor of the device.

In another embodiment, the mode-selector 352 and/or the threshold module 362 are implemented, at least in part, via a program that is run on a processor located on a server typically remote of the user, such as a cloud-based server.

In one embodiment, the mode-selector 352 and the threshold module 362 are implemented at least in part with software. Optionally, the mode-selector 352 and the threshold module 362 share at least some of the same software modules. Optionally, the mode-selector 352 and the threshold module 362 both utilize the same processor to run at least some of their software modules. Optionally, the mode-selector 352 and the threshold module 362 are both implemented via the same program.

In one embodiment, the mode-selector 352 is implemented as part of the device 358. In one example, the mode-selector 352 is implemented as a software module associated with the device 358. In another example, the mode-selector 352 is realized via hardware that is embedded in the device 358.

In one embodiment, the threshold module 362 is implemented as part of the sensor 360. In one example, threshold module 362 is implemented as a software module associated with the sensor 360. In another example, the threshold module 362 is realized via hardware that is embedded in the sensor 360.

In one embodiment, a segment of content may include visual content, such as images and/or video. A content delivery module may be used to expose the segments to the user 114. Optionally, the device 358 has at least one component that is not shared with the content delivery module. Additionally or alternatively, the device 358 may include at least one component that is shared with the content delivery module. Additionally or alternatively, the device 358 may be a battery powered sensor, and the content delivery module and the battery powered sensor are realized in the same device.

In one embodiment, the first tag 292a and the second tag 292b are generated by an interactive computer game which, such as the interactive computer game 294 illustrated in FIG. 5. The computer game may generate segments of content to which the user may be exposed. Optionally, tags are generated by the computer game in order to gauge affective response of the user to segments of content generated by the computer game.

Figure 9:
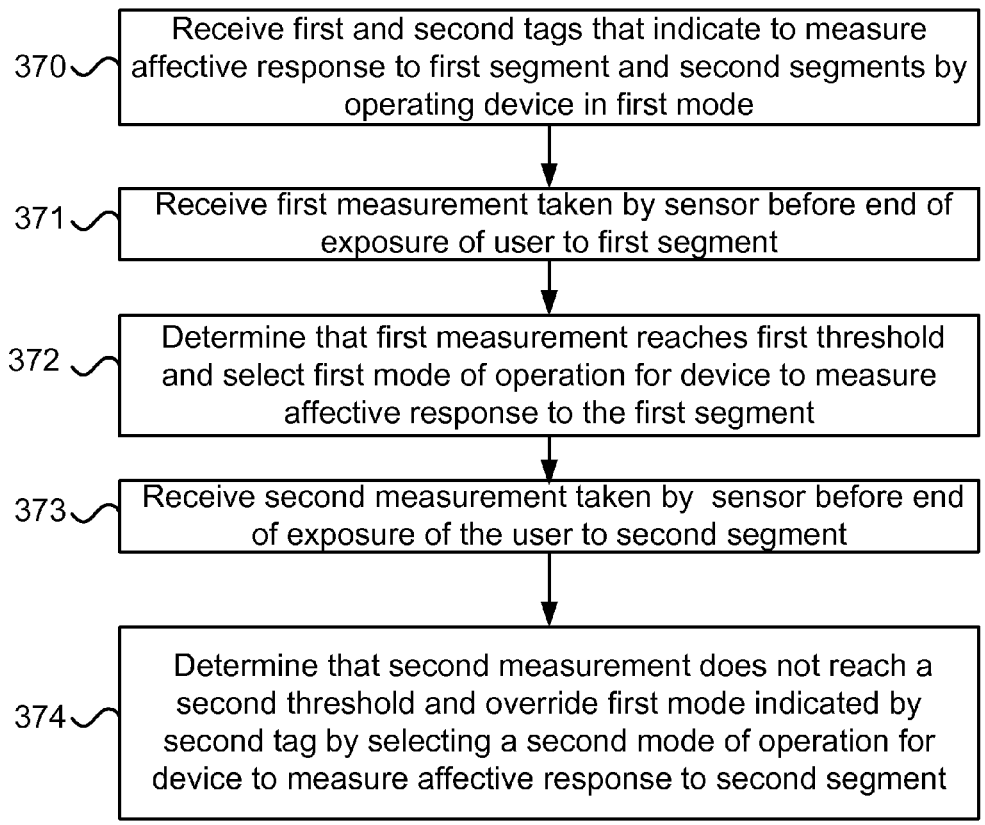
FIG. 9 illustrates one embodiment of a method for reducing power consumption by overriding an instruction to measure conveyed by a tag.

FIG. 9 illustrates one embodiment of a method for reducing power consumption by overriding an instruction to measure. The method includes the following steps:

In step 370, receiving first and second tags corresponding to first and second segments of content, respectively; the first and second tags indicate to operate a device in a first mode of operation to measure affective response to the first and second segments.

In step 371, receiving a first measurement of a user taken by a sensor essentially before end of exposure of the user to the first segment. Alternatively or additionally, the first measurement may be taken during a period that starts before the start of the exposure of the user to the first segment.

In step 372, determining that the first measurement reaches a first predetermined threshold, and selecting the first mode of operation for the device to operate in order to measure affective response of the user to the first segment. Optionally, the device is also configured to operate in the first mode of operation during a duration indicated by the first tag.

In step 373, receiving a second measurement of the user, taken by the sensor essentially before end of exposure of the user to the second segment. Alternatively or additionally, the second measurement may be taken during a period that starts before the start of the exposure of the user to the second segment.

And In step 374, determining that the second measurement does not reach a second predetermined threshold, and overriding first mode of operation indicated by the second tag by selecting a second mode of operation in which to operate the device to measure affective response of the user to the second segment. Optionally, the device is also configured to operate in the second mode of operation during a duration indicated by the second tag.

In one embodiment, power consumption of the device when operating in the second mode of operation is significantly lower than the power consumption of the device when operating in the first mode of operation. Thus, the overriding implemented in step 374 can enable the system to reduce its energy consumption. For example, at certain times, it might not be beneficial for the system to measure the user with the device; for instance, when the user is not paying attention to the content (e.g., not looking at the content), and/or the user is not in a desired state (e.g., a measurement taken by the sensor indicate the user is not in the desired emotional state). During such times, the system may elect to override an instruction to measure the user, and thus reduce the power consumed by the device without significantly reducing from the utility of the measurements of the device to the system (since in this example, they are not suitable).

In one embodiment, a system configured to reduce power consumption by overriding an instruction to measure, comprising: a mode-selector configured to receive first and second tags corresponding to first and second segments of content, respectively; wherein the first and second tags indicate to operate a device in a first mode of operation to measure affective response to the first and second segments; and a threshold module configured to receive first and second measurements of a user taken by a sensor essentially before end of exposure of the user to the first and second segments, respectively; the threshold module is further configured to determine that the first measurement reaches a first predetermined threshold; the threshold module is further configured to determine that the second measurement does not reach a second predetermined threshold, and to indicate thereof to the mode-selector; the mode-selector is further configured to: operate the device in the first mode of operation to measure affective response of the user to the first segment, and to override first mode of operation indicated by the second tag, by operating the device in a second mode of operation to measure affective response of the user to the second segment; wherein power consumption of the device when operating in the second mode of operation is significantly lower than the power consumption of the device when operating in the first mode of operation. Optionally, the threshold module is further configured to determine that the first measurement reaches a first predetermined threshold, and to indicate thereof to the mode-selector. Optionally, the first tag further comprises a representation of an expected emotional response to the first segment. Optionally, the system further comprising a training module configured to train an emotional response predictor; the training module configured to receive the first tag and an affective response measurement taken by the device while operating in the first mode of operation. Optionally, the sensor comprises an image capturing device and the sensor is a battery powered sensor that measures a physiological signal and is attached to or implanted in the user. Optionally, the device is a battery powered sensor that is coupled to the user and measures a physiological signal of the user. Optionally, the sensor is coupled to the user and measures a physiological signal of the user. Optionally, the sensor operates substantially independently of whether the user is exposed to segments having corresponding tags; and the device is mainly used to measure affective response of the user while exposed to segments having corresponding tags. Optionally, the system further comprising an interactive computer game configured to generate the first segment and the first tag; wherein the interactive computer game has an element whose actions in the game are at least partially controlled by the user. Optionally, the power consumption of the device when operating in the second mode of operation is essentially zero.

In one embodiment, a method for reducing power consumption by overriding an instruction to measure, comprising: receiving first and second tags corresponding to first and second segments of contents, respectively; wherein the first and second tags indicate to operate a device in a first mode of operation to measure affective response to the first and second segments; receiving a first measurement of a user taken by a sensor essentially before end of exposure of the user to the first segment; determining that the first measurement reaches a first predetermined threshold, and selecting the first mode of operation for the device to operate in to measure affective response of the user to the first segment; receiving a second measurement of the user taken by the sensor essentially before end of exposure of the user to the second segment; and determining that the second measurement does not reach a second predetermined threshold, and overriding first mode of operation indicated by the second tag by selecting a second mode of operation in which to operate the device to measure affective response of the user to the second segment; wherein power consumption of the device when operating in the second mode of operation is significantly lower than the power consumption of the device when operating in the first mode of operation. Optionally, the first tag further comprises a representation of an expected emotional response of a user to being exposed to the first segment. Optionally, the method further comprises forwarding, to a training module that trains an emotional response predictor, the first tag and measurements of the affective response of the user to being exposed to the first segment. Optionally, the first tag depends on information conveyed by the first segment, and does not depend mainly on behavior of the user while being exposed to the first segment. Optionally, the sensor comprises an image capturing device and the sensor is a battery powered sensor that measures a physiological signal and is attached to or implanted in the user. Optionally, the device is a battery powered sensor that is coupled to the user and measures a physiological signal of the user. Optionally, the sensor is coupled to the user and measures a physiological signal of the user. Optionally, the sensor operates substantially independently of whether the user is exposed to segments having the corresponding tags; and the device is mainly used to measure affective response of the user while exposed to segments of content having corresponding tags. Optionally, the method further comprises generating the first segment and the first tag by an interactive computer game having an element whose actions in the game are at least partially controlled by the user; and the first tag corresponds to a certain event occurring in the first segment.

In one embodiment, a system configured to reduce power consumption by overriding instruction to measure, comprising: a mode-selector configured to receive first and second tags corresponding to first and second segments of content, respectively; wherein the first and second tags indicate to operate a device in a first mode of operation to measure affective response to the first and second segments; and wherein the device is battery operated and measures a physiological signal of a user; and a threshold module configured to receive first and second measurements of the user taken by a sensor essentially before end of exposure of the user to the first and second segments, respectively; the threshold module is further configured to determine that the first measurement reaches a first predetermined threshold and indicate thereof to the mode-selector, and to determine that the second measurement does not reach a second predetermined threshold and indicate thereof to the mode-selector; the mode-selector is further configured to: select the first mode of operation for the device to operate in to measure affective response of the user to the first segment, and to override first mode of operation indicated by the second tag, by selecting a second mode of operation for the device to operate in to measure affective response of the user to the second segment; wherein power consumption of the device when operating in the second mode of operation is significantly lower than the power consumption of the device when operating in the first mode of operation.

Figure 10:
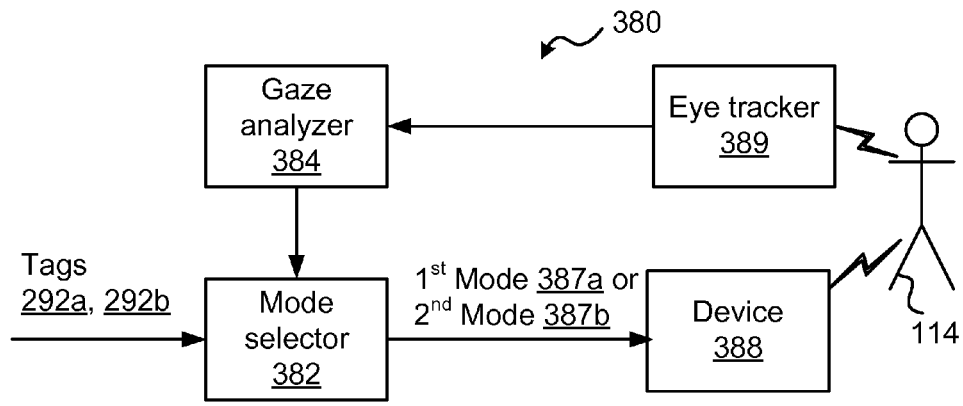
FIG. 10 illustrates one embodiment of a system configured to reduce power consumption by utilizing eye tracking to override instructions conveyed by tags.

FIG. 10 illustrates one embodiment of a system 380 that is configured to reduce power consumption of a device 388 by overriding instructions to measure indicated by tags. The system 380 includes at least a mode-selector 382 and a gaze analyzer 384.

The mode-selector 382 is configured to receive tags corresponding to segments of content, such as the tags illustrated in FIG. 3. In one embodiment, the mode-selector is configured to receive the first tag 292a and the second tag 292b corresponding to first and second segments of content, respectively. The first tag 292a indicates to operate the device 388 in a first mode of operation 387a to measure affective response to the first segment. The second tag 292b indicates to operate the device 388 in a first mode of operation 387a to measure affective response to the second segment.

The gaze analyzer 384 is configured to receive, eye tracking data of the user 114 acquired by an eye tracker 389, taken in period corresponding to an exposure of the user 114 to segments of content. Optionally, eye tracking data of the user 114 corresponding to a certain segment of content is acquired essentially during exposure of the user to the segment.

In one example, by "essentially during" it is meant that most of the duration during which the eye tracking data was acquired overlaps with when the user was exposed to the certain segment. In another example, by "essentially during" it is meant that the eye tracking data was acquired during the exposure, or during a period starting shortly before the exposure (e.g., shortly before may be up to 15 seconds before). Thus, the eye tracking data may reflect a condition of the user 114 during the time of exposure to a segment of content, in particular it may be determined if the user is paying attention to the segment and/or a display via which the user is exposed, or is to be exposed, to the segment.

In one embodiment, the gaze analyzer 384 is configured to receive first eye tracking data of the user 114 acquired essentially during exposure of the user to the first segment. The gaze analyzer 384 is also configured to receive second eye tracking data of the user 114 acquired essentially during exposure of the user to the second segment. Optionally, the first and second eye tracking data are acquired by the eye tracker 389. Optionally, the first and second eye tracking data may undergo processing, such as filtration, normalization, and/or feature extraction. Optionally, processing the first and second eye tracking data may involve analysis of the eye tracking data to determine for different times directions of gaze of the user and/or objects the user was looking at. Optionally, at least some of the processing of the eye tracking data is performed by gaze analyzer 384. Alternatively or additionally, at least some of the processing is performed by the eye tracker 389. Additionally or alternatively, at least some of the processing is performed by an external module, such as a cloud-based server running analysis software. Additional information regarding eye tracking and computing the gaze-based attention level is given below.

The gaze analyzer 384 is also configured to determine from eye tracking data it receives whether a gaze-based attention level, computed from the eye tracking data, reached a predetermined threshold. Optionally, the gaze analyzer 384 may indicate to other modules, such as the mode-selector 382, whether the predetermined threshold was reached. Optionally, a gaze-based attention level, computed from eye tracking data acquired during exposure of the user 114 to a segment of content, may correspond to an attention level of the user to the content. Optionally, this information may be utilized in order to determine whether it is worthwhile at that time to measure the user with the device 388 in order to measure affective response of the user to the content: if the user is not paying attention to the content, then an affective response measurement taken at that time may not accurately represent the user's attitude towards the content.

In one embodiment, the gaze analyzer 384 is configured to determine from the first eye tracking data that a gaze-based attention level to the first segment reaches a first predetermined threshold, and may optionally indicate to the mode-selector 382 thereof (i.e., that the gaze-based attention level to the first segment reaches the first predetermined threshold). Additionally, the gaze analyzer 384 is configured to determine from the second eye tracking data that a gaze-based attention level to the second segment does not reach a second predetermined threshold, and may optionally indicate to the mode-selector 382 thereof (i.e., that the gaze-based attention level to the second segment does not reach the second predetermined threshold).

Herein, by stating that a value reaches a predetermined threshold, it is meant that the value equals or exceeds the predetermined threshold. In addition, a predetermined threshold to which a value a measurement of affective response is compared, refers to a value of which there is prior knowledge. For example, the threshold value itself is known and/or computed prior to when the comparison is made. Additionally or alternatively, a predetermined threshold may utilize a threshold value that is computed according to logic (such as function) that is known prior to when the comparison is made.

In one embodiment, the first predetermined threshold and the second predetermined threshold may represent different thresholds. For example, reaching the first predetermined threshold is based on achieving different value than is required to pass the second predetermined threshold. Thus, there may be cases in which a certain value may reach the first predetermined threshold, but not reach the second predetermined threshold. Alternatively, in another embodiment, the first predetermined threshold and the second predetermined threshold may represent essentially the same predetermined threshold. Thus, in this embodiment, a value that reaches the first predetermined threshold also reaches the second predetermined. Similarly, in this embodiment, a value that does not reach the first predetermined threshold also does not reach the second predetermined threshold.

In one embodiment, a predetermined threshold, such as the first or second predetermined thresholds, has a fixed value. For example, the predetermined threshold may be 50%, representing that a user's eye tracking data should indicate that the user looked at the content for at least half of the time. In another example, the predetermined threshold may be 7, and represent the fact that a user's gaze-based attention level, as determined by a certain function that computes gazed-based attention level from eye tracking data on a scale of 1 to 10, is 7 or more.

In another embodiment, when a predetermined threshold is computed various factors may be taken into account, such as the length of the duration during which eye tracking data was acquired, the type of content the use was exposed to, and/or characteristics of the user and/or the environment. Thus, based on one or more of these factors, the predetermined threshold may represent lower or higher degrees of required attention in order for the predetermined threshold to be considered reached. In one example, a longer duration in which eye tracking is acquired may lead to a decrease in a predetermined threshold that represents a percentage of time a user looks at the content; it may be difficult in some situations to continually look at content (e.g., when outside in the company of other people), so the threshold can be relaxed in such situations. In another example, the predetermined threshold used with a user that is a child may be lower than that of an adult, since for some children, it is more difficult to stay concentrated for long. In another example, the predetermined threshold used with content that is a commercial may be lower than the predetermined threshold used for content that is a movie or television program, since users tend to pay less attention to commercials (though often measurements in these situations are desired). In still another example, the type of display on which content is consumed may influence the predetermined threshold. For instance, a display that is head-mounted (e.g., an augmented reality display) may have a different, possibly higher, predetermined threshold associated with it, compared to a display on a smartphone, since content on an augmented reality display may be clearer and easy to see if the user desires to look at it.

The gaze analyzer 384 may indicates to the mode-selector 382 whether a gaze-based attention level computed from eye tracking data reaches a predetermined threshold. There may be different ways in which the gaze analyzer 384 may make such indications. In one example, the gaze analyzer 384 signals (e.g., via a message communicated to the mode-selector 382) a value that describes if the gaze-based attention level reached the threshold, and/or the actual gaze-based attention level and/or the difference between the gaze-based attention level and the threshold. In another example, the gaze analyzer 384 sends a signal to the mode-selector 382 when the gaze-based attention level reaches the threshold, and if no signal is sent, the mode-selector 382 operates under the assumption that the gaze-based attention did not reach the threshold. Alternatively, the gaze analyzer 384 may send a signal to the mode-selector 382 when the gaze-based attention does not reach the threshold, and if no signal is sent, the mode-selector 382 operates under the assumption that the gaze-based attention reached the threshold.

The mode-selector 382 is configured to select a mode of operation for the device 388 to operate in when measuring affective response of the user 114. Optionally, the selection of a mode of operation may be done according to an indication in a received tag. Optionally, the mode-selector 382 may make a selection of the mode of operation also according to other information such as an indication from the gaze analyzer 384 regarding whether or not a gaze-based attention level computed from eye tracking data reaches a predetermined threshold. Optionally, a mode of operation for the device 388 is chosen from a set that includes the first mode of operation 387a and a second mode of operation 387b.

In one embodiment, the mode-selector 382 selects the first mode of operation 387a, as indicated by the first tag 292a, for measuring the affective response of the user to the first segment of content. The mode-selector 382 makes this selection because the gaze analyzer 384 indicates that the gaze-based attention level to the first segment reaches the first predetermined threshold. However, the mode-selector 382 overrides the first mode of operation 387a, indicated by the second tag 292b, based on indication of the gaze analyzer 384 that the second the gaze-based attention level to the second segment does not reach the second predetermined threshold. The power consumption of the device 388 when operating in the second mode of operation 387b is significantly lower than the power consumption of the device 388 when operating in the first mode of operation 387a. Thus, by switching modes of operation of the device 388, the mode-selector 382 is able to help reduce the power consumption of the device 388 when it is not likely that measurements of the user with the device 388 are going to be useful.

In one example, the mode-selector 382 may override a tentative choice of the first mode of operation 387a (as indicated by a tag), by replacing the selected first mode of operation 387a with the second mode of operation 387b. For instance, this may be done by changing parameters originally set by the mode-selector 382 according to information received from the threshold-module 384. In another example, overriding may be achieved by the gaze analyzer 384 running before the mode-selector 382 receives a tag indicating the desired mode of operation. If the gaze analyzer 384 determines that a measurement of the user taken with the sensor 360 does not reach a predetermined threshold, it may prevent the tag from reaching the mode-selector 382, thus casing the mode-selector 382 not to select the first mode of operation 387a for the device 388. In this example, the default behavior of the device 388 may be to operate in the second mode of operation 387b; thus blocking the tag from reaching the mode-selector 382 and/or blocking the mode-selector 382 from acting according to the tag is equivalent to selecting the second mode of operation for the device 388.

In some embodiments, the power consumption of the device 388 while operating in the first mode of operation 387a may be significantly higher than its power consumption while operating in the second mode of operation 387b. Consequently, by selecting for certain durations, the second mode of operation 387b for the device 388 to operate in, instead of the intended first mode of operation 387a, the total amount of energy consumed over time by the device 388 may be reduced. Additionally, the mode-selector 382 may reduce the power consumption of other elements that participate in the processing of the affective response measurements taken by the device 388, such as a processor that processes the data comprising the measurements. Optionally, the power consumption of the device 388 while operating at the second mode of operation 387b is essentially zero. For example, by essentially zero it is meant that the power consumption is at most 5% of the power consumption of the device 388 when operating at the first mode of operation 387a.

In one embodiment, the mode-selector 382 selects a mode of operation, from two modes of operation: a first mode of operation that is a standby mode of operation, and a second mode of operation that is a normal mode of operation. In this example, as is the case with many sensors and/or devices, when the device 388 operates in the standby mode, it consumes significantly less power compared to when it operates in the normal mode of operation.

In another embodiment, selecting a mode of operation, by the mode-selector 382, may involve selecting different parameter settings for the operation of a device, such as setting resolution of images captured by a camera, or brainwave frequencies that are to be monitored using EEG.

In one embodiment, a mode of operation for a sensor, such as the modes 387a and/or 387b, may be implicitly or explicitly selected. For example, an implicit selection of the mode of operation may occur if the device 388 does not receive a signal that may indicate and/or influence a mode of operation at which it operates. By contrast, an explicit selection of the mode of operation may involve sending the device 388 information that indicates which mode of operation to operate in and/or parameter values that determine how the device 388 is to operate.

In one embodiment, the system 380 includes a measurement Emotional Response Predictor (measurement ERP) configured to predict the user's emotional response from data comprising measurements of affective response of the user 114 taken with the device 388. Optionally, the measurements taken by the device are processed prior to being sent to the measurement ERP for prediction. For example, the measurements may undergo filtering and/or feature extraction.

In one embodiment, the system 380 includes a model trainer 290, as illustrated in FIG. Optionally, the model trainer 290 may receive as input measurements taken by the device 388, in temporal vicinity of the first duration indicated by the tag 292a. The measurements may include affective response of the user 114 to the first segment of content corresponding to the tag 292a.

In one embodiment, the computer game 294, which is illustrated in FIG. 5, generates the tags 292a and 292b received by the mode-selector 382. Measurements taken with the device 388 during the first duration, indicated by the tag 292a, may then be utilized by the interactive computer game in order to determine emotional response of the user 114 (e.g., by providing the measurements to a measurement ERP). The predicted emotional response may be used in order to determine if elements in the game need to be changed in order to improve the user experience.

In one embodiment, the functionality of the system 380 is included in the interactive computer game 294. In this embodiment, the computer game sets a mode of operation for the device 388. For example, the system 380 is implemented, at least in part, as software running on a processor belonging to a game console. In another example, the system 380 is implemented, at least in part, as software running on a server running a game such as an online multiplayer game.

In one embodiment, the first and second eye tracking data are acquired utilizing an eye tracker, such as the eye tracker 389, which includes image capturing device. Optionally, the device 388 may be a battery powered sensor that measures a physiological signal and is coupled to the user. Optionally, the first and second eye tracking data are collected substantially independently of whether the user is exposed to segments of content identified by tags, and the device 388 comprises a battery powered sensor that is mainly used to measure affective response of the user while exposed to segments identified by tags.

In one embodiment, the eye tracker 389 operates substantially independently of whether the user 114 is exposed to segments of content identified by tags. Optionally, the device 388 is a battery powered sensor that is mainly used to measure affective response of the user while exposed to segments identified by tags. In one example, by "substantially independently of whether the user is exposed . . . " it is meant that the normal behavior, unless specifically overridden by the user or software, is for the eye tracker 389 to operate without respect to tags. In another example, "substantially independently of whether the user is exposed . . . " it is meant that the eye tracker 389 has a controller that may not necessarily take into consideration instructions or indications that appear in tags.

In one embodiment, a segment of content may include visual content, such as images and/or video. A content delivery module may be used to expose the segments to the user 114. Optionally, the device 388 has at least one component that is not shared with the content delivery module. Additionally or alternatively, the device 388 may include at least one component that is shared with the content delivery module. Additionally or alternatively, the device 388 may be a battery powered sensor, and the content delivery module and the battery powered sensor are realized in the same device.

In one embodiment, the mode-selector 382 and/or the gaze analyzer 384 are part of a device belonging to the user 114. Optionally, the device is a mobile device, such as a smart phone or tablet computer. Optionally, the mode-selector 382, and/or the gaze analyzer 384, are implemented, at least in part, as software running on a processor of the device.

In another embodiment, the mode-selector 382 and/or the gaze analyzer 384 are implemented, at least in part, via a program that is run on a processor located on a server typically remote of the user, such as a cloud-based server.

In one embodiment, the mode-selector 382 and the gaze analyzer 384 are implemented at least in part with software. Optionally, the mode-selector 382 and the gaze analyzer 384 share at least some of the same software modules. Optionally, the mode-selector 382 and the gaze analyzer 384 both utilize the same processor to run at least some of their software modules. Optionally, the mode-selector 382 and the gaze analyzer 384 are both implemented via the same program.

In one embodiment, the mode-selector 382 is implemented as part of the device 388. In one example, the mode-selector 382 is implemented as a software module associated with the device 388. In another example, the mode-selector 382 is realized via hardware that is embedded in the device 388.

In one embodiment, the gaze analyzer 384 is implemented as part of the eye tracker 389. In one example, gaze analyzer 384 is implemented as a software module associated with the eye tracker 389. In another example, the gaze analyzer 384 is realized via hardware that is embedded in the eye tracker 389.

In one embodiment, the system 380 includes a measurement Emotional Response Predictor (measurement ERP) configured to predict the user's emotional response from data comprising measurements of affective response of the user 114 taken with the device 388. Optionally, the measurements taken by the device are processed prior to being sent to the measurement ERP for prediction. For example, the measurements may undergo filtering and/or feature extraction.

In one embodiment, the system 380 includes a model trainer 290, as illustrated in FIG. Optionally, the model trainer 290 may receive as input measurements taken by the device 388, in temporal vicinity of the first duration indicated by the tag 292a. The measurements may include affective response of the user 114 to the first segment of content corresponding to the tag 292a.

Figure 11:
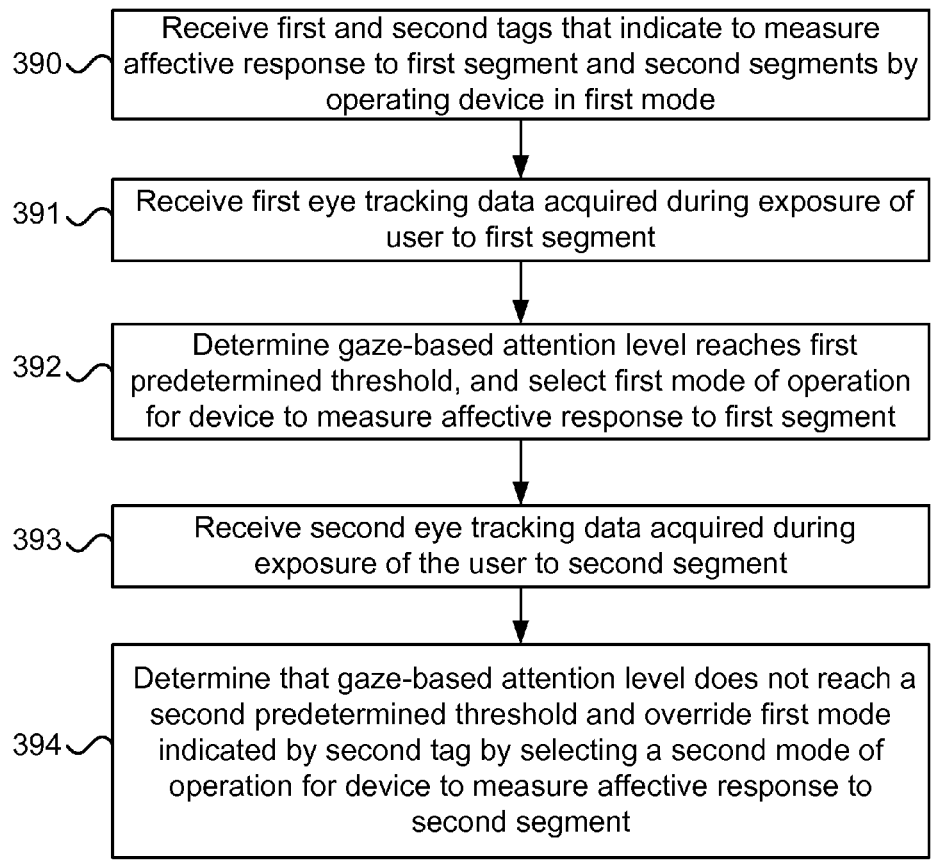
FIG. 11 illustrates one embodiment of a method for reducing power consumption by utilizing eye tracking to override instructions conveyed by tags.

FIG. 11 illustrates one embodiment of a method for reducing power consumption by utilizing eye tracking to override instructions conveyed by tags. The method includes the following steps:

In step 390, receiving first and second tags corresponding to first and second segments of contents, respectively; the first tag indicates to operate a device in a first mode of operation to measure affective response to the first segment, and the second tag indicates to operate the device in the first mode to measure affective response to the second segment.

In step 391, receiving first eye tracking data of the user acquired essentially during exposure of the user to the first segment.

In step 392, determining, based on the first eye tracking data, that a gaze-based attention level to the first segment reaches a first predetermined threshold, and operating the device in the first mode of operation to measure affective response of the user to the first segment.

In step 393, receiving second eye tracking data of the user acquired essentially during exposure of the user to the second segment.

And in step 394, determining, based on the second eye tracking data, that a gaze-based attention level to the second segment does not reach a second predetermined threshold, and overriding first mode of operation indicated by the second tag by operating the device in a second mode of operation to measure affective response of the user to the second segment.

In one embodiment, power consumption of the device when operating in the second mode of operation is significantly lower than the power consumption of the device when operating in the first mode of operation. Thus, the overriding implemented in step 394 can enable the system to reduce its energy consumption. For example, at certain times, it might not be beneficial for the system to measure the user with the device; for instance, when the user is not paying attention to the content (e.g., not looking at the content). During such times, the system may elect to override an instruction to measure the user, and thus reduce the power consumed by the device without significantly reducing from the utility of the measurements of the device to the system (since in this example, they are not suitable).

In one embodiment, a system configured to reduce power consumption by utilizing eye tracking to override instructions conveyed by tags, comprising: a mode-selector configured to receive first and second tags corresponding to first and second segments of content, respectively; wherein the first and second tags indicate to operate a device in a first mode of operation to measure affective response to the first and second segments; and a gaze analyzer configured to receive first and second eye tracking data of a user acquired essentially during exposure of the user to the first and second segments, respectively; the gaze analyzer is further configured to determine from the first eye tracking data that a gaze-based attention level to the first segment reaches a first predetermined threshold; the gaze analyzer is further configured to determine from the second eye tracking data that a gaze-based attention level to the second segment does not reach a second predetermined threshold, and to indicate thereof to the mode-selector; the mode-selector is further configured to: operate the device in the first mode of operation to measure affective response of the user to the first segment, and to override first mode of operation indicated by the second tag, by operating the device in a second mode of operation to measure affective response of the user to the second segment; wherein power consumption of the device when operating in the second mode of operation is significantly lower than the power consumption of the device when operating in the first mode of operation. Optionally, the gaze analyzer is further configured to indicate to the mode-selector that the gaze-based attention level to the first segment reaches the first predetermined threshold. Optionally, the first and second tags further comprise representations of expected emotional responses to the segments. Optionally, the system further comprises a training module configured to receive the first tag and measurements taken by the device during the first duration, and to train an emotional response model utilizing the first tag and the measurements. Optionally, the first and second eye tracking data are acquired utilizing an image capturing device, and the device is a battery powered sensor that measures a physiological signal and is coupled to the user. Optionally, the device is a battery powered sensor that is coupled to the user and measures a physiological signal. Optionally, the first and second eye tracking data are collected substantially independently of whether the user is exposed to segments of content identified by tags; and the device is a battery powered sensor that is mainly used to measure affective response of the user while exposed to segments identified by tags. Optionally, the system further comprises an interactive computer game configured to generate the first and second segments and the first and second tags; wherein the interactive computer game has an element whose actions in the game are at least partially controlled by the user. Optionally, the power consumption of the device when operating in the second mode of operation is essentially zero.

In one embodiment, a method for reducing power consumption by utilizing eye tracking to override instructions conveyed by tags, comprising: receiving first and second tags corresponding to first and second segments of content, respectively; wherein the first and second tags indicate to operate a device in a first mode of operation to measure affective response to the first and second segments; receiving first eye tracking data of the user acquired essentially during exposure of the user to the first segment; determining, based on the first eye tracking data, that a gaze-based attention level to the first segment reaches a first predetermined threshold, and operating the device in the first mode of operation to measure affective response of the user to the first segment; receiving second eye tracking data of the user acquired essentially during exposure of the user to the second segment; and determining, based on the second eye tracking data, that a gaze-based attention level to the second segment does not reach a second predetermined threshold, and overriding first mode of operation indicated by the second tag by operating the device in a second mode of operation to measure affective response of the user to the second segment; wherein power consumption of the device when operating in the second mode of operation is significantly lower than the power consumption of the device when operating in the first mode of operation. Optionally, the first tag further comprises a representation of an expected emotional response of a user to being exposed to the first segment. Optionally, the method further comprises forwarding, to a training module that trains an emotional response predictor, the first tag and measurements of the affective response of the user to being exposed to the first segment. Optionally, the first tag depends on information conveyed by the first segment, and does not depend mainly on behavior of the user while being exposed to the first segment. Optionally, the first and second eye tracking data are acquired utilizing an image capturing device and the device is a battery powered sensor that measures a physiological signal and is coupled to the user. Optionally, the device is a battery powered sensor that is coupled to the user, and measures a physiological signal. Optionally, the first and second eye tracking data are collected substantially independently of whether the user is exposed to segments of content identified by tags; and the device is a battery powered sensor that is mainly used to measure affective response of the user while exposed to segments identified by tags. Optionally, the method further comprises generating the first segment and the first tag by an interactive computer game having an element whose actions in the game is at least partially controlled by the user; wherein the first tag corresponds to a certain event occurring in the first segment.

In one embodiment, a system configured to reduce power consumption by utilizing eye tracking to override instructions conveyed by tags, comprising: a mode-selector configured to receive first and second tags corresponding to first and second segments of content, respectively; wherein the first and second tags indicate to operate a device in a first mode of operation to measure affective response to the first and second segments; and a gaze analyzer configured to receive first and second eye tracking data of a user acquired essentially during exposure of the user to the first and second segments, respectively; gaze analyzer is further configured to determine from the first eye tracking data that a gaze-based attention level to the first segment reaches a first predetermined threshold, and to indicate thereof to the mode-selector; the mode-selector is further configured to select the first mode of operation for the device to operate in to measure affective response of the user to the first segment; the gaze analyzer is further configured to determine from the second eye tracking data that a gaze-based attention level to the second segment does not reach a second predetermined threshold, and to indicate thereof to the mode-selector; the mode-selector is further configured to override first mode of operation indicated by the second tag by selecting a second mode of operation for the device to operate in to measure affective response of the user to the second segment; wherein power consumption of the device when operating in the second mode of operation is significantly lower than the power consumption of the device when operating in the first mode of operation. Optionally, the first and second eye tracking data are acquired utilizing an image capturing device and the device is a battery powered sensor that measures a physiological signal and is coupled to the user. Optionally, the image capturing device and the battery powered sensor utilize separate power sources.

Figure 12:
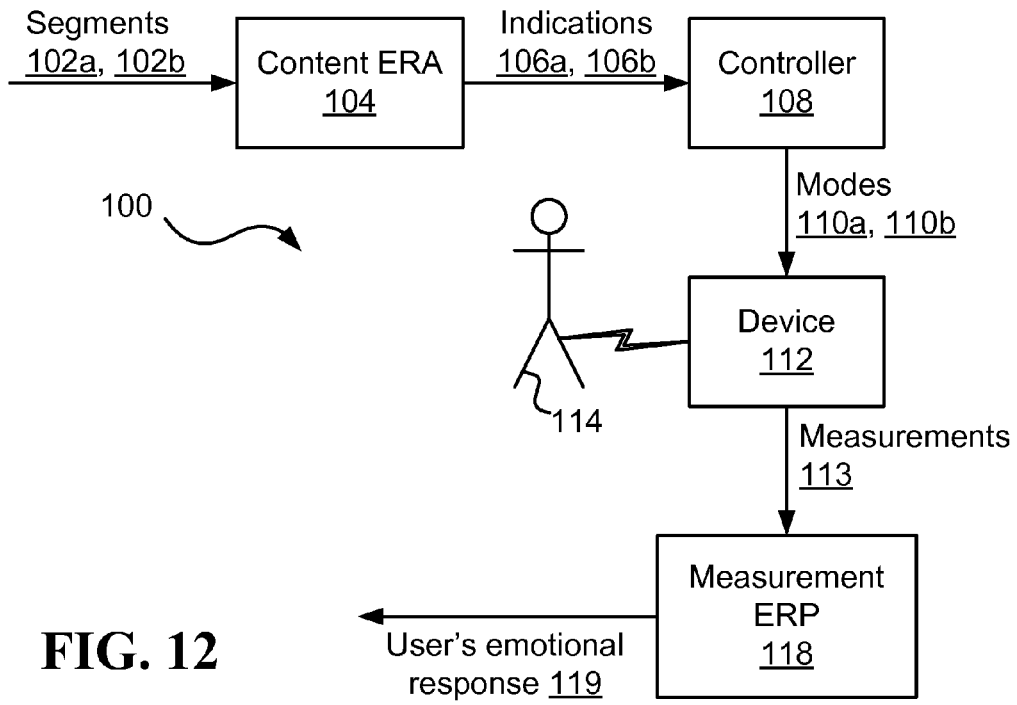
FIG. 12 illustrates one embodiment of a system configured to reduce power consumption according to analysis of content.

FIG. 12 illustrates one embodiment of a system 100 configured to reduce power consumption according to analysis of content. The system 100 includes at least a content ERA 104 and a controller 108.

The content ERA (Emotional Response Analyzer) 104 is configured to (i) receive a first segment 102a of content and a second segment 102b of content, (ii) analyze the segments 102a and 102b, and (iii) output a first indication 106a and a second indication 106b. The first indication 106a indicates that a first value related to a prediction of emotional response to the first segment 102a does not reach a first predetermined threshold. The second indication 106b indicates that a second value related to a prediction of emotional response to the second segment 102b does reach a second predetermined threshold.

Herein, a first segment of content and a second segment of content, such as the first segment 102a and the second segment 102b, are not necessarily segments of the same content item. For example, the segment 102a may be a clip from a first movie, and the segment 102b may be a clip of a second, different, movie. In another example, the first segment 102a is a portion of a video game play, and the second segment 102b is a different type of content, such as a web page. Optionally, the first and second segments are different segments of the same content. For example, the first segment 102a and the second segment 102b may be first and second scenes in the same movie.

A segment of content, such as the segments 102a and/or 102b, is a portion of content to which a user 114 may be exposed. For example, the segment of content may be a portion of a conversation (e.g., messages conveyed in text, audio, video, and/or tactile stimulation), a portion of visual media content (e.g., belonging to a movie, web site, and/or computer game), and/or a portion of audio content (e.g., music and/or sound effects). Optionally, an interaction of the user 114 with a digital device may lead to the generation of a segment of content. For example, an interaction of the user with a computer gaming device may lead to the generation of a segment of gaming content such as the user battling a monster in a virtual world. Optionally, an interaction of the user 114 with a digital device may lead to the presentation of an essentially already prepared segment of content. For example, an interaction of the user with a browser on a tablet computer can trigger the presentation of a video clip to the user on the tablet's display.

In one embodiment, a segment of content might undergo processing before being received by the content ERA 104 and/or before the content ERA 104 analyzes the segment of content. Thus, the data representing the segment of content, which gets analyzed by the content ERA 104, may not be the same data presented to the user 114. For example, a segment of content that includes video may undergo feature extraction prior to being sent to the content ERA 104 (e.g., in order to identify object, people, and/or the genre). In this example, the exposure of the user 114 to the segment of content involves viewing a video clip. However, the content ERA 104 receives related data, such as feature values corresponding to objects, people, and/or the genre of the video, and performs its analysis on that data.

In one embodiment, the content ERA 104 may output the first indication 106a and the second indication 106b, which may be conveyed to the controller 108. The controller 108 is configured to select a mode of operation for operating a device 112 based on a received indication. Optionally, the device 112 includes a sensor that may be used to measure affective response of the user 114. In one example, based on the indication 106a, the controller 108 is configured to select for the device 112 a first mode operation 110a, and based on the second indication 106b, the controller 108 is configured to select for the device 112 a second mode of operation 110b. Optionally, while operating in the first mode of operation 110a, the device 112 measures the affective response of the user 114 to the first segment 102a. Optionally, while operating in the second mode of operation 110b, the device 112 measures the affective response of the user 114 to the second segment 102b. Optionally, the indications 106a and 106b may be received separately by the controller 108 (e.g., each indication is communicated in a separate communication), or may be received jointly (e.g., both indications are communicated in the same communication).

In one embodiment, the content ERA 104 utilizes a prediction of emotional response to a segment of content, and provides in a corresponding indication it produces one or more values related to the prediction. Optionally, to make the prediction, the content ERA utilizes a personalized model that provides indications optimized for the user 114. Alternatively, to make the prediction, the content ERA utilizes a general model that is not personalized for the user 114.

In another embodiment, the indication 106a and/or the indication 106b may be interpreted as operating instructions for another module in the system, such as the controller 108 and/or the device 112. For example, the indications may be interpreted as instructions to turn the device 112 on or off, and/or to select a specific mode of operation for the device 112. For example, the indication first 106a may be interpreted as an instruction to select the first mode 110a, and similarly, the second indication 106b may be interpreted as an instruction to select the second mode 110b. In another example, the indications 106a and/or 106b may indicate how long the device 112 should operate and/or specify a period of time (e.g., by providing start and end times) in which a device 112 should operate.

It is noted that phrases like "to indicate something" or "indicative of something" are to be interpreted as directly and/or indirectly signaling the something. Therefore, a phrase like "the indication is indicative of reaching a threshold", means that the indication directly or indirectly signals that the threshold is reached. For example, to indicate something the indication may explicitly state it (e.g., include information that may be interpreted as reaching or not reaching a threshold). In another example, to indicate something the indication may include a value, which when interpreted by a recipient conveys the signal (e.g., an indication may include a value of heart rate which may be compared to a certain heart rate value to determine if the threshold is reached). In yet another example, a property of the indication (e.g., its size, type, and/or the fact that it is sent), are sufficient to signal something to a recipient.

In some embodiments, the first indication 106a indicates whether a first value, related to a prediction of emotional response to the first segment 102a, reaches a first predetermined threshold. Additionally, the second indication 106b may indicate whether a second value, related to a prediction of emotional response to the second segment 102b, reaches a second predetermined threshold. Optionally, the prediction of emotional response to the first segment 102a is generated as part of the analysis of the first segment 102a by the content ERA 104. Optionally, the prediction of emotional response to the second segment 102b is generated as part of the analysis of the second segment 102b by the content ERA 104. Optionally, a content emotional response predictor (content ERP) is utilized to make the prediction of emotional response to the first segment 102a and/or the prediction of emotional response to the second segment 102b.

Herein, by stating that a value reaches a predetermined threshold, it is meant that the value equals or exceeds the predetermined threshold. In addition, a predetermined threshold to which a value related to a prediction of emotional response is compared, refers to a threshold value of which there is prior knowledge. In one example, the threshold value itself is known and/or computed prior to when the comparison is made. Alternatively or additionally, a predetermined threshold may be a threshold that is computed according to logic (such as function) that is known prior to when the comparison is made.

In one example, the first predetermined threshold and the second predetermined threshold represent different thresholds. For example, reaching the first threshold is based on achieving different value than is required to pass the second predetermined threshold. Thus, a value related to a predicted emotional response to a certain segment of content might reach the first predetermined threshold but not reach the second predetermined threshold, or vice versa. In another example, the first predetermined threshold and the second predetermined threshold represent the same threshold. Thus, any value related to a predicted emotional response to a certain segment that reaches the first predetermined threshold also reaches the second predetermined. Similarly, any value related to a predicted emotional response to a certain segment that does not reach the first predetermined threshold also does not reach the second predetermined threshold.

In one embodiment, the value related to the prediction of emotional response to a segment of content may represent a type and/or extent of an emotional response to the segment of content. For example, the predicted emotional response needs to be of a certain type and/or be at a certain extent, in order for the predetermined threshold to be reached.

In one example, a predetermined threshold may relate to an emotional response of happiness; thus, if a user is not predicted to be happy from exposure to the first segment 102a, the indication 106a may indicate that the first predetermined threshold is not reached. However, if the user is predicted to feel happy due to being exposed to the second segment 102b, the indication 106b may indicate that the second predetermined threshold is reached. Optionally, the user for which the predictions of emotional response are made is the user 114.

In another example, a predetermined threshold may relate to the extent of expected expression of excitement. The expected excitement to a segment of content may be a predicted value on a scale of 1 to 10; a predetermined threshold, in this example, may be set to a level of 5 on the scale of 1 to 10. Thus, if a user is predicted to have an excitement of 5 to a certain segment, the indication may indicate that the predetermined threshold is reached, while if the excitement is predicted to be at level 2, the indication may indicate that the predetermined threshold is not reached.

A predetermined threshold, such as the first and/or second predetermined thresholds, may be set based on a property of a segment of content and/or analysis of a segment of content. For example, the type of content may influence the value of the threshold. Given a segment of content that is from a video game, a first value representing excitement may be used as a threshold, while if the segment comes from a television program, a second, possibly lower, value may be used. In this example, the fact that a user is likely to be more emotionally involved in a video game (which is typically interactive), leads to a higher threshold for a segment of a game compared to the threshold that is used for the video game. In another example, a short segment of content (e.g., a 10 second video clip) corresponds to a lower threshold value for user excitement than a longer segment of content (e.g., a 2 minute video clip). In this example, it is assumed that the longer a user is exposed to content (at least up to a certain point), the stronger the user's emotional response is likely to be.

In some embodiments, a device, such as the device 112, is used to measure affective response of the user 114. Optionally, the device includes a sensor and/or is a sensor. Optionally, the sensor may be a physiological sensor (e.g., a sensor that measures heart rate, galvanic skin response, and/or brainwave activity), and/or a sensor that measures the user's behavior (e.g., a camera, and/or a motion detector). Optionally, the device may include additional components to the sensor, such as a memory, a processor, a battery, a transmitter, and/or a receiver. Optionally, the device may be coupled to a user. Herein a phrase like "a device coupled to a user" refers to a device that is attached to the user (e.g., on clothing, a bracelet, headgear), in contact with the user's body (e.g., a sticker on a user's skin), and/or implanted in the user's body (e.g., an implanted heart-rate sensor or implanted EEG electrodes).

In some embodiments, the device 112 may output measurements 113 of the affective response of the user 114. Optionally, the measurements 113 are forwarded to other modules of the system such as the measurement Emotional Response Predictor (measurement ERP) 118. Optionally, some of the measurements 113 of the device 112 may include raw measurement values (i.e., the values undergo very little transformation prior to their output). Alternatively or additionally, the measurements 113 may include processed values such as values that are the result of filtering, normalization, signal processing, feature extraction, encryption, and/or compression.

In some embodiments, a mode of operation selected by a controller, such as the first mode 110a and/or the second mode 110b, may have preset operation parameters (such as voltage, resolution, sampling rate). Alternatively or additionally, the mode of operation may include certain operation parameters that are computed by the controller according to the received indication and/or other data that is available at the time of computation.

In some embodiments, a mode of operation for the device 112 is selected from a set comprising at the first mode 110a and the second mode 110b. Optionally, the power consumption of the device 112 while operating in the first mode 110a is significantly lower than its power consumption while operating in the second mode 110b. Consequently, by selecting the mode of operation with respect to the information in an indication produced by the content ERA 104, the system 100 may reduce the amount of power consumed over time by the device 112 for measuring the affective response of the user 114. Additionally, the system 100 may reduce the power consumption of other elements that participate in the processing of the affective response measurements taken by the device 112, such as a processor that processes the data comprising the measurements, and/or a transmitter that transmits the measurements. Optionally, the power consumption of the device 112 while operating in the first mode of operation is substantially zero. In one example, power consumption the device 112 is considered to be substantially zero if it is less than 10% of the power consumption of the device 112 when it is operating in the second mode of operation 110b. In another example, power consumption the device 112 is considered to be substantially zero if it is less than double the of power consumption of the device 112 when the device 112 is in a standby mode in which the device does not take measurements, does not transmit measurements, and/or does not process measurements.

In one example, the controller 108 chooses a mode of operation for the device 112, from two modes of operation: the first mode 110a corresponds to a standby mode of operation and the second mode 110b corresponds to a normal mode of operation. In this example, as is the case with many devices, when the device 112 operates in the standby mode, it consumes significantly less power compared to when it operates in the normal mode of operation.

In another example, an indication generated by the content ERA 104, such as the first indication 106a and/or the second indication 106b, may include a value that is indicative of a predicted interest level of a user in a segment of content. The controller 108 may select, according to the predicted interest level, parameters that define a mode of operation of the device 112, such as a resolution of images captured by a camera that is part of the device 112. If the indication indicates that the predicted interest level is low, the controller 108 may select a first mode of operation in which a camera captures low resolution images (e.g., 320×240 pixels). However, if the indication indicates the predicted interest level is high, the controller 108 may select a second mode of operation in which the camera captures high-resolution images (e.g., 1920×1080 pixels). In some cases, different resolutions lead to different power consumptions for acquiring images. For instance, the lower resolution of the first mode of operation can cause a camera to utilize significantly less CMOS gates, compared to the number of CMOS gates it needs to utilize in the second mode of operation. Thus, in this example, the power consumption of the device 112 operating in the first mode of operation is significantly lower than the power consumption of the device 112 operating in the second mode of operation.

In one embodiment, as part of its analysis of a segment of content, the content ERA 104 predicts a value describing the expected emotional response of a user to a segment of content. Such a value may be included in an indication created by the content ERA 104, which is conveyed to the controller 108. Additionally or alternatively, an indication may be indicative of whether the expected emotional response reaches a predetermined threshold; and the controller 108 selects a mode of operation based on whether or not the predetermined threshold is reached.

For example, in the course of its analysis, the content ERA 104 predicts how frightened a user is likely to get from viewing a segment of content that is a video clip. An indication that is generated by the content ERA 104, indicates on a scale of 1-10 how frightened a user is expected to be (10 being the extremely frightened). The controller 108 receives the indication, and with respect to the indication, selects a mode of operation for the device 112, which may be an EEG head-mounted, battery operated, sensor that may be used to measure the affective response of the user 114 while viewing the video clip. In order to save power, the system may elect to measure the affective response of the user with the EEG sensor, while the clip is played, if the emotional response is expected to reach a predetermined threshold level, such as 3 on the scale of 1-10. Measuring the user with the EEG may help determine to what extent the user was really frightened while watching the video clip; however, if the predicted value is too low, it is not likely that the clip is going to scare the user at all, so the system chooses not to waste power on confirming that. Thus, if the expected emotional response is below the threshold, the controller 108 may select a "low power" mode of operation for the device 112, in which the device 112 consumes very little power. However, if the expected emotional response reaches the threshold, the controller 108 may select a "regular" mode of operation for the device 112, in which the device 112 consumes significantly more power than in the low power mode.

In one embodiment, the controller 108 may be implemented as part of the content ERA 104. In another example, the controller 108, the device 112, and the content ERA 104 are combined in a single device. Optionally, the device is battery powered (e.g., a smart phone).

In one embodiment, a segment of content may include visual content, such as images and/or video. A content delivery module may be used to expose the segments to the user 114. Optionally, the device 112 has at least one component that is not shared with the content delivery module. Additionally or alternatively, the device 112 may include at least one component that is shared with the content delivery module. Additionally or alternatively, the device 112 may be a battery powered sensor, and the content delivery module and the battery powered sensor are realized in the same device.

In one embodiment, at least one element of the controller 108 is implemented as a dedicated hardware element. For example, the controller 108 may be a component coupled to the device 112. In another example, the controller 108 is coupled to a processor that processes affective response measurements.

In one embodiment, the controller 108 is implemented in software running on a general purpose processor. In some cases, the controller may run, at least in part, on a device belonging to the user, such as a mobile phone. In some cases, the controller may run, at least in part, on a system remote of the user, such as on a cloud-based server.

In one embodiment, the controller 108 that selects a mode of operation for the device 112 is realized as hardware that is embedded in the housing of the device 112. For example, the controller for a mobile EEG measuring headset may be embedded in the headset itself, and optionally communicate data wirelessly.

In another embodiment, the controller 108 is realized as software that runs on a processor that belongs to the device 112. For example, the controller for a mobile EEG measuring headset may run on a processor that belongs to the headset and is used to process EEG measurements.

In one embodiment, the controller 108 and/or the content ERA 104 are implemented at least in part, as software running on a remote processor, such as a cloud-based server. For example, the cloud-based service can be used to analyze content that is to be presented to the user 114, such as video to be streamed to the user's display. According to indications of the content ERA's analysis, the controller 108 running on the cloud-based service may send different operating instructions to the device 112 regarding how to measure the user.

Figure 14:
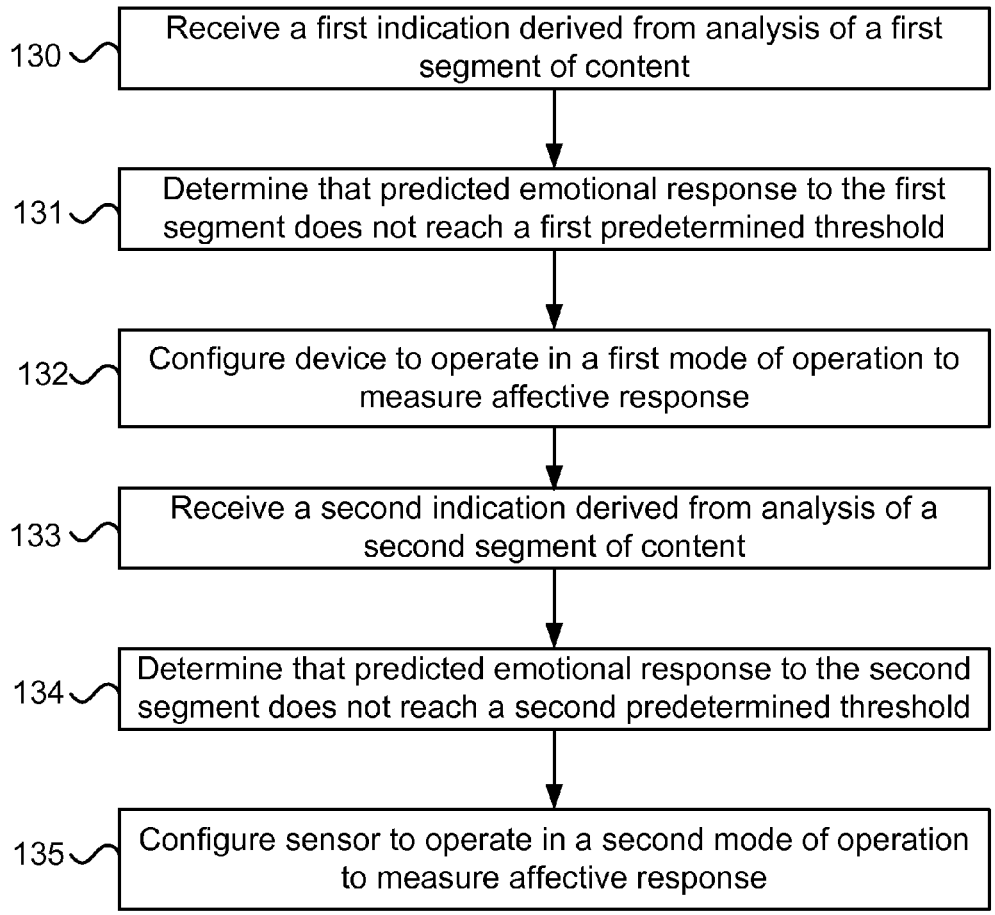
FIG. 14 illustrates one embodiment of a method for reducing power consumed measuring affective response.

FIG. 14 illustrates one embodiment of a method for reducing power consumed measuring affective response. The method includes the following steps:

In step 130, receiving a first indication derived from analysis of a first segment of content.

In step 131, determining that the first indication indicates that a first value related to a prediction of emotional response to the first segment does not reach a first predetermined threshold.

In step 132, configuring a device, based on the first indication, to operate in a first mode of operation to measure affective response of a user to the first segment.

In step 133, receiving a second indication derived from analysis of a second segment of content.

In step 134, determining that the second indication indicates that a second value related to a prediction of emotional response to the second segment does reach a second predetermined threshold.

And in step 135, configuring the device, based on the second indication, to operate in a second mode of operation to measure affective response of the user to the second segment.

In one embodiment, power consumed by the device, per unit of measurement time, for measuring the affective response of the user to the first segment, is significantly lower than power consumed by the device for measuring the affective response of the user to the second segment.

It is noted that references to first and second indices, such as the first and second segments, the first and second indications, and/or the first and second modes of operation, are not intended to limit the order of presenting the enumerated elements in any way. For example, the second indication may be received before the first indication, and the indications may also include a third indication related to a third predetermined threshold.

In one embodiment, the first and second segments are received from an interactive computer game module. The module provides information regarding an expected emotional response to the second segment, which is used in order to generate the second indication. Additionally, the computer game may also provide information regarding an expected emotional response to the first segment, which is used to generate the first indication.

Figure 15:
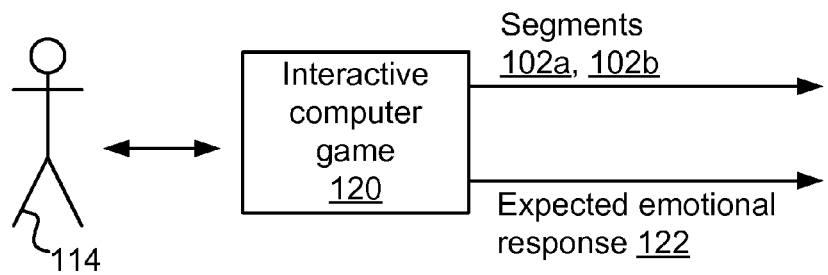
FIG. 15 illustrates one embodiment of a computer game that outputs segments of content and information about the expected emotional response to the segments.

FIG. 15 is a schematic illustration of an embodiment comprising a system that includes a computer game 120 that outputs segments of content 102a and 102b, and information 122 about the expected emotional response to the segments of content 102a and/or 102b. Optionally, the user 114 provides the interactive computer game 120 with input that influences events and/or characters in the computer game. Optionally, the segments 102a and 102b are displayed to the user 114 and/or are provided to the content ERA 104, possibly after undergoing some form of processing (e.g., feature extraction). Optionally, the information 122 about the expected emotional response is provided to the content ERA 104 in order to assist with the analysis of the segments 102a and 102b, and/or the information 122 is provided to the Measurement ERP 118 to improve its performance.

With computer games there are often many opportunities to substantially instantaneously alter how the game proceeds (e.g., difficulty of missions, appearance of characters). Therefore, being able to measure the affective response of the user 114 to content generated by the computer game 120 can be beneficial since it can help guide the system towards alterations that can improve the user's playing experience. For example, if the user's affective response indicates that the user is losing interest and is not excited by playing at a certain level of difficulty, the game can increase the difficulty and add surprising effects and/or plot twists in order to make the game more exciting for the user.

In one example, the computer game 120 provides the content ERA 104 with context information regarding an event in the game that is related to the segments of content 102a and 102b. For instance, the computer game may provide the content ERA with information indicative of the fact that the user 114 has been playing the same level for a long time, which may indicate that the user might be getting bored and/or frustrated with the game. In another example, the computer game 120 provides the content ERA 104 with information regarding the status of events in the game not represented in the analyzed content (such as the state of other characters in the game, and/or how the user 114 stands with respect to completing a mission). This information can provide context and assist the content ERA in determining the user's expected emotional response to the content, and thus improve the accuracy of selection of appropriate modes of operation for measuring the affective response to different segments of content. In yet another example, the computer game 120 includes a character whose actions are controlled at least partially by the user, and the information provided by the game to the content ERA 104 is related to the actions of the character and/or to the fate of character in the game.

In one embodiment, the functionality of the content ERA 104 is included in the interactive computer game 120. In this embodiment, the computer game provides indications to the controller 108 that selects a mode of operation for the device 112. In another embodiment, the functionality of both the content ERA 104 and the controller 108 are included in the interactive computer game 120. In this case, the hardware of the computer game may control the device 112.

In one embodiment, the system 100 includes a measurement Emotional Response Predictor (measurement ERP) configured to predict the user's emotional response from data comprising measurements 113, which may be measurements of affective response. Optionally, the measurements 113 are processed prior to being sent to the measurement ERP 118 for prediction. For example, the measurements 113 may undergo filtering and/or feature extraction. Additionally, the measurement ERP 118 may be provided with information generated by the content ERA's 104 analysis of a segment of content, such as the indication 106a or 106b. The measurement ERP 118 may utilize this information for generating its prediction of the user's emotional response.

In one embodiment, the system 100 further includes a module for training an emotional response predictor. The measurements 113 of the user's affective response to a segment of content may be forwarded to the module to be used for creating training samples for training the predictor. Additionally, the measurements 113 may be processed prior to being sent to the module to be used for training; for instance, the measurements may undergo filtering and/or feature extraction in order to produce feature values that are included in one or more training samples utilized by the module. Optionally, the module is provided with indications generated by the content ERA 104, and/or other information generated by the content ERA, which are utilized to create a label for one or more training samples.

Figure 13:
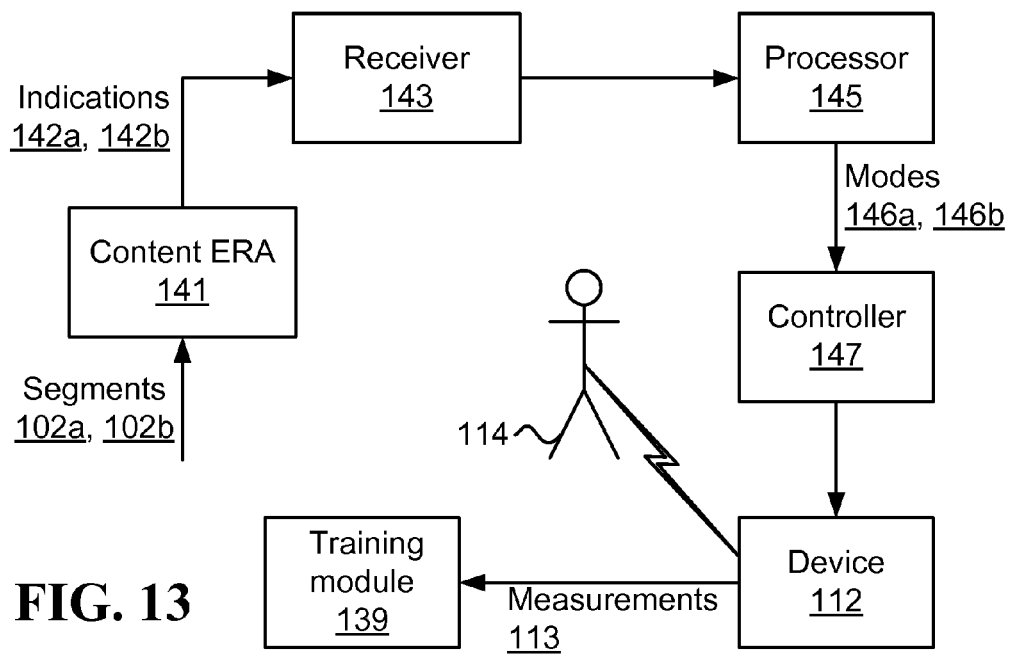
FIG. 13 illustrates one embodiment of an apparatus configured to reduce power consumed measuring affective response.

FIG. 13 illustrates one embodiment of an apparatus configured to power consumed measuring affective response. The apparatus includes at least a receiver 143, a processor 145, and a controller 147.

The receiver 143 is configured to receive a first indication 142a and a second indication 142b from a content ERA 141. Optionally, the content ERA 141 produces the indications 142a and 142b by analyzing segments of content 102a and 102b.

In one embodiment, the first indication 142a indicates that a first value, which is a function of emotional response the first segment 102a, does not reach a first predetermined threshold. Additionally, the second indication 142b indicates that a second value, which is a function of emotional response to the second segment 102b, does reach a second predetermined threshold. Optionally, the first and/or second values are derived by utilizing a content ERP that predicts emotional response to the first and/or second segments. Optionally, the first and second values may represent confidence levels in predictions of emotional response to the first and second segments, types of emotional response to the first and second segments, magnitude of emotional responses to the first and second segments, and/or benefits from measuring affective response to the first and second segments.

The processor 145 is configured to select, based on indications 142a and 142b received by the receiver 143, a first mode of operation 146a and a second mode of operation 146b, for the device 112 for measuring affective responses of the user to the first segment 102a and the second segment 102b, respectively.

In one embodiment, the controller 147 is configured to manage power consumption of the device 112 according to the mode of operation selected by the processor 145. Optionally, managing the power consumption of the device is achieved by configuring the device 112 to operate in a certain mode of operation, such as the first mode 146a or the second mode 146b. Optionally, the first mode 146a and the second mode 146b are selected such that per unit of measurement time, the power consumed by the device 112 measuring the affective response of the user 114 to the first segment 102a is significantly lower than the power consumed by the device 112 measuring the affective response of the user 114 to the second segment 102b. Thus, configuring the device 112 to operate in the first and/or second modes of operation to measure affective response of the user to at least some of the segments may result in a reduction of power consumed by the device 112.

In one embodiment, a training module 139 configured to train an emotional response predictor such as a content ERP or a measurement ERP receives measurements 113 of the user 114 taken by the device 112. Optionally, the training module 139 receives the indication 142b and utilizes to generate a training sample comprising measurements of the affective response of the user 114 to the second segment 102b and a label derived from the indication 142a representing the expected emotional response to the second segment 102b.

In one embodiment, a system configured to reduce power consumption according to analysis of content, comprising: a content emotional response analyzer (content ERA) configured to: receive a first segment of content, analyze the first segment, and output a first indication that a first value related to a predicted emotional response to the first segment does not reach a first predetermined threshold; and a controller configured to select, based on the first indication, a first mode of operation for a device for measuring affective response of a user to the first segment; the content ERA is further configured to: receive a second segment of content, analyze the second segment, and output a second indication that a second value related to a predicted emotional response to the second segment reaches a second predetermined threshold; the controller is further configured to select, based on the second indication, a second mode of operation for the device for measuring affective response of the user to the second segment; wherein the device is configured to consume significantly less power while operating in the first mode of operation compared to the power it is configured to consume while operating in the second mode of operation. Optionally, the first and second predetermined thresholds represent first and second confidence levels in predictions of emotional response, respectively; and wherein the first and second values represent confidence in predictions of emotional response to the first and second segments, respectively; whereby the first mode of operation is selected when the first indication indicates that confidence in a prediction of emotional response to the first segment does not reach the first confidence level, and the second mode of operation is selected when the second indication indicates that confidence in a prediction of emotional response to the second segment does reach the second confidence level. Optionally, the first and second predetermined thresholds represent first and second magnitudes of change in affective response, respectively; and wherein the first and second values represent predicted changes in affective response due to exposure to the first and second segments, respectively; whereby the first mode of operation is selected when the first indication indicates that a predicted change in affective response due to exposure to the first segment does not reach the first magnitude, and the second mode of operation is selected when the second indication indicates that a predicted change in affective response due to exposure to the second segment does reach the second magnitude. Optionally, the first and second predetermined thresholds represent first and second benefit levels, respectively; and wherein the first and second values represent predicted benefits to measuring affective response to the first and second segments, respectively; whereby the first mode of operation is selected when the first indication indicates that a predicted benefit of measuring affective response to the first segment does not reach the first benefit level, and the second mode of operation is selected when the second indication indicates that a benefit of measuring affective response to the second segment does reach the second benefit level. Optionally, the first and second segments comprise visual content, and being exposed to the first and second segments is achieved by viewing the first and second segments. Optionally, the first and second segments comprise data representing text, and the content ERA utilizes semantic analysis of the text to produce the first and second indications. Optionally, the device is battery powered and is one or more of the following: a physiological sensor, and an image capturing device. Optionally, the system further comprises a measurement emotional response predictor (measurement ERP) configured to predict emotional response of the user from data comprising the measurements of the device. Optionally, the first and second segments are received from a computer game that further provides information about expected emotional response to the first and second segments.

In one embodiment, a method for reducing power consumed measuring affective response, comprising: receiving a first indication derived from analysis of a first segment of content; determining that the first indication indicates that a first value related to a prediction of emotional response to the first segment does not reach a first predetermined threshold, and configuring a device to operate in a first mode of operation to measure affective response of a user to the first segment; receiving a second indication derived from analysis of a second segment of content; and determining that the second indication indicates that a second value related to a prediction of emotional response to the second segment reaches a second predetermined, and configuring the device to operate in a second mode of operation to measure affective response of the user to the second segment; wherein power consumed by the device, per unit of measurement time, for measuring the affective response of the user to the first segment, is significantly lower than power consumed by the device for measuring the affective response of the user to the second segment. Optionally, the first and second segments comprise data representing text, and the analysis of the first and second segments utilizes semantic analysis of the text to produce the first and second indications. Optionally, power consumed measuring the user with the device while operating in the first mode of operation is substantially zero; whereby power consumption of substantially zero is achieved by substantially not measuring the user with the device. Optionally, the method further comprises forwarding, to a module that trains an emotional response model, a description of expected emotional response to the second segment and data obtained from the measuring the affective response of the user to the second segment. Optionally, the first and second indications indicate confidence in predictions of emotional response to the first and second segments, respectively; whereby based on the first indication, it is determined that confidence in the prediction of the emotional response to the first segment does not reach the first predetermined threshold, and based on the second indication, it is determined that confidence in the prediction of the emotional response to the second segment does reach the second predetermined threshold. Optionally, the first and second indications indicate expected magnitudes of change in affective response due to exposure to the first and second segments, respectively; whereby based on the first indication, it is determined that expected magnitude of change in affective response due to exposure to the first segment does not reach the first predetermined threshold, and based on the second indication, it is determined that expected magnitude of change to affective response due to exposure to the second segment does reach the second predetermined threshold. Optionally, the first and second indications indicate how beneficial it is to measure the affective response to the first and second segments, respectively; whereby based on the first indication, it is determined that benefit from measuring the affective response to the first segment does not reach the first predetermined threshold, and based on the second indication it is determined that benefit from measuring affective response to the second segment does reach the second predetermined threshold. Optionally, the device is battery powered, and measuring the affective response of the user comprises utilizing the device to take physiological measurements of the user. Optionally, the device is part of a battery powered image capturing device, and measuring the affective response of the user comprises utilizing the device to capture an image of the user. Optionally, the second segment is received from an interactive computer game that further provides information about expected emotional response to the second segment.

In one embodiment, an apparatus configured to reduce power consumed measuring affective response, comprising: a receiver configured to receive first and second indications generated from analysis of first and second segments of content, respectively; wherein the first indication indicates that a first value, which is a function of emotional response the first segment, does not reach a first predetermined threshold; and wherein the second indication indicates that a second value, which is a function of emotional response to the second segment, reaches a second predetermined threshold; a processor configured to select, based on the first and second indications, first and second modes of operation for device for measuring affective responses of a user to the first and second segments, respectively; and a controller configured to manage power consumption of the device according to a mode of operation selected by the processor; wherein, per unit of measurement time, the power consumed by the device for measuring the affective response of the user to the first segment is significantly lower than the power consumed by the device for measuring the affective response of the user to the second segment.

Figure 16:
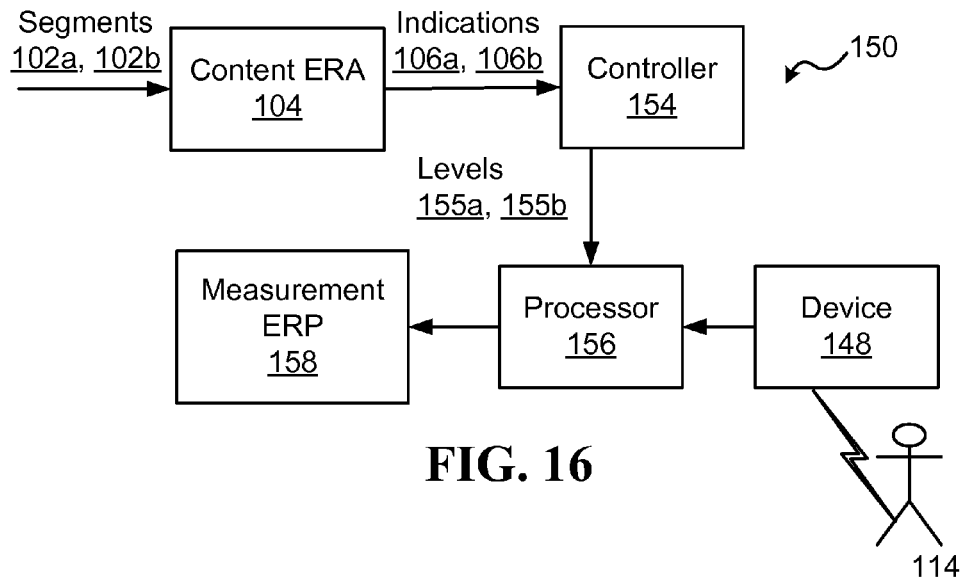
FIG. 16 illustrates one embodiment of a system configured to reduce computational load involved in processing measurements of affective response of a user to content.

FIG. 16 illustrates one embodiment of a system 150 configured to reduce computational load involved in processing affective response measurements. The system includes at least at least a content Emotional Response Analyzer (content ERA) 104, a controller 154, and a processor 156.

In one embodiment, the content ERA 104 may outputs the first indication 106a and the second indication 106b, which may be conveyed to the controller 154. The controller 154 is configured to select a processing level for the processor 156, based on the indications. Optionally, the indications 106a and 106b may be received separately by the controller 154 (e.g., each indication is communicated in a separate communication), or may be received jointly by it (e.g., both indications are communicated to the controller 154 in the same communication). In one example, based on the indication 106a, the controller 154 is configured to select for the processor 156 a first processing level 155a, and based on the second indication 106b, the controller 154 is configured to select for the processor 156 a second processing level 155b. Optionally, at least during some of the time it operates at the first processing level 155a and/or the second processing level 155b, the processor 156 processes affective response measurements taken with a device 148. Optionally, at least some of the affective response measurements taken by the device 148 are measurements of the affective response of the user 114 to the segment of contents 102a and/or 102b.

In one embodiment, the indication 106a and/or the indication 106b may be interpreted as operating instructions for another module in the system, such as the controller 154 and/or the processor 156. For example, the indications 106a and/or 106b may be interpreted as instructions to the processor 156 to run a certain procedure and/or as an instruction to the controller 154 to select a specific processing level for the processor 156. In another example, the indications 106a and/or 106b may indicate how long the processor 156 should process data and/or specify a period of time (e.g., by providing start and end times) in which the processor 156 should process data.

In some embodiments, a device, such as the device 148, is used to measure affective response of the user 114. Optionally, the device includes a sensor and/or is a sensor. Optionally, the sensor may be a physiological sensor (e.g., a sensor that measures heart rate, galvanic skin response, and/or brainwave activity), and/or a sensor that measures the user's behavior (e.g., a camera, and/or a motion detector). Optionally, the device may include additional components to the sensor, such as a memory, a processor, a battery, a transmitter, and/or a receiver. Optionally, the device may be coupled to a user. Herein a phrase like "a device coupled to a user" refers to a device that is attached to the user (e.g., on clothing, a bracelet, headgear), in contact with the user's body (e.g., a sticker on a user's skin), and/or implanted in the user's body (e.g., an implanted heart-rate sensor or implanted EEG electrodes).

In some embodiments, the device 148 may output measurements of the affective response of the user 114. Optionally, the measurements are forwarded to the processor 156 and undergo processing, such as filtering, normalization, signal processing, feature extraction, encryption, and/or compression. Additionally, affective response measurements processed by the processor 156 may be forwarded to other modules of the system such as the measurement Emotional Response Predictor (measurement ERP) 158. Optionally, some of the measurements from the device 148 are forwarded to the measurement ERP 158, and may optionally include raw measurement values (i.e., the values undergo very little transformation prior to their output).

In some embodiments, the controller 154 is configured to utilize the indications 106a and/or 106b to select a processing level for the processor 206 from a set comprising a first processing level 155a and a second processing level 155b. The processing level may have preset operation parameters (such as procedures to run, duration of processing, and/or volume of data to process). Alternatively or additionally, the processing level may include certain operation parameters that are computed by the controller using the indications 106a and/or 106b, and/or other data that is available at the time of computation.

In one example, the controller chooses a processing level for the processor from two processing level: a standby processing level and a normal processing level. In this example, as is the case with many processors, when a processor operates at the standby processing level, it substantially doesn't process data, but monitors communication channels to receive instructions (such as a wake up signal). When operating at the standby processing level, the processor utilizes significantly fewer computation cycles compared to when it operates at the normal processing level. For example, a processor in a standby mode my run at a lower clock frequency or utilize fewer computational cores.

In another example, the affective response of the user 114 is recorded with a camera. The Indications generated by a content ERA and/or a semantic analyzer may include values that is indicative of a predicted interest level of a user in segments of content. According to the predicted interest level, processing levels with different parameters may be selected for processing the video images of the user 114. For example, if an indication indicates that the predicted interest level is low, the controller may select the first processing level in which the processor may perform basic filtering and/or low-level feature extraction from the video; such rudimentary processing may be required for identifying the genre of video from low level features. However, if an indication indicates the predicted interest level is high, a second processing level may be selected in which the processor performs advanced compute-intensive procedures such as object, face, and/or gesture recognition in order to identify things such as the objects, people, and/or emotions expressed in the recorded video. Thus, in this example, the computational load of the processor operating at the first processing level is significantly lower than the computational load of the processor operating at the second processing level.

In one embodiment, as part of its analysis of the segment of content, the content ERA 104 and/or the semantic analyzer 173 predicts a value describing the expected emotional response of a user to the segment of content. An indication generated by the content ERA 104 and/or the semantic analyzer 173 may include information regarding the expected emotional response and is conveyed via indications that may be indicative of whether the expected emotional response reaches a predetermined threshold. Based on the indications, different processing levels may be selected. The indications may indicate on a scale of 1 to 10 (10 being the extremely frightened), how frightened a user is likely to get from viewing a segment of content that is a video clip. Based on a received indication, a controller selects a certain processing level for processing of affective response measurements of the user 114 (e.g., brainwaves acquired by an EEG sensor). In order to save computational resources, the system may elect to process the affective response measurements of the user 114 mainly when the emotional response is expected to reach a predetermined threshold, such as 5 on the scale of 1 to 10. In this case, processing the measurements may help pinpoint what elements in the content led to the user's affective response. However, if the predicted value is too low, it is not likely that the clip is going to scare the user 114 very much, so the system chooses not to waste computational resources on confirming that. Thus, if the expected emotional response is below the threshold, the controller may select a first processing level, which may be a standby processing level, for the processor. However, if the expected emotional response reaches the predetermined threshold, the controller may select the second processing level, which may be a regular processing level, for the processor. In the normal processing level, the processor utilizes significantly more computational cycles than it does when it operates at the standby processing level. Consequently, the computational load of the processor is significantly lower when operating at the first processing level, compared to when it operates at the second processing level.

In one embodiment, a processing level may be implicitly or explicitly selected by the controller. For example, an implicit selection of the processing level may occur when the controller does not receive an indication from the content ERA (e.g., when the indication has not been changed since the last signaling, and/or when the indication is a default indication); an explicit selection of the processing level may occur when an indication received by the controller explicitly mentions the processing level that is to be set by the controller.

In some embodiments, the processor 156 is configured to process measurements of affective response of the user 114, while operating at a certain processing level. The certain processing level may be selected from a set that includes at least the first processing level 155a and the second processing level 155b. The computational load of the processor may be expressed in terms of the number of computational cycles the processor utilizes to process a volume unit of data.

In one embodiment, based on the first indication 106a, the controller 154 selects the first processing level 155a, with a low computational load, at which the processor 156 should operate while processing measurements of affective response of the user 114 to the first segment 102a. In addition, based on the second indication 106b, the controller 154 selects the second processing level 155b, with a higher computational load, at which the processor 156 should operate while processing measurements of affective response of the user 114 to the second segment 102b. Consequently, per volume unit of measurement data, the number of computation cycles utilized for processing measurements of affective response of a user to the first segment, is significantly lower than number of computation cycles utilized for processing measurements of affective response of the user to the second segment.

It is to be noted that a term such as "significantly lower", when referring to the number of computation cycles, refers to a difference greater than a factor of two between the lower and higher numbers of computation cycles being compared. To illustrate this point, consider a processor capable of operating at two processing levels: A and B. When it is stated that the processor utilizes a significantly lower number of computation cycles while operating at processing level A compared to the number of computation cycles it utilizes while operating at processing level B, it is meant that the number of computation cycles utilized by the processor for processing data, per volume unit of data, while operating at processing level A, is less than half of the number of computation cycles utilized by the processor, per volume unit of measurement data, when it operates at processing level B.

It is to be noted that a phrase like "computation cycles per volume unit of measurement data" refers to the number of computational cycles used to process a fixed volume of affective response measurement data (such as a byte, a kilobyte, a megabyte, or a gigabyte). The value representing the number of computation cycles utilized by a processor per volume unit of data is computed by dividing the total number of computation cycles utilized to process data by the volume of the data (e.g., expressed in bytes, kilobytes, or megabytes). This value serves as a normalized value that enables the comparison of computational loads of a processor operating at different processing levels, and/or different processors operating at the same or different processing levels.

A computation cycle, as used herein, refers to a pulse of a CPU's clock in which a CPU core typically performs a single simple computation operation (such as adding two numbers, or storing a value in a register). Modern CPUs with clock frequencies that are measured in Gigahertz (GHz) perform billions of computation cycles per second, and consequently are capable of performing billions of computation operations each second. In typical computational applications, the amount of computational work that goes into processing data is proportional to the volume of the data, i.e., the amount of processing time and/or computation cycles utilized to process data is a function of the volume of the data. This makes it possible to refer to the work load involved in processing data by way of the number of computation cycles a processor typically utilizes to process a certain volume unit of data.

In one embodiment, two processing levels may be considered different processing levels, and be referred to as "a first processing level" and "a second processing level" in the claims, if the difference, per volume unit of data, between the number of computational cycles utilized by a processor processing measurements at the first processing level and the number of computational cycles utilized by a processor processing measurements at the second processing level, is significant. If the difference is not significant, then the two processing levels are not "a first processing level" and "a second processing level" as used in the claims. In one example, a significant difference refers to a difference of at least 100% in the number of computation cycles, e.g., the processor 156 processing 1 kilobyte of measurement data at the second processing level 155b utilizes at least double the number of computation cycles as the processor 156 utilizes to process the same 1 kilobyte of data at the first processing level 155a. In another example, a significant difference refers to a difference of at least 1000% in the number of computation cycles utilized by the first and second processing levels. In yet another example, if when processing measurement data at the first processing level 155a, the processor 156 utilizes essentially zero computation cycles (e.g., it doesn't process the measurement data), and at the second processing level 155b, the processor 156 does not utilize essentially zero computation cycles (e.g., it performs some processing of the data), then the difference between the processing levels 155a and 155b is significant.

There may be various hardware configurations that involve the content ERA 104, the controller 154, and/or the processor

156. In one example, the controller 154 may be implemented, at least in part, as hardware that is part of the processor 156. In another example, the controller 154 may be implemented, at least in part, as software that runs on the processor 156. In another example, the controller 154 may be implemented as part of the content ERA 104. In still another example, the controller 154, the processor 156, and the content ERA 104 are combined in a certain device. Optionally, the certain device is battery powered (e.g., a smart phone). Optionally, the device 148 is also part of the certain device and/or draws power from the certain device's power supply.

In one embodiment, the processor 156 is embedded in a certain battery powered device, and the measurements of affective response of the user to the second segment include physiological measurements of the user taken with the device 148 that includes a physiological sensor. Additionally or alternatively, the measurements of affective response of the user to the second segment comprise images of the user taken with an image capturing device.

In one embodiment, a segment of content may include visual content, such as images and/or video. A content delivery module may be used to expose the segments to the user 114. Optionally, the device 148 has at least one component that is not shared with the content delivery module. Additionally or alternatively, the device 148 may include at least one component that is shared with the content delivery module. Additionally or alternatively, the device 148 may be a battery powered sensor, and the content delivery module and the battery powered sensor are realized in the same device.

In one embodiment, the controller 154 and/or the content ERA 104 are implemented at least in part, as software running on a remote processor, such as a cloud-based server. For example, a cloud-based service can be used to analyze content that is to be presented to the user 114, such as video to be streamed to the user's display. According to indications of the content ERA's analysis, the controller 154, running on the cloud-based service, may send different operating instructions to the processor 156, such as specifying a processing level for the processor 156 at to operate while processing affective response measurements of the user.

In one embodiment, the functionality of the content ERA 104 is included in the interactive computer game 120 illustrated in FIG. 15. In this embodiment, the computer game provides indications to the controller 154 that selects a processing level for the processor 156. In another embodiment, the functionality of both the content ERA 104 and the controller 154 are included in the interactive computer game 120. In this case, the hardware of the computer game may control the device 148.

In one embodiment, the system 150 includes a measurement Emotional Response Predictor (measurement ERP) 158 configured to predict the user's emotional response from data comprising measurements of affective response. Optionally, the measurements are processed by the processor 156 prior to being sent to the measurement ERP 158 for prediction. For example, the measurements may undergo filtering and/or feature extraction. Additionally, the measurement ERP 158 may be provided with information generated by the content ERA's 104 analysis of segment of content, such as the indications 106a and/or 106b. The measurement ERP 158 may utilize this information for generating its prediction of the user's emotional response.

In one embodiment, the system 150 further includes a module for training an emotional response predictor. The measurements of the user's affective response to segments of content may be forwarded to the module to be used for creating training samples for training the predictor. Additionally, the measurements may be processed by the processor 156 prior to being sent to the module to be used for training; for instance, the measurements may undergo filtering and/or feature extraction in order to produce feature values that are included in one or more training samples utilized by the module. Optionally, the module is provided with the indications 106a and/or 106b, and/or other information generated by the content ERA 104, which are utilized to create a label for one or more training samples.

Figure 17:
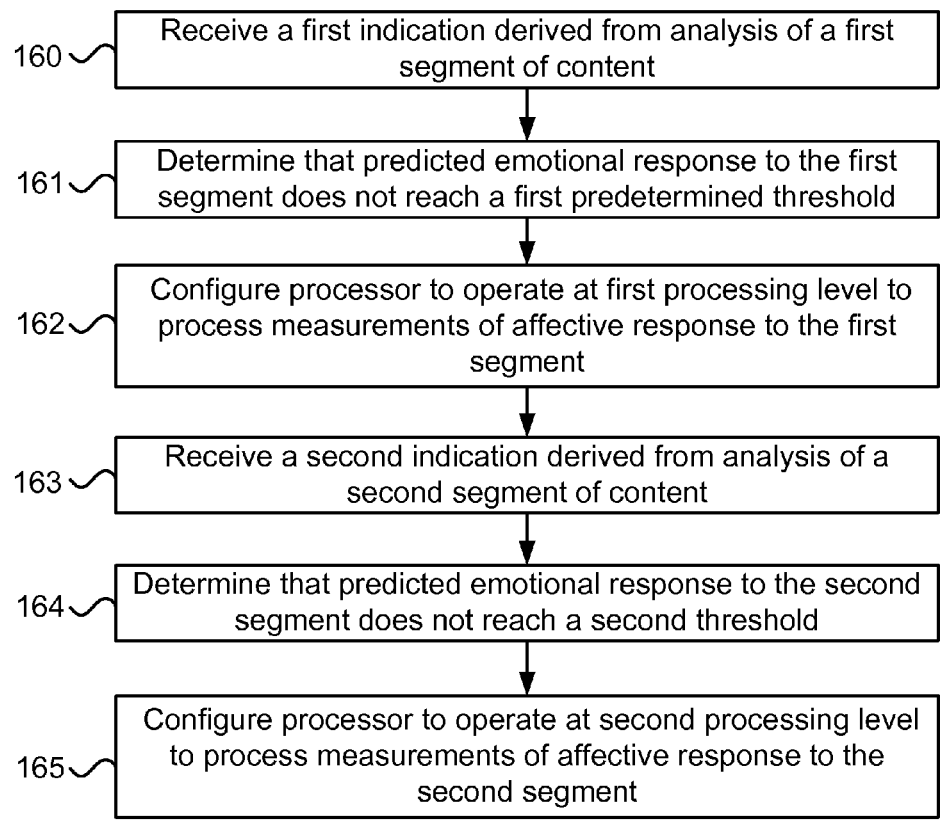
FIG. 17 illustrates one embodiment of a method for reducing computational load of processing measurements of affective response of a user to content.

FIG. 17 illustrates one embodiment of a method for reducing computational load of processing measurements of affective response to content. The method includes the following steps:

In step 160, receiving a first indication derived from analysis of a first segment of content.

In step 161, determining that the first indication indicates that a first value related to a prediction of emotional response to the first segment does not reach a first predetermined threshold.

In step 162, configuring a processor, based on the first indication, to operate at a first processing level to process measurements of affective response of the user to the first segment.

In step 163, receiving a second indication derived from analysis of a second segment of content.

In step 164, determining that the second indication indicates that a second value related to a prediction of emotional response to the second segment does reach a second predetermined.

And in step 165, configuring the processor, based on the second indication, to operate at a second processing level to process measurements of affective response of the user to the second segment.

In one embodiment, per volume unit of measurement data, number of computation cycles utilized by the processor to process, at the first processing level, measurements of the affective response of the user to the first segment, is significantly lower than the number of computation cycles utilized by the processor to process, at the second processing level, measurements of the affective response of the user to the second segment.

In one embodiment, a processor is configured to utilize significantly less computation cycles per volume unit of data (e.g., per kilobyte of measurement data) to process data when operating in a first processing level, compared to the number of computation cycles utilized per volume unit of data when operating at a second processing level. Additionally, the processor operating at the second processing level may require significantly more time and/or consume significantly more energy compared to when the processor operates at the second processing level. Optionally, the phrase "significantly more" when referring to processing cycles, means at least double, and similarly, the phrase "significantly less" means at most half. Thus for example, by stating that "the number of computation cycles utilized for processing the measurements of affective response of a user to the first segment, is significantly lower than the number of computation cycles utilized for processing measurements of affective response of the user to the second segment", it is meant that to process the same volume of data, the processor utilizes at most half the number of computation when operating at the first processing level, compared to the number of computation it cycles it utilizes when operating at the second processing level.

In one embodiment, a processor configured to operate at a first processing level that utilizes significantly less computation cycles for processing measurements of affective response of a user to the first segment, compared to the number of computational cycles utilized by the processor for processing measurements of affective response of a user to the second segment. Optionally, the processor utilizes substantially zero computation cycles to process data when operating at the first processing level. For example, the processor is placed in a standby mode, does not receive and/or access data that includes the available measurements of affective response of a user to the first segment, and/or deletes data involving the measurements of affective response of a user to the first segment.

In one embodiment, the first and second segments are received from an interactive computer game module. The module provides information regarding an expected emotional response to the second segment, which is used in order to generate the second indication. Additionally, the computer game may also provide information regarding an expected emotional response to the first segment, which is used to generate the first indication.

In one embodiment, the first and second segments include data representing text. The analysis of the first and second segments utilizes semantic analysis of the data representing text to produce the indications that indicate whether or not the predetermined threshold is reached. Additionally, the semantic analysis may be used to generate feature values that describe the meaning of the text of the first and second segments. The feature values may be used by the content ERA to make predictions related to the emotional response to the content and/or the benefit of determining the emotional response to the first and/or second segments.

In one embodiment, a system configured to reduce computational load involved in processing measurements of affective response of a user to content, comprising: a content emotional response analyzer (content ERA) configured to: receive a first segment of content, analyze the first segment, and output a first indication indicating that a first value related to an emotional response to the first segment does not reach a first predetermined threshold; and a controller configured to select, based on the first indication, a first processing level for a processor to process measurements of affective response of the user to the first segment; the content ERA is further configured to: receive a second segment of content, analyze the second segment, and output a second indication indicating that a second value related to a prediction of emotional response to the second segment reaches a second predetermined threshold; the controller is further configured to select, based on the second indication, a second processing level for the processor to process measurements of affective response of the user to the second segment; wherein, per volume unit of measurement data, number of computation cycles utilized by the processor to process, at the first processing level, measurements of the affective response of the user to the first segment, is significantly lower than number of computation cycles utilized by the processor to process, at the second processing level, measurements of the affective response of the user to the second segment. Optionally, the first and second indications indicate confidence in predictions of emotional response to the first and second segments, respectively; whereby based on the first indication, it is determined that confidence in the prediction of the emotional response to the first segment does not reach the first predetermined threshold, and based on the second indication, it is determined that confidence in the prediction of the emotional response to the second segment does reach the second predetermined threshold. Optionally, the first and second indications indicate expected magnitudes of change in affective response due to exposure to the first and second segments, respectively; whereby based on the first indication, it is determined that expected magnitude of change in affective response due to exposure to the first segment does not reach the first predetermined threshold, and based on the second indication, it is determined that expected magnitude of change to affective response due to exposure to the second segment does reach the second predetermined threshold. Optionally, the first and second indications indicate how beneficial it is to measure the affective response to the first and second segments, respectively; whereby based on the first indication, it is determined that benefit from measuring the affective response to the first segment does not reach the first predetermine threshold, and based on the second indication it is determined that benefit from measuring affective response to the second segment does reach the second predetermined threshold. Optionally, the first and second segments comprise visual content, and being exposed to the first and second segments is achieved by viewing the first and second segments. Optionally, the first and second segments comprise data representing text, and the content ERA utilizes semantic analysis of the text to produce the first and second indications. Optionally, measurements of the affective response of the user to the first and second segments are acquired by a sensor; wherein the sensor is battery powered and is one or more of the following: a physiological sensor, and an image capturing device. Optionally, the number of computation cycles utilized to process affective response while operating at the first processing level is substantially zero; whereby utilizing substantially zero computation cycles is achieved by substantially not processing measurement of affective response. Optionally, comprising a measurement emotional response predictor (measurement ERP) configured to predict emotional response of the user from data comprising measurements of a sensor. Optionally, the first and second segments are received from a computer game that further provides information about expected emotional response to the first and second segments.

In one embodiment, a method for reducing computational load of processing measurements of affective response of a user to content, comprising: receiving a first indication derived from analysis of a first segment of content; determining that the first indication indicates that a first value related to a prediction of emotional response to the first segment does not reach a first predetermined threshold, and configuring a processor to operate at a first processing level to process measurements of affective response of the user to the first segment; receiving a second indication derived from analysis of a second segment of content; and determining that the second indication indicates that a second value related to a prediction of emotional response to the second segment reaches a second predetermined threshold, and configuring the processor to operate at a second processing level to process measurements of affective response of the user to the second segment; wherein, per volume unit of measurement data, number of computation cycles utilized by the processor to process, at the first processing level, measurements of the affective response of the user to the first segment, is significantly lower than number of computation cycles utilized by the processor to process, at the second processing level, measurements of the affective response of the user to the second segment. Optionally, the first and second predetermined thresholds represent first and second confidence levels in predictions of emotional response, respectively; and wherein the first and second values represent confidence in predictions of emotional response to the first and second segments, respectively; whereby the processor is configured to operate at the first processing level to process measurements of affective response of the user to the first segment when the first indication indicates that confidence in a prediction of emotional response to the first segment does not reach the first confidence level, and the processor is configured to operate at the second processing level to process measurements of affective response of the user to the second segment when the second indication indicates that confidence in a prediction of emotional response to the second segment does reach the second confidence level. Optionally, the first and second predetermined thresholds represent first and second magnitudes of change in affective response, respectively; and wherein the first and second values represent predicted changes in affective response due to exposure to the first and second segments, respectively; whereby the processor is configured to operate at the first processing level to process measurements of affective response of the user to the first segment when the first indication indicates that a predicted change in affective response due to exposure to the first segment does not reach the first magnitude, and the processor is configured to operate at the second processing level to process measurements of affective response of the user to the second segment when the second indication indicates that a predicted change in affective response due to exposure to the second segment does reach the second magnitude. Optionally, the first and second predetermined thresholds represent first and second benefit levels, respectively; and wherein the first and second values represent predicted benefits to measuring affective response to the first and second segments, respectively; whereby the processor is configured to operate at the first processing level to process measurements of affective response of the user to the first segment when the first indication indicates that a benefit of measuring affective response to the first segment does not reach the first benefit level, and the processor is configured to operate at the second processing level to process measurements of affective response of the user to the second segment when the second indication indicates that a benefit of measuring affective response to the second segment does reach the second benefit level. Optionally, the first and second segments comprise data representing text, and the analysis of the first and second segments utilizes semantic analysis of the text to determine whether the predetermined threshold is reached. Optionally, the number of computation cycles utilized to process the measurements at the first processing level is substantially zero; whereby utilizing substantially zero computation cycles is achieved by substantially not processing measurements of affective response. Optionally, the method further comprises forwarding, to a module that trains an emotional response model, a description of expected emotional response to the second segment and data obtained from processing the measurements of the affective response of the user to the second segment. Optionally, the method further comprises forwarding data obtained from processing the measurements of the affective response of the user to the second segment to a module that predicts emotional response. Optionally, the second segment is received from an interactive computer game that further provides information about expected emotional response to the second segment.

In one embodiment, a system configured to reduce computational load involved in predicting emotional response to content, comprising: a content emotional response analyzer (content ERA) configured to: receive a first segment of content, analyze the first segment, and output a first indication that a first value related to a predicted emotional response to the first segment does not reach a first predetermined threshold; the content ERA is further configured to: receive a second segment of content, analyze the second segment, and output a second indication that a second value related to a predicted emotional response to the second segment reaches a second predetermined threshold; a controller configured to select, based on the first indication, a first processing level for a processor to process measurements of affective response of a user to the first segment; the controller is further configured to select, based on the second indication, a second processing level for the processor to process measurements of affective response of the user to the second segment; wherein, per volume unit of measurement data, number of computation cycles utilized by the processor to process, at the first processing level, measurements of the affective response of the user to the first segment, is significantly lower than number of computation cycles utilized by the processor to process, at the second processing level, measurements of the affective response of the user to the second segment; and a measurement emotional response predictor configured to predict emotional response of the user to the second segment of content from data comprising the measurements of the affective response of the user to the second segment, which were processed by the processor.

Figure 18:
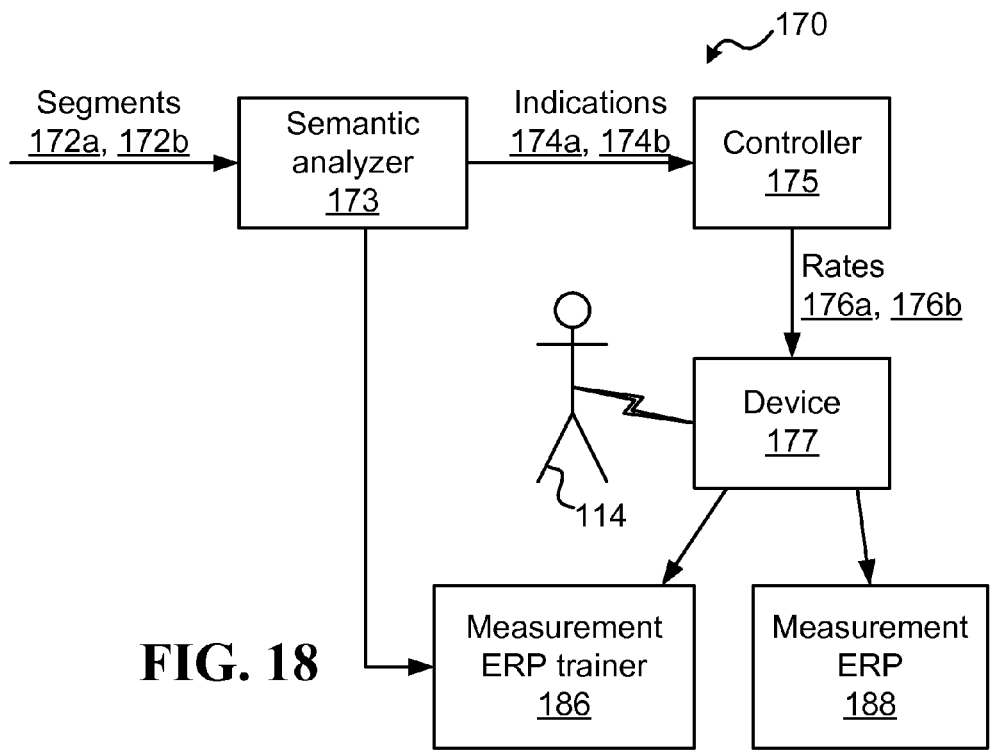
FIG. 18 illustrates one embodiment of a system configured to use semantic analysis to measure affective response at varying measuring rates.

FIG. 18 illustrates one embodiment of a system 170 configured to measure affective response at varying rates that are set according to semantic analysis of text. The system includes at least a semantic analyzer 173 and a controller 175.

In one embodiment, the semantic analyzer 173 is configured to: (i) receive a first segment 172a of content and a second segment 172b of content, (ii) analyze the segments 172a and 172b utilizing semantic analysis, and (iii) output a first indication 174a and a second indication 174b. The first segment 172a and second segment 172b include data representing text. The first indication 174a indicates that a first value related to a prediction of emotional response to the first segment 172a does not reach a first predetermined threshold. The second indication 174b indicates that a second value related to a prediction of emotional response to the second segment 172b does reach a second predetermined threshold.

In one embodiment, the segment of content might undergo processing before being received by the semantic analyzer 173 and/or before the semantic analyzer 173 analyzes the segment of content. Thus, data derived from the segment of content, which gets analyzed by the semantic analyzer 173, may not be the same data presented to the user 114. For example, a segment of content that includes video may undergo feature extraction prior to being sent to the semantic analyzer 173 (e.g., in order to identify object, people, and/or the genre). In this example, the exposure of the user 114 to the segment of content involves viewing a video clip. However, the semantic analyzer 173 receives related data, such as feature values corresponding to objects, people, and/or the genre of the video, and performs its analysis on that data. In another example, a segment of content is converted to features representing words (e.g., using a "bag of words" model).

Being able to determine the meaning of a segment of content can assist algorithms to predict an emotional response to the segment of content. In some embodiments, the semantic analyzer 173 utilizes semantic analysis methods to analyze the segments of content 172a and 172b. Optionally, the semantic analysis methods are used to generate feature values that describe some aspects of the meaning of the segments 172a and 172b. Additionally, the feature values may be used by algorithms that predict an emotional response to the segment 172a and 172b.

In one example, the semantic analyzer may utilize methods such as Latent Semantic Analysis (LSA) or latent semantic indexing of text in order to associate a segment of content with concepts and/or categories corresponding to its meaning. In another example, the semantic analyzer utilizes a lexicon that associates words and/or phrases with core emotions. The information regarding which emotions are expressed in a segment of content can be helpful in determining the meaning and/or sentiment expressed in the segment of content. In yet another example, the semantic analyzer utilizes a predictor of emotions expressed in text. Information regarding the emotion expressed in the segment of content can help to predict a user's emotional response to the content (e.g., a user might enjoy segment that expresses affection, but dislike a segment that expresses confrontation).

In one embodiment, the semantic analyzer evaluates the segment a short period before the user 114 is exposed to the segment. For example, the semantic analyzer evaluates the second segment 172b less than one minute before the user 114 is exposed to the second segment 172b. Optionally, the segment 172b is generated shortly before it is analyzed. For example, the segment 172b is generated by a computer game, and the content of the segment 172b depends at least in part on actions taken by the user.

In one embodiment, if the evaluation of the semantic analyzer 173 determines that a predefined threshold related to an emotional response is not reached, this fact may be communicated to a module that generated the segment of content. The module that generated the segment of content may modify the segment of content so that the predefined threshold may be reached in a future evaluation performed by the semantic analyzer on the modified segment of content.

In one embodiment, the semantic analyzer utilizes a content ERP (Emotional Response Predictor) that predicts an emotional response to a segment of content. Optionally, the content ERP utilizes feature values derived using semantic analysis methods.

In one embodiment, the semantic analyzer 173 may generate the first indication 174a and the second indication 174b, which are conveyed to the controller 175. The controller 175 is configured to select a measuring rate for a device 177, based on a received indication. For example, based on the indication 174a, the controller 175 may be configured to select for the device 177 a first measuring rate 176a, and based on the second indication 174b, the controller 175 may be configured to select for the device 177 a second measuring rate 176b. Optionally, while operating according to the measuring rate 176a, the device 177 measures the affective response of the user 114 to the first segment 102a. Optionally, while operating according to the second measuring rate 176b, the device 177 measures the affective response of the user 114 to the second segment 102b.

In one embodiment, the semantic analyzer 173 utilizes a prediction of emotional response to a segment of content, and provides in a corresponding indication one or more values related to the prediction. Optionally, to make the prediction, the semantic analyzer 173 utilizes a personalized model that provides indications optimized for the user 114. Alternatively, to make the prediction, the semantic analyzer utilizes a general model that is not personalized for the user 114.

In one embodiment, the indication 174a and/or the indication 174b may be interpreted as operating instructions for another module in a system, such as the controller 175 and/or the device 177. For example, the indications may be interpreted as an instruction to turn the device 177 on or off, and/or to select a specific measuring rate for the device 177. In another example, the indications may indicate how long the device 177 should be operated and/or specifies a period of time (e.g., by providing start and end times) in which a device 177 should operate.

In some embodiments, the first indication 174a indicates whether a first value, related to a prediction of emotional response to the first segment 172a, reaches a first predetermined threshold. Additionally, the second indication 174b may indicate whether a second value, related to a prediction of emotional response to the second segment 172b, reaches a second predetermined threshold. Optionally, the prediction of emotional response to the first segment 172a is generated as part of the analysis of the first segment 172a by the semantic analyzer 173. Optionally, the prediction of emotional response to the second segment 172b is generated as part of the analysis of the second segment 172b by the semantic analyzer. Optionally, a content emotional response predictor (content ERP) is utilized to make the prediction of emotional response to the first segment 172a and/or the prediction of emotional response to the second segment 172b. Optionally, a content emotional response analyzer (content ERA) is utilized by the semantic analyzer 173 in its analysis of segments of content.

In some embodiments, a device, such as the device 177, is used to measure affective response of the user 114. Optionally, the device includes a sensor and/or is a sensor. Optionally, the sensor may be a physiological sensor (e.g., a sensor that measures heart rate, galvanic skin response, and/or brainwave activity), and/or a sensor that measures the user's behavior (e.g., a camera, and/or a motion detector). Optionally, the device may include additional components to the sensor, such as a memory, a processor, a battery, a transmitter, and/or a receiver. Optionally, the device may be coupled to a user.

In some embodiments, the device 177 may output measurements of the affective response of the user 114. Optionally, the measurements are forwarded to other modules of the system such as the measurement Emotional Response Predictor (measurement ERP) 188. Optionally, some of the measurements of the device 177 may include raw measurement values (i.e., the values undergo very little transformation prior to their output). Alternatively or additionally, the measurements may include processed values such as values that are the result of filtering, normalization, signal processing, feature extraction, encryption, and/or compression.

In some embodiments, a measuring rate the controller 175 selects, such as the first rate 176a and/or the second rate 176b, has preset operation parameters (such as voltage, resolution, sampling rate). Alternatively or additionally, the measuring rate may include certain operation parameters that are computed by the controller according to the received indication and/or other data that is available at the time of computation.

In one embodiment, a measuring rate is characterized by one or more of the following aspects: (i) the number of times, per unit of measurement time (e.g., per minute), in which a device is configured to take measurements; (ii) the volume of data, per unit of measurement time, that the device is configured to generate while measuring; and/or (iii) the amount of power (e.g., wattage), the device is configured to draw per unit of measurement time.

It is to be noted that the phrase "per unit of measurement time" refers to a period of time in which the device may be operated and used to measure affective response. In this phrase, "measurement time" refers to a slot of time, during which the user may be measured with the device; however, in some cases, the system may elect not to measure the user with the device (e.g., by keeping it off or in standby mode). In one example, a unit of measurement time may be one second or one minute.

Normalizing values according to a unit of measurement time enables the comparison of amounts of measurements. For example, referring to the number of measurements per unit of measurement time enables the comparison between the number of measurements taken by different devices, or measurements of the same device during different durations, and/or while operating at different measuring rates.

In one embodiment, a unit of measurement time may refer to a contiguous period of time in which the device may operate. Thus, for example, if in a fixed period of time, such as one second, the device (or a component of the device) may rapidly alternate between being turned on and off, so that half of the time it is on and half of the time it is off, the measurement time of the device is considered to be the full second.

In some embodiments, a measuring rate for the device 177 is selected from a set comprising at least the first and measuring rate 176a and the second measuring rate 176b. While operating at the first measuring rate 176a, the device 177 takes significantly fewer measurements of affective response, per unit of measurement time, compared to the number of measurements taken by the device 177 while operating at the second measuring rate 176b. Additionally or alternatively, while operating at the first measuring rate 176a, the device 177 may generate less data and/or consume less power, per unit of measurement time, compared to when it operates at the second measuring rate.

Consequently, by selecting a measuring rate with respect to the information in indications, over time, the system 170 may reduce the total number of measurements taken by the device 177, the total amount of data generated by the device 177, and/or the total power consumed by the device 177. Additionally, this may affect other modules in the system, such as reducing the power consumption of other elements that participate in the processing of the affective response measurements, such as a processor that processes measurement data.

A device, such as the device 177, may operate according to different measuring rates, which can dramatically change the number of measurements the device is configured to take, the amount of data the device generates, and/or its power consumption. For example, the controller can cause the device to change from an operable mode to a substantially inoperable mode (or standby mode), in which it takes significantly fewer measurements, and vice versa. It is to be noted that a term such as "significantly less" or "significantly lower", when referring to values such as a number of measurements taken, a volume of data generated, and/or power consumed, refers to a difference greater than a factor of two between the lower and higher values being compared. To illustrate this point, consider a device 177 capable of operating at two measuring rates: A and B. When it is stated that the device takes significantly fewer measurements while operating at measuring rate A, compared to the measurements the device takes while operating at measuring rate B, it means that the number of measurements taken by the device, per unit of measurement time, while operating in measuring rate A, is less than half of the number of measurements taken by the device, per unit of measurement time, while operating at measuring rate B. Alternatively or additionally, it may also mean that the volume of measurement data generated by the device, per unit of measurement time, while operating in measuring rate A, is less than half of the volume of measurement data generated by the device, per unit of measurement time, while operating at measuring rate B. And also, alternatively or additionally, it may mean that the amount of power consumed by the device, per unit of measurement time, while operating at measuring rate A, is less than half of the amount of power consumed by the device, per unit of measurement time, while operating at measuring rate B.

In one example, an indication generated by the semantic analyzer 173 includes a value that is indicative of a predicted interest level of a user in a segment of content. The controller 175 may select, according to the predicted interest level, parameters that define a measuring rate, and/or sample size such as a resolution of images captured by a camera. If the indication indicates that the predicted interest level is low, the controller may select the first measuring rate 176a that may be interpreted by a camera to capture low resolution images (e.g., 320×240 pixels). However, if the indication indicates the predicted interest level is high, the controller may select a second measuring rate that may be interpreted by the camera to capture high-resolution images (e.g., 1920×1080 pixels). Additionally, if an indication indicates that the interest is low, the first measuring rate 176a may configure the camera to record video images of the user at a low frame rate. However, if the interest level is predicted to be high, the second measuring rate 176b can be selected, which may be interpreted by the camera as instructions to records images at a much higher frame rate. A higher frame rate may enable more thorough analysis, such as identification of briefly lasting micro-expressions, which may help determine if the user was really interested in the content. A higher frame rate also corresponds to more measurements being taken per second, and a larger volume of image data being generated per second.

In one embodiment, as part of its analysis of the segment of content, the semantic analyzer 173 may predict a value describing the expected emotional response of a user to the segment of content. An indication, generated by the semantic analyzer 173, may include information regarding the expected emotional response, which is conveyed to the controller 175. Additionally or alternatively, the indication may be indicative of whether the expected emotional response reaches a predefined threshold; and the controller 175 may select a measuring rate based on whether or not the predefined threshold is reached.

In one example, in the course of its analysis, the semantic analyzer 173 predicts how excited a user is likely to get from reading a certain post on a social network site. An indication that is generated by the semantic analyzer 173, indicates on a scale of 1-10 how excited a user is expected to be (10 being the extremely excited). The controller 175 receives the indication, and with respect to the indication, selects a measuring rate for an EEG head-mounted, battery operated, sensor that may be used to measure the affective response of the user 114 while reading content. In order to save power, the system may elect to measure the affective response of the user with the EEG sensor, while the user interacts with the social network site, if the emotional response is expected to reach a predefined threshold level, such as excitement of at least 3 on the scale of 1-10. Measuring the user with the EEG may help determine to what extent the user was really excited by what the user read. However, if the predicted value is too low, it is not likely that the clip is going to scare the user at all, so the system chooses not to waste resources on confirming that. Thus, if the expected emotional response is below the threshold, the controller 175 may select a "reduced" measuring rate for the device 177, in which the device 177 measures less. For example, the device may be configured to sample fewer brainwave channels, take less frequent measurements, and/or configure its electrodes to draw less power each measurement. However, if the expected emotional response reaches the threshold, the controller 175 may select a "regular" measuring rate for the device 177, in which the device 177 performs significantly more measurements, compared to the reduced measuring rate. For example, the device 177 may be configured to measure more brainwave channels, take measurements more frequently, and/or set its electrodes to draw more power during each measurement.

In one embodiment, a measuring rate for the device 177 may be selected by the controller 175 implicitly or explicitly.

For example, an implicit selection of the measuring rate may occur when the controller 175 does not receive an indication from the semantic analyzer 173, when the indication has not been changed since the last signaling, and/or when the indication is the default indication. An explicit selection of the measuring rate may occur when indication determines the measuring rate selected by the controller 175, e.g., by providing parameters describing the measuring rate.

In one embodiment, the system 170 includes a measurement Emotional Response Predictor (measurement ERP) 188 configured to predict the user's emotional response from data comprising measurements of affective response. Optionally, the measurements are processed prior to being sent to the measurement ERP 188 for prediction. For example, the measurements may undergo filtering and/or feature extraction. Additionally, the measurement ERP 188 may be provided with information generated by the semantic analyzer's 173 analysis of the segment of content 172, such as the indications 174a and/or 174b. The measurement ERP 188 may utilize this information for generating its prediction of the user's emotional response.

In one embodiment, the system 170 further includes a measurement ERP trainer 186. Optionally, the measurement ERP trainer 186 is provided with information regarding an expected emotional response to segment of contents. For example, the measurement ERP trainer is provided with an indication 174b generated by the semantic analyzer 173 as a result of its analysis of the segment of content 172b. The information provided to the measurement ERP trainer may be used by it to generate a label for a sample utilized by the measurement ERP trainer when training a model for a measurement ERP. Additionally or alternatively, the measurement ERP trainer may be provided with measurements of affective response to the user 114 to a segment of content, which may serve as a training sample for training a predictor. Optionally, the measurements may be processed prior to being sent to the measurement ERP trainer. For example, the measurements may undergo filtering and/or feature extraction in order to produce feature values that are included in one or more training samples utilized by the module.

Figure 19:
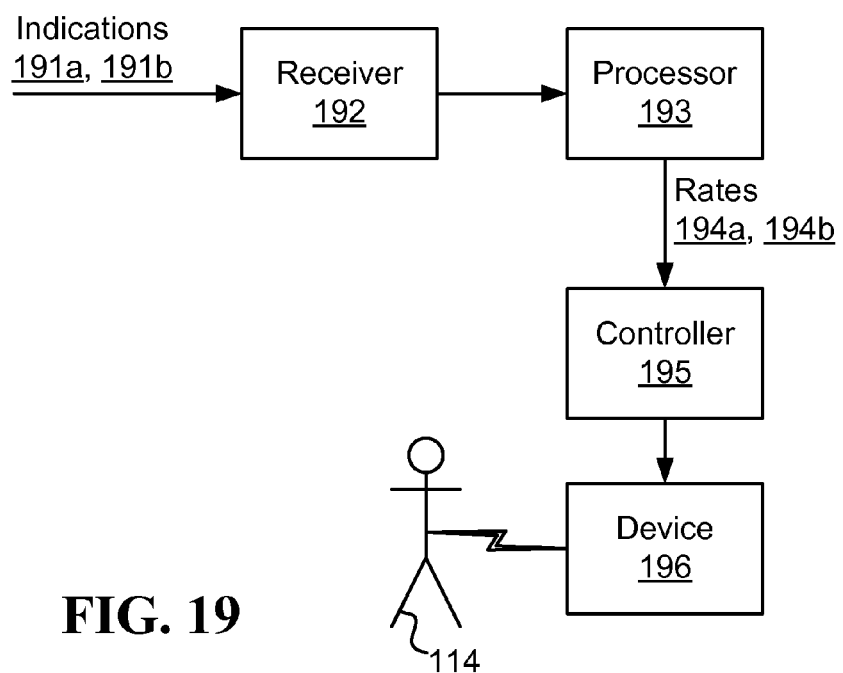
FIG. 19 illustrates one embodiment of a system configured to enable a device to measure affective response at varying measuring rates based on semantic analysis of content.

FIG. 19 illustrates one embodiment of a system configured to enable a device 196 to measure affective response at varying measuring rates based on semantic analysis of content. The system includes at least a receiver 192, a processor 193, and a controller 195.

The receiver 192 is configured to receive a first indication 191a and a second indication 191b derived from evaluations comprising semantic analysis of first and second segments of content, respectively. The segments of content include data that represents text (e.g., the segments include portions of text or media that may be converted to text). Optionally, the semantic analyzer 173 generates the indications 191a and 191b by analyzing segments of content 172a and 172b, respectively. Optionally, the semantic analyzer 173 utilizes semantic analysis methods in its analysis of the segments. The indications 191a and 191b may be received separately by the receiver 192 (e.g., each is communicated in a separate communication), or may be received jointly (e.g., both are communicated in the same communication). Optionally, the first indication 191a and/or the second indications 191b are functions of the expected emotional responses to the first and second segments. For example, the indications may indicate the type of emotional response a user is expected to have to content, the magnitude of the expected emotional response to the content, and/or the expected benefit from determining the emotional response to the content by measuring the affective response of the user.

The first indication 191a indicates that a first value, which is a function of emotional response the first segment, does not reach a first predetermined threshold. Additionally, the second indication 191b indicates that a second value, which is a function of emotional response to the second segment, does reach a second predetermined threshold.

The processor 193 is configured to select, based on an indication received by the receiver 192, a measuring rate for the device 196 to be used to measure affective response of a user 114 to segments of content. In one example, based on the first indication 191a, the processor 193 selects a first measuring rate 194a for the device 196 to measure affective response of the user to the first segment of content. And based on the second indication 191b, the processor 193 selects a second measuring rate 194b for the device 196 to measure affective response of the user to the second segment.

The controller 195 is operable to configure the device 196 to measure affective response of the user according to a measuring rate selected by the processor 193, such as the first and second measuring rates. In one example, the controller 195 is configured to manage power consumption of the device 196 according to the measuring rate selected by the processor 193. In another example, the controller 195 is configured to manage the number of measurements taken by the device 196, per unit of measurement (e.g., frame rate of video images). In yet another example, the controller is configured to manage the volume of data generated by the device 196, per unit of measurement time, for example by selecting number of brainwave channels to be monitored each second by a brainwave monitor.

In one embodiment, the device 196 takes significantly fewer measurements, per unit of measurement time, while operating at the first measuring rate 194 to measure the affective response of the user 114 to the first segment, compared to the number of measurements the device 196 takes while operating at the second measuring rate 196b to measure the affective response of the user 114 to the second segment.

Figure 20:
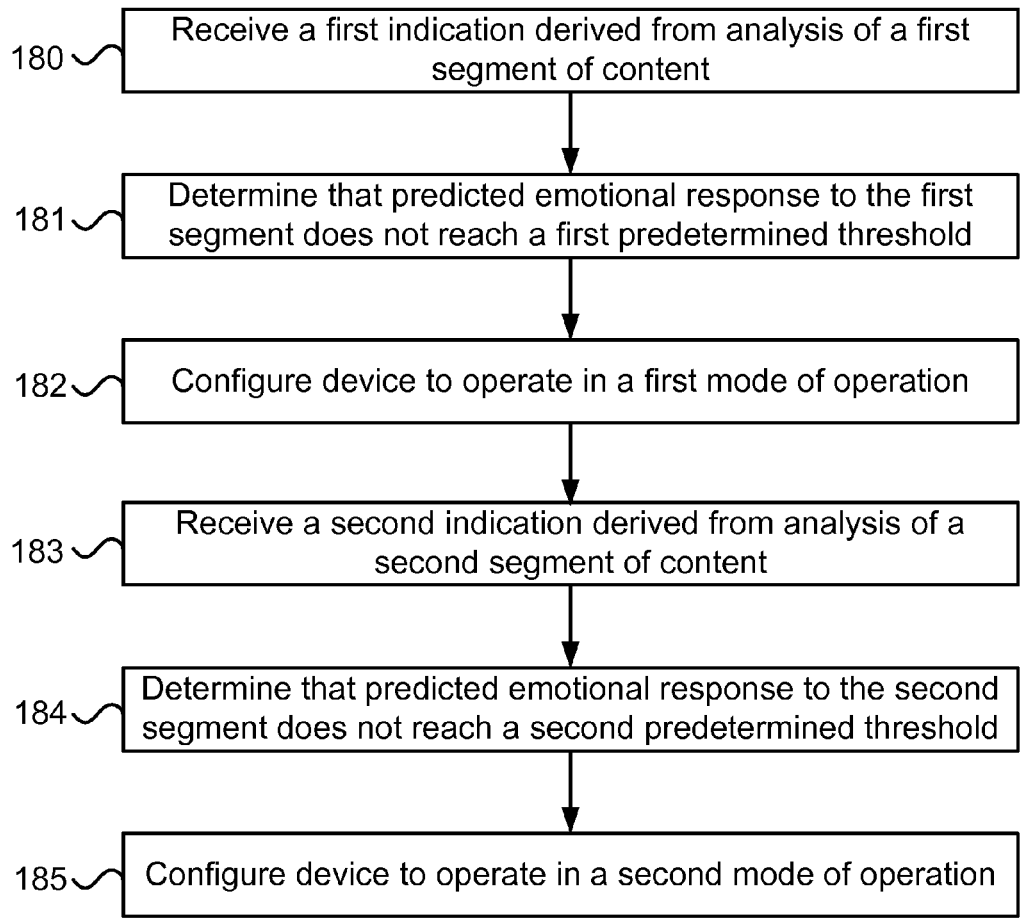
FIG. 20 illustrates one embodiment of a method for utilizing semantic analysis to set a measuring rate of a device that measures affective response.

FIG. 20 illustrates one embodiment of a method for utilizing semantic analysis to set a measuring rate of a device that measures affective response. The method includes the following steps:

In step 180, receiving a first indication derived from an evaluation involving semantic analysis of a first segment of content. The first segment includes data representing text.

In step 181, determining that the first indication indicates that a first value related to a prediction of emotional response to the first segment does not reach a first predetermined threshold.

In step 182, configuring the device to measure, at a first measuring rate, affective response of a user to the first segment.

In step 183, receiving a second indication derived from an evaluation involving semantic analysis of a second segment of content. The first segment includes data representing text.

In step 184, determining that the second indication indicates that a second value related to a prediction of emotional response to the second segment reaches a second predetermined threshold.

And in step 185, configuring the device to measure, at a second measuring rate, affective response of the user to the second segment.

In one embodiment, the device takes significantly fewer measurements of affective response, per unit of measurement time, while operating at the first measuring rate, compared to number of measurements of affective response the device takes while operating at the second measuring rate.

In one embodiment, the first and second segments include data representing text. The analysis of the first and second segments utilizes semantic analysis of the data representing text to produce the indications that indicate whether or not the predetermined threshold is reached. Additionally, the semantic analysis may be used to generate feature values that describe the meaning of the text of the first and second segments. Optionally, the semantic analysis of the second segment of content, which contributed to generating the second indication, is performed less than one minute, or even one second, before the user is exposed to the second segment of content. For example, the second segment of content includes portions of messages sent to a user (e.g., posts to a social network and/or instant message texts). Additionally or alternatively, the semantic analysis of the first segment of content, which contributed to generating the first indication, may be performed less than one minute, or even one second, before the user is exposed to the first segment of content.

In another embodiment, semantic analysis of a segment of content is performed substantially while the user 114 is exposed to the segment and/or shortly after the user is exposed to it. For example, the segments of content may include portions of a live conversation (e.g., video, voice, and/or text), and the semantic analyzer performs its analysis of the segments substantially as conversation takes place.

In one embodiment, configuring the operation of the device according to the first and second measuring rates may be done essentially simultaneously. For example, based on the first and second indications, the device may be programmed to measure at the first or second measuring rates at different times in the future, such as setting the sensor's measuring rate a priori to measure affective response to various segments of content before the segments of content are presented. Alternatively, the device may be configured to operate at different measuring rate as indications are received. For example, each indication may indicate a certain measuring rate (and possibly operating times for the device), which may override previous settings that were made by an indication that was received earlier.

Figure 21:
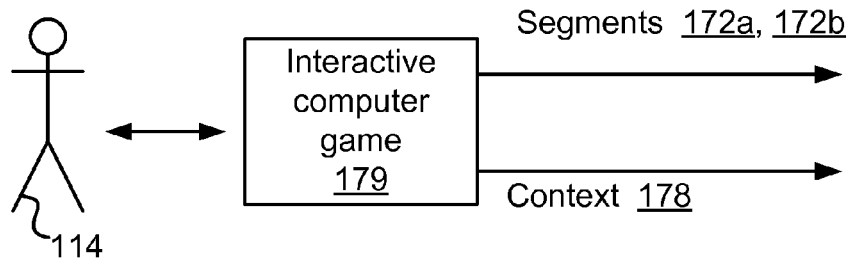
FIG. 21 illustrates one embodiment of a computer game that outputs segments of content and context information about the segments.

FIG. 21 is a schematic illustration of an embodiment comprising a system that includes a computer game 179 that outputs segments of content 172 and context information 178 about the segments 172. Optionally, the user 114 provides the interactive computer game 179 with input that influences events and/or characters in the computer game. Optionally, the segments of content 172 are displayed to the user 114 and/or are provided to the semantic analyzer 173, possibly after undergoing some form of processing (e.g., feature extraction). Optionally, the context information 178 is provided to: (i) the semantic analyzer 173 to assist with the analysis of the segment 172, and/or (ii) the measurement ERP 188 to improve its performance.

In one example, the computer game provides the semantic analyzer 173 with context information regarding an event in the game that is related to the segment of content 172a and/or 172b. For instance, the computer game may provide the semantic analyzer with information indicative of the fact that the user 114 has been playing the same level for a long time, which may indicate that the user might be getting bored and/or frustrated with the game. In another example, the computer game provides the semantic analyzer 173 with information regarding the status of events in the game not represented in the analyzed content (such as the state of other characters in the game, and/or how the user 114 stands with respect to completing a mission). This information can provide context and assist the semantic analyzer in determining the user's expected emotional response to the content, and thus improve the accuracy of selection of appropriate measuring rates for measuring the affective response to different segments of content. In yet another example, the computer game includes a character whose actions are controlled at least partially by the user, and the information provided by the game to the semantic analyzer 173 is related to the actions of the character and/or to the fate of character in the game.

In one embodiment, the functionality of the semantic analyzer 173 is included in the interactive computer game 179. In this embodiment, the computer game provides an indication to the controller 175 that selects a measuring rate for the device 177. In another embodiment, the functionality of both the semantic analyzer 173 and the controller 175 are included in the interactive computer game 179. In this case, the hardware of the computer game may control the device 177.

In one embodiment, the controller 175 may be implemented as part of the semantic analyzer 173. In another example, the controller 175, the device 177, and the semantic analyzer 173 are combined in a single device. Optionally, the device is battery powered (e.g., a smart phone).

In one embodiment, a segment of content may include visual content, such as images and/or video. A content delivery module may be used to expose the segments to the user 114. Optionally, the device 177 has at least one component that is not shared with the content delivery module. Additionally or alternatively, the device 177 may include at least one component that is shared with the content delivery module. Additionally or alternatively, the device 177 may be a battery powered sensor, and the content delivery module and the battery powered sensor are realized in the same device.

In one embodiment, at least one element of the controller 175 is implemented as a dedicated hardware element. For example, the controller 175 may be a component coupled to the device 177. In another example, the controller 175 is coupled to a processor that processes affective response measurements.

In one embodiment, the controller 175 is implemented in software running on a processor. In some cases, the controller may run, at least in part, on a device belonging to the user, such as a mobile phone. In some cases, the controller may run, at least in part, on a system remote of the user, such as on a cloud-based server.

In one embodiment, the controller 175 is realized as hardware that is embedded in the housing of the device 177. For example, the controller for a mobile EEG measuring headset may be embedded in the headset itself, and communicate data wirelessly.

In another embodiment, the controller 175 is realized as software that runs on a processor that belongs to the device 177. For example, the controller for a mobile EEG measuring headset may run on a processor that belongs to the headset and is used to process EEG measurements.

In one embodiment, the controller 175 and/or the semantic analyzer 173 are implemented at least in part, as software running on a remote processor, such as a cloud-based server. For example, the cloud-based service can be used to analyze content that is to be presented to the user 114, such as video to be streamed to the user's display. According to results of the semantic analyzer's analysis, the controller 175 running on the cloud-based service may send different operating instructions to the device 177 regarding how to measure the user.

In one embodiment, a system configured to use semantic analysis to measure affective response at varying measuring rates, comprising: a semantic analyzer configured to: receive a first segment of content, analyze the first segment utilizing semantic analysis, and output a first indication that a first value related to a predicted emotional response to the first segment does not reach a first predetermined threshold; wherein the first segment comprises data representing text; and a controller configured to select, based on the first indication, a first measuring rate for a device for measuring affective response of a user to the first segment; the semantic analyzer is further configured to: receive a second segment of content, analyze the second segment utilizing semantic analysis, and output a second indication that a second value related to a predicted emotional response to the second segment does reach a second predetermined threshold; wherein the second segment comprises data representing text; the controller is further configured to select, based on the second indication, a second measuring rate for the device for measuring affective response of the user to the second segment; wherein the device takes significantly fewer measurements of affective response, per unit of measurement time, while operating at the first measuring rate, compared to number of measurements of affective response the device takes while operating at the second measuring rate. Optionally, the first and second predetermined thresholds represent first and second confidence levels in predictions of emotional response, respectively; and wherein the first and second values represent confidence in predictions of emotional response to the first and second segments, respectively; whereby the first measuring rate is selected when the first indication indicates that confidence in a prediction of emotional response to the first segment does not reach the first confidence level, and the second measuring rate is selected when the second indication indicates that confidence in a prediction of emotional response to the second segment does reach the second confidence level. Optionally, the first and second predetermined thresholds represent first and second magnitudes of change in affective response, respectively; and wherein the first and second values represent predicted changes in affective response due to exposure to the first and second segments, respectively; whereby the first measuring rate is selected when the first indication indicates that a predicted change in affective response due to exposure to the first segment does not reach the first magnitude, and the second measuring rate is selected when the second indication indicates that a predicted change in affective response due to exposure to the second segment does reach the second magnitude. Optionally, the first and second predetermined thresholds represent first and second benefit levels, respectively; and wherein the first and second values represent predicted benefits to measuring affective response to the first and second segments, respectively; whereby the first measuring rate is selected when the first indication indicates that a predicted benefit of measuring affective response to the first segment does not reach the first benefit level, and the second measuring rate is selected when the second indication indicates that a benefit of measuring affective response to the second segment does reach the second benefit level. Optionally, the first measuring rate is substantially zero, and when operating at the first measuring rate the device substantially does not take affective response measurements of the user. Optionally, the device is one or more of the following: a physiological sensor, and an image capturing device. Optionally, the system further comprises a module configured to train an emotional response predictor (measurement ERP) based on feature values that are a product of measurements of the affective response of the user to the second segment of content, and a label based on the second indication generated by the semantic analyzer. Optionally, the semantic analyzer applies statistics on words that are correlated with certain emotional responses. Optionally, the semantic analyzer applies Latent Semantic Analysis in order to associate a segment of content with a likely subject.

Optionally, the semantic analyzer evaluates the second segment shortly before the user is exposed to the second segment, whereby shortly is less than one minute. Optionally, the second segment is received from an interactive computer game that provides context information about the second segment that may be utilized by the semantic analyzer to compute the second indication.

In one embodiment, a method for utilizing semantic analysis to set a measuring rate of a device that measures affective response, comprising: receiving a first indication derived from an evaluation comprising semantic analysis of a first segment of content; wherein the first segment comprises data representing text; determining that the first indication indicates that a first value related to a prediction of emotional response to the first segment does not reach a first predetermined threshold, and configuring the device to measure, at a first measuring rate, affective response of a user to the first segment; receiving a second indication derived from an evaluation comprising semantic analysis of a second segment of content; wherein the second segment comprises data representing text; and determining that the second indication indicates that a second value related to a prediction of emotional response to the second segment reaches a second predetermined threshold, and configuring the device to measure, at a second measuring rate, affective response of the user to the second segment; wherein the device takes significantly fewer measurements of affective response, per unit of measurement time, while operating at the first measuring rate, compared to number of measurements of affective response the device takes while operating at the second measuring rate. Optionally, the semantic analysis of the data derived from the second segment is performed shortly before the user is exposed to the second segment, whereby shortly is less than one minute. Optionally, the first and second indications indicate confidence in predictions of emotional response to the first and second segments, respectively; whereby based on the first indication, it is determined that confidence in the prediction of the emotional response to the first segment does not reach the first predetermined threshold, and based on the second indication, it is determined that confidence in the prediction of the emotional response to the second segment does reach the second predetermined threshold. Optionally, the first and second indications indicate expected magnitudes of change in affective response due to exposure to the first and second segments, respectively; whereby based on the first indication, it is determined that expected magnitude of change in affective response due to exposure to the first segment does not reach the first predetermined threshold, and based on the second indication, it is determined that expected magnitude of change to affective response due to exposure to the second segment does reach the second predetermined threshold. Optionally, the first and second indications indicate how beneficial it is to measure the affective response to the first and second segments, respectively; whereby based on the first indication, it is determined that benefit from measuring the affective response to the first segment does not reach the first predetermined threshold, and based on the second indication it is determined that benefit from measuring affective response to the second segment does reach the second predetermined threshold. Optionally, the first measuring rate is substantially zero, and substantially no measuring of the affective response of the user to being exposed to the first segment takes place. Optionally, the device comprises a battery powered physiological sensor, and measuring the affective response of the user to the second segment comprises utilizing the device to take a physiological measurement of the user. Optionally, the device is part of a battery powered image capturing device, and measuring the affective response of the user to the second segment comprises utilizing the image capturing device to capture an image of the user.

In one embodiment, a system configured to enable a device to measure affective response at varying measuring rates based on semantic analysis of content, comprising: a receiver configured to receive first and second indications derived from evaluations comprising semantic analysis of first and second segments of content, respectively; wherein the first and second segments comprise data representing text; and wherein the first indication indicates that a first value, which is a function of emotional response the first segment, does not reach a first predetermined threshold, and the second indication indicates that a second value, which is a function of emotional response to the second segment, does reach a second predetermined threshold; a processor configured to select, based on the first and second indications, first and second measuring rates for measuring affective response, respectively; and a controller operable to configure the device to measure the affective response of a user according to the first and second measuring rates; wherein the device takes significantly fewer measurements, per unit of measurement time, while operating at the first measuring rate to measure affective response of the user to the first segment, compared to number of measurements the device takes while operating at the second measuring rate to measure affective response of the user to the second segment.

Figure 22:
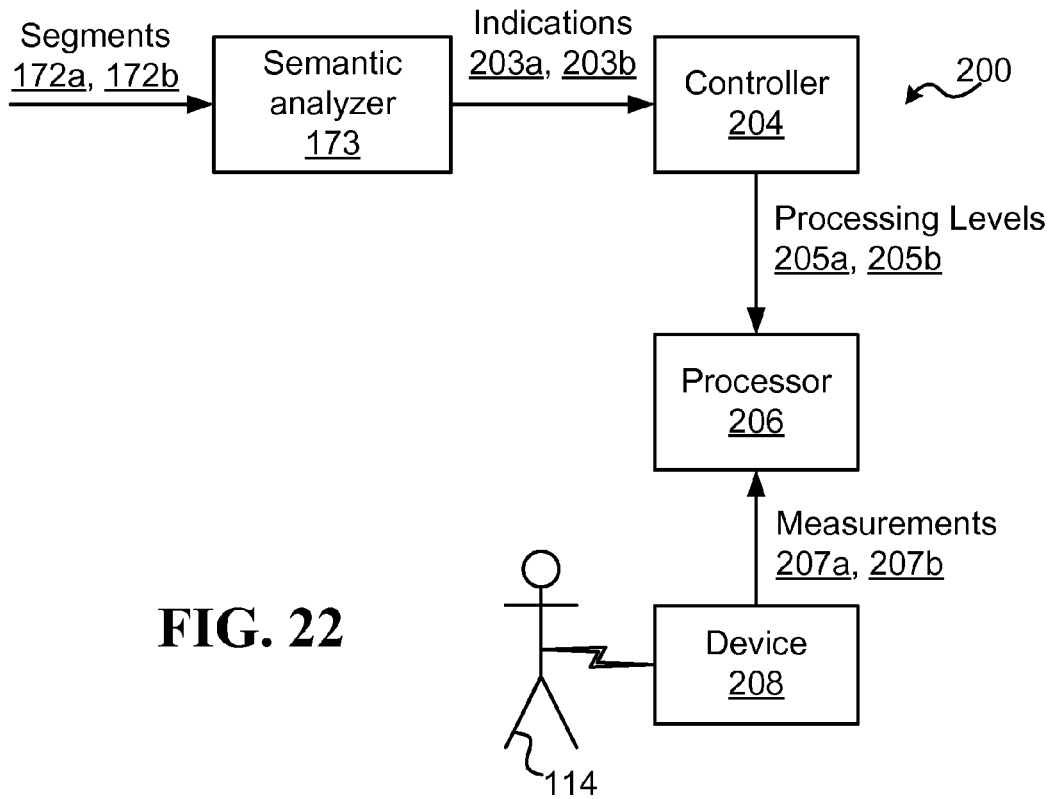
FIG. 22 illustrates one embodiment of a system configured to utilize semantic analysis to set a processing level for processing affective response measurements.

FIG. 22 illustrates one embodiment of a system 200 configured to configured to utilize semantic analysis to set a processing level for processing affective response measurements. The system includes at least a semantic analyzer 173, a controller 204, and a processor 206.

In one embodiment, the semantic analyzer 173 is configured to: (i) receive a first segment 172a of content and a second segment 172b of content, (ii) analyze the segments 172a and 172b utilizing semantic analysis, and (iii) output a first indication 203a and a second indication 203b. The first indication 203a indicates that a first value related to a prediction of emotional response to the first segment 172a does not reach a first predetermined threshold. The second indication 203b indicates that a second value related to a prediction of emotional response to the second segment 172b does reach a second predetermined threshold.

In one embodiment, the semantic analyzer 173 may generate the first indication 203a and the second indication 203b, which are conveyed to the controller 204. The controller 204 is configured to select a processing level for the processor 206, based on a received indication. For example, based on the indication 203a, the controller 204 is configured to select for the processor 206 a first processing level 205a, and based on the second indication 203b, the controller 204 is configured to select for the processor 206 a second processing level 205b. Optionally, while operating at the first processing level 205a, the processor 206 processes a first set of measurements 207a of affective response of the user 114 taken with a device 208. Optionally, while operating at the second processing level 205b, the processor 206 processes a second set of measurements 207b of affective response of the user 114 taken with the device 208.

In one embodiment, the indication 203a and/or 203b may be interpreted as operating instructions for another module in the system, such as the controller 204 and/or the processor 206. For example, the indications may be interpreted as an instructions to the processor 206 to run a certain procedure and/or as an instruction to the controller 204 to select a specific processing level for the processor 206. In another example, the indications may indicate how long the processor 206 should process data and/or specifies a period of time (e.g., by providing start and end times) in which the processor 206 should process data.

In some embodiments, a device, such as the device 208, is used to measure affective response of the user 114. Optionally, the device includes a sensor and/or is a sensor. Optionally, the sensor may be a physiological sensor (e.g., a sensor that measures heart rate, galvanic skin response, and/or brainwave activity), and/or a sensor that measures the user's behavior (e.g., a camera, and/or a motion detector). Optionally, the device may include additional components to the sensor, such as a memory, a processor, a battery, a transmitter, and/or a receiver. Optionally, the device may be coupled to a user.

In some embodiments, the device 208 may output measurements of the affective response of the user 114. For example, the device 208 may output the measurements 207a, taken essentially while the user 114 was exposed to the first segment 172a, which describe the affective response of the user 114 to being exposed to the first segment 172a. Similarly, the device 208 may output the measurements 207b, taken essentially while the user 114 was exposed to the second segment 172a, which describe the affective response of the user 114 to being exposed to the second segment 172b. Optionally, the measurements 207a and/or the measurements 207b are forwarded to the processor 206 in order to be processed. Alternatively or additionally, the measurements 207a and/or the measurements 207b may be forwarded to a module of the system such as the measurement Emotional Response Predictor (measurement ERP). Optionally, some of the measurements the measurements 207a and/or the measurements 207b may include raw measurement values (i.e., the values undergo very little transformation prior to their output). Alternatively or additionally, the measurements 207a and/or the measurements 207b may include processed values such as values that are the result of filtering, normalization, signal processing, feature extraction, encryption, and/or compression.

In some embodiments, the controller 204 is configured to utilize the indications 203a and/or 203b to select a processing level for the processor 206, from a set comprising a first processing level 205a and a second processing level 205b. The processing level may have preset operation parameters (such as procedures to run, duration of processing, and/or volume of data to process). Alternatively or additionally, the processing level may include certain operation parameters that are computed by the controller 204 using the indications 203a and/or 203b, and/or other data that is available at the time of computation.

In some embodiments, the processor 206 is configured to process measurements of affective response of the user 114, while operating at a certain processing level. The certain processing level may be selected from a set that includes at least the first processing level 205a and the second processing level 205b. The computational load of the processor may be expressed in terms of the number of computational cycles the processor utilizes to process a volume unit of data.

In one embodiment, based on the first indication 203a, the controller 204 selects the first processing level 205a, which has a low computational load, at which the processor 206 should operate while processing measurements of affective response of the user 114 to the first segment 172a. In addition, based on the second indication 203b, the controller 204 selects the second processing level 205b, which has a higher computational load, at which the processor 206 should operate while processing measurements of affective response of the user 114 to the second segment 172b. Consequently, per volume unit of measurement data, the number of computation cycles utilized for processing measurements of affective response of a user to the first segment, is significantly lower than number of computation cycles utilized for processing measurements of affective response of the user to the second segment.

Figure 23:
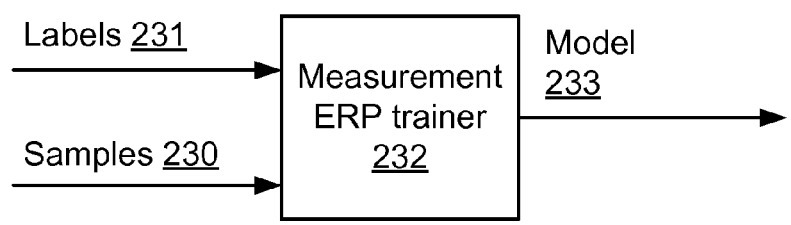
FIG. 23 illustrates one embodiment of a measurement ERP trainer for training an emotional response model.

FIG. 23 illustrates one embodiment of a measurement ERP trainer 232 that is configured to train an emotional response model 233 based on samples 230 and labels 231 that are a product of the semantic analyzer 173. Optionally, the measurement ERP trainer 232 is provided with information regarding an expected emotional response to the segment of content. For example, the measurement ERP trainer is provided with an indication 203b generated by the semantic analyzer 173 as a result of its analysis of the segment of content 172b. The information provided to the measurement ERP trainer 232, may be used by it in order to generate a label 231 for a sample 230 utilized by the measurement ERP trainer when training the model 233. Additionally or alternatively, the measurement ERP trainer 232 may be provided with measurements of affective response of the user 114 to a segment of content taken by the device 208; these measurements may be utilized to generate the samples 230. For example, the measurement ERP trainer 232 may receive the measurements 207b taken by the device 208 which describe the affective response of the user 114 to the second segment of content 172b. Optionally, the measurements received by the measurement ERP trainer 232 may be processed prior to being sent to the measurement ERP trainer. For example, the measurements may undergo filtering and/or feature extraction in order to produce feature values that are included in one or more training samples utilized by the module. Optionally, the processing of the measurements is done, at least in part, by the processor 206.

Figure 24:
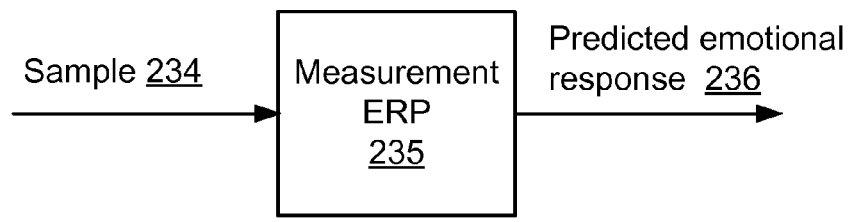
FIG. 24 illustrates one embodiment of a measurement Emotional Response Predictor (measurement ERP)

FIG. 24 illustrates one embodiment of a measurement Emotional Response Predictor (measurement ERP) 235 configured to predict emotional response 236 based on a sample 234. Optionally, the measurement ERP 235 utilizes the model 233 in order to generate the predicted emotional response 236. Optionally, the sample 234 includes feature values that are a product of measurements of the device 208. Optionally, the measurements are processed prior to being sent to the measurement ERP 235. For example, the measurements 207b may undergo filtering and/or feature extraction before being provided to the measurement ERP 235. Optionally, the processing of the measurements 207b is done, at least in part, by the processor 206. Additionally, the measurement ERP 235 may be provided with information generated by the semantic analyzer's analysis of the segment of content 172b, such as the indication 203b. The measurement ERP 235 may utilize this information for generating its predicted emotional response 236.

Figure 25:
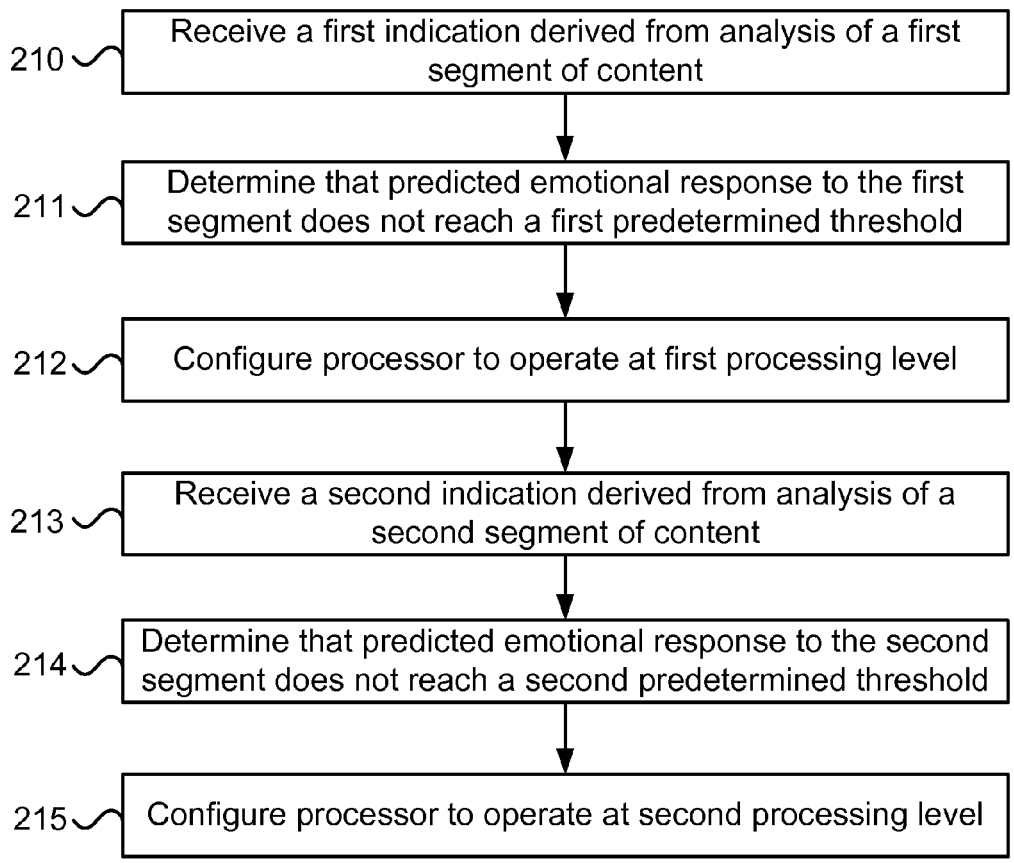
FIG. 25 illustrates one embodiment of a method that utilizes semantic analysis to set a processing level of a processor processing affective response measurements.

FIG. 25 illustrates one embodiment of a method for utilizing semantic analysis to set a processing level of a processor processing affective response measurements. The method includes the following steps:

In step 210, receiving a first indication derived from an evaluation involving semantic analysis of a first segment of content. The first segment includes data representing text.

In step 211, determining that the first indication indicates that a first value related to a prediction of emotional response to the first segment does not reach a first predetermined threshold.

In step 212, configuring a processor to operate at a first processing level to process measurements of affective response of the user to the first segment.

In step 213, receiving a second indication derived from an evaluation involving semantic analysis of a second segment of content. The second segment includes data representing text.

In step 214, determining that the second indication indicates that a second value related to a prediction of emotional response to the second segment does reach a second predetermined.

And in step 215, configuring the processor to operate at a second processing level to process measurements of affective response of the user to the second segment.

In one embodiment, per volume unit of measurement data, number of computation cycles utilized by the processor to process, at the first processing level, measurements of the affective response of the user to the first segment, is significantly lower than number of computation cycles utilized by the processor to process, at the second processing level, measurements of the affective response of the user to the second segment.

Figure 26:
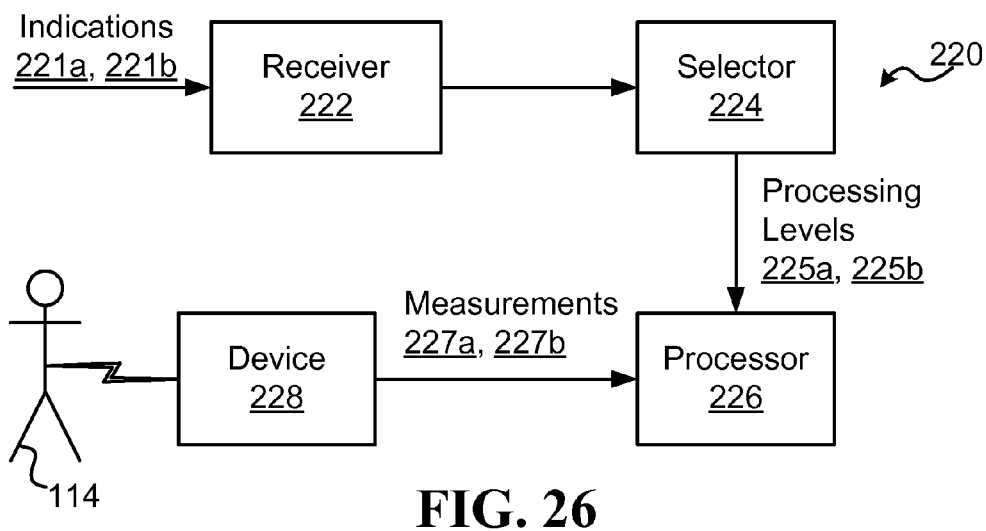
FIG. 26 illustrates one embodiment of system configured to utilize semantic analysis to set processing level for affective response measurements.

FIG. 26 illustrates one embodiment of a system 220 configured to utilize semantic analysis to set processing level for affective response measurements. The system 220 includes at least a receiver 222, a selector 224, and a processor 226.

The receiver 222 is configured to receive a first indication 221a and a second indication 221b derived from evaluations comprising semantic analysis of first and second segments of content, respectively. The segments of content include data that represents text (e.g., the segments include portions of text or media that may be converted to text). Optionally, the semantic analyzer 173 generates the indications 221a and/or 221b by analyzing segments of content 172a and 172b, respectively. Optionally, the semantic analyzer 173 utilizes semantic analysis methods in its analysis of the segments. The indications 221a and 221b may be received separately by the receiver 222 (e.g., each is communicated in a separate communication), or may be received jointly (e.g., both are communicated in the same communication). Optionally, the first indication 221a and/or the second indications 221b are functions of the expected emotional responses to the first and second segments. For example, the indications may indicate the type of emotional response a user is expected to have to content, the magnitude of the expected emotional response to the content, and/or the expected benefit from determining the emotional response to the content by measuring the affective response of the user.

The first indication 221a indicates that a first value, which is a function of emotional response the first segment, does not reach a first predetermined threshold. Additionally, the second indication 221b indicates that a second value, which is a function of emotional response to the second segment, does reach a second predetermined threshold.

The selector 224 is configured to select, based on an indication received by the receiver 222, a processing level for the processor 226 to be used to measure affective response of a user 114 to segments of content. In one example, based on the first indication 221a, the selector 224 selects a first processing level 225a for the processor 226 to process measurements of affective response of the user to the first segment of content. Optionally, measurements of affective response of the user to the first segment of content are measurements 227a, taken by the device 228. Optionally, the measurements 227a were taken of the user 114, essentially while the user 114 was exposed to the second segment 172b. And based on the second indication 221b, the selector 224 selects a second processing level 225b for the processor 226 to process measurements of affective response of the user to the second segment of content. Optionally, measurements of affective response of the user to the second segment of content are measurements 227b, taken by the device 228. Optionally, the measurements 227b were taken of the user 114, essentially while the user 114 was exposed to the second segment 172b.

The processor 226 is configured to receive first and second measurements of affective response of a user to the first and second segments, respectively. Optionally, the first measurements are the measurements 227a and the second measurements are the measurements 227b. The processor 226 is also configured to process the first measurements at the first processing level, and to process the second measurements at the second processing level. Consequently, per volume unit of measurement data, the number of computation cycles utilized by the processor 226 to process the first measurements is significantly lower than the number of computation cycles utilized by the processor 226 to process the second measurements. Thus, operating, at least during some of the times at the first processing level reduces the computational load on the processor 226.

In one embodiment, the system 200 that includes the computer game 179, illustrated in FIG. 21 that outputs segments of content and context information about the segments. Optionally, the user 114 provides the interactive computer game with input that influences events and/or characters in the computer game. Optionally, the segments of content are displayed to the user 114 and/or are provided to the semantic analyzer 173, possibly after undergoing some form of processing (e.g., feature extraction). Optionally, the context information is provided to: (i) the semantic analyzer 173 to assist with the analysis of a segment of content, (ii) the measurement ERP trainer 232 to contribute in the generation of feature values related to the context, and/or (iii) the measurement ERP 235 in order to be utilized for generating feature values related to the context that may improve the predictive performance.

In one embodiment, the functionality of the semantic analyzer 173 is included in the interactive computer game. In this embodiment, the computer game provides an indication to the controller 204 that selects a processing level for the processor 206. In another embodiment, the functionality of both the semantic analyzer 173 and the controller 204 are included in the interactive computer game. In this case, the hardware of the computer game may control the processor 206 and/or the device 208.

There may be various hardware configurations that involve the semantic analyzer 173, the controller 204, and/or the processor 206. In one example, the controller 204 may be implemented, at least in part, as hardware that is part of the processor 206. In another example, the controller 204 may be implemented, at least in part, as software that runs on the processor 206. In another example, the controller 204 may be implemented as part of the semantic analyzer 173. In still another example, the controller 204, the processor 206, and the semantic analyzer 173 are combined in a single device. Optionally, the device is battery powered (e.g., a smart phone). Optionally, the device 208 is also part of the device and/or draws power from the device's power supply.

In one embodiment, the processor 206 is embedded in a battery powered device, and the measurements of affective response of the user to the second segment include physiological measurements of the user taken with a physiological sensor. Additionally or alternatively, the measurements of affective response of the user to the second segment comprise comprises images of the user taken with an image capturing device.

In one embodiment, the controller 204 and/or the semantic analyzer 173 are implemented at least in part, as software running on a remote processor, such as a cloud-based server. For example, a cloud-based service can be used to analyze content that is to be presented to the user 114, such as video to be streamed to the user's display. According to indications of the semantic analyzer 173, the controller 204, running on the cloud-based service, may send different operating instructions to the processor 206, such as specifying a processing level for the processor 206 at to operate while processing affective response measurements of the user.

In one embodiment, a segment of content may include visual content, such as images and/or video. A content delivery module may be used to expose the segments to the user 114. Optionally, the device 208 has at least one component that is not shared with the content delivery module. Additionally or alternatively, the device 208 may include at least one component that is shared with the content delivery module. Additionally or alternatively, the device 208 may be a battery powered sensor, and the content delivery module and the battery powered sensor are realized in the same device.

In one embodiment, a system configured to utilize semantic analysis to set a processing level for processing affective response measurements, comprising: a semantic analyzer configured to: receive a first segment of content, analyze the first segment utilizing semantic analysis, and output a first indication that a first value related to a predicted emotional response to the first segment does not reach a first predetermined threshold; wherein the first segment comprises data representing text; and a controller configured to select, based on the first indication, a first processing level for a processor to process measurements of affective response of a user to the first segment; the semantic analyzer is further configured to: receive a second segment of content, analyze the second segment utilizing semantic analysis, and output a second indication that a second value related to a predicted emotional response to the second segment reaches a second predetermined threshold; wherein the second segment comprises data representing text; the controller is further configured to select, based on the second indication, a second processing level for a processor to process measurements of affective response of the user to the second segment; wherein, per volume unit of measurement data, number of computation cycles utilized by the processor to process, at the first processing level, measurements of the affective response of the user to the first segment, is significantly lower than number of computation cycles utilized by the processor to process, at the second processing level, measurements of the affective response of the user to the second segment. Optionally, the system further comprises a device operable to provide measurements of the affective response of the user; wherein the device is one or more of the following: a physiological sensor, and an image capturing device. Optionally, the system further comprises a module configured to train an emotional response predictor (measurement ERP) based on feature values that are a product of measurements of the affective response of the user taken by the device and labels that are a product of the semantic analyzer. Optionally, the system further comprises an emotional response predictor (measurement ERP) configured to predict emotional response based on feature values that are a product of the affective response of the user taken by the device. Optionally, the first and second predetermined thresholds represent first and second confidence levels in predictions of emotional response, respectively; and wherein the first and second values represent confidence in predictions of emotional response to the first and second segments, respectively; whereby the processor is configured to operate at the first processing level to process measurements of affective response of the user to the first segment when the first indication indicates that confidence in a prediction of emotional response to the first segment does not reach the first confidence level, and the processor is configured to operate at the second processing level to process measurements of affective response of the user to the second segment when the second indication indicates that confidence in a prediction of emotional response to the second segment does reach the second confidence level. Optionally, the first and second predetermined thresholds represent first and second magnitudes of change in affective response, respectively; and wherein the first and second values represent predicted changes in affective response due to exposure to the first and second segments, respectively; whereby the processor is configured to operate at the first processing level to process measurements of affective response of the user to the first segment when the first indication indicates that a predicted change in affective response due to exposure to the first segment does not reach the first magnitude, and the processor is configured to operate at the second processing level to process measurements of affective response of the user to the second segment when the second indication indicates that a predicted change in affective response due to exposure to the second segment does reach the second magnitude. Optionally, the first and second predetermined thresholds represent first and second benefit levels, respectively; and wherein the first and second values represent predicted benefits to measuring affective response to the first and second segments, respectively; whereby the processor is configured to operate at the first processing level to process measurements of affective response of the user to the first segment when the first indication indicates that a benefit of measuring affective response to the first segment does not reach the first benefit level, and the processor is configured to operate at the second processing level to process measurements of affective response of the user to the second segment when the second indication indicates that a benefit of measuring affective response to the second segment does reach the second benefit level. Optionally, the semantic analyzer applies statistics on words that are correlated with certain emotional responses. Optionally, the semantic analyzer applies Latent Semantic Analysis in order to associate a segment of content with a likely subject. Optionally, the semantic analyzer evaluates the second segment shortly before the user is exposed to the second segment, whereby shortly is less than one minute. Optionally, the second segment is received from an interactive computer game that provides context information about the second segment that may be utilized by the semantic analyzer to compute the second indication.

In one embodiment, a method for utilizing semantic analysis to set a processing level of a processor processing affective response measurements, comprising: receiving a first indication derived from an evaluation comprising semantic analysis of a first segment of content; wherein the first segment comprises data representing text; determining that the first indication indicates that a first value related to a prediction of emotional response to the first segment does not reach a first predetermined threshold, and configuring a processor to operate at a first processing level to process measurements of affective response of a user to the first segment; receiving a second indication derived from an evaluation comprising semantic analysis of a second segment of content; wherein the second segment comprises data representing text; and determining that the second indication indicates that a second value related to a prediction of emotional response to the second segment reaches a second predetermined threshold, and configuring the processor to operate at a second processing level to process measurements of affective response of the user to the second segment; wherein, per volume unit of measurement data, number of computation cycles utilized by the processor to process, at the first processing level, measurements of the affective response of the user to the first segment, is significantly lower than number of computation cycles utilized by the processor to process, at the second processing level, measurements of the affective response of the user to the second segment. Optionally, the first and second indications indicate confidence in predictions of emotional response to the first and second segments, respectively; whereby based on the first indication, it is determined that confidence in the prediction of the emotional response to the first segment does not reach the first predetermined threshold, and based on the second indication, it is determined that confidence in the prediction of the emotional response to the second segment does reach the second predetermined threshold. Optionally, the first and second indications indicate expected magnitudes of change in affective response due to exposure to the first and second segments, respectively; whereby based on the first indication, it is determined that expected magnitude of change in affective response due to exposure to the first segment does not reach the first predetermined threshold, and based on the second indication, it is determined that expected magnitude of change to affective response due to exposure to the second segment does reach the second predetermined threshold. Optionally, the first and second indications indicate how beneficial it is to measure the affective response to the first and second segments, respectively; whereby based on the first indication, it is determined that benefit from measuring the affective response to the first segment does not reach the first predetermine threshold, and based on the second indication it is determined that benefit from measuring affective response to the second segment does reach the second predetermined threshold. Optionally, the processor is embedded in a battery powered device, and the measurements of affective response of the user to the second segment comprise physiological measurements of the user taken with a physiological sensor. Optionally, the processor is embedded in a battery powered device, and the measurements of affective response of the user to the second segment comprise comprises images of the user taken with an image capturing device. Optionally, the method further comprises forwarding, to a module that trains a measurement Emotional Response Predictor (measurement ERP), a label corresponding to an expected emotional response to being exposed to the second segment, and a sample comprising a product of the measurements of the affective response of the user to the second segment. Optionally, the method further comprises forwarding a product of the measurements of the affective response of the user to being exposed to the second segment to a measurement emotional response predictor.

In one embodiment, a system configured to utilize semantic analysis to set processing level for affective response measurements, comprising: a receiver configured to receive first and second indications derived from evaluations comprising semantic analysis of first and second segments of content, respectively; wherein the first and second segments comprise data representing text; and wherein the first indication indicates that a first value, which is a function of emotional response the first segment, does not reach a first predetermined threshold, and the second indication indicates that a second value, which is a function of emotional response to the second segment, does reach a second predetermined threshold; a selector configured to select, based on the first and second indications, first and second processing levels, respectively, for processing measurements of affective response; and a processor configured to receive first and second measurements of affective response of a user to the first and second segments, respectively; the processor is further configured to process the first measurements at the first processing level, and to process the second measurements at the second processing level; wherein, per volume unit of measurement data, the number of computation cycles utilized by the processor to process the first measurements is significantly lower than the number of computation cycles utilized by the processor to process the second measurements.

Predetermined Thresholds

In some embodiments described in this disclosure, segments of content are analyzed in order to predict an emotional response to the segments. For example, the analysis may be performed by a content ERA and/or a semantic analyzer. Optionally, analysis of a segment of content is performed in order to determine whether a value related to an emotional response emotional response to the segment of content reaches a predetermined threshold. Optionally, after analyzing the segment of content, an indication is generated indicating whether value related to the emotional response to the segment of content reaches the predetermined threshold. Optionally, the prediction of emotional response is a prediction of emotional response of the user 114. For example, the predicted emotional response of the user 114 is obtained from an emotional response predictor personalized for the user 114. Alternatively, the predicted emotional response to the segment may be the emotional response of another user (e.g., using a model of another user), or a generic "representative user". Optionally, based on whether the indication indicates that the predetermined threshold was reached, in different embodiments described herein, system components may be configured to operate in different ways.

In some embodiments, based on an indication, the controller 108, selects a certain mode of operation for the device 112. Optionally, selecting the certain mode of operation for the device 112 also involves configuring the device 112 to operate in the certain mode of operation. In other embodiments, based on an indication, the controller 154 selects for the processor 156 a certain processing level at which to process measurements of affective response. Optionally, selecting the certain processing level also involves configuring the processor 156 to operate at the certain processing level. In still other embodiments, based on an indication, the controller 175 selects a certain measuring rate for the device 177. Optionally, selecting the certain measuring rate also involves configuring the device 177 to measure at the certain measuring rate. And in yet other embodiments, based on an indication, the controller 204 selects for the processor 206 a certain processing level at which to process measurements of affective response. Optionally, selecting the certain processing level also involves configuring the processor 206 to process measurements of affective response at the certain processing level.

In some embodiments, first and second segments of content are analyzed, and based on the analysis, first and second indications are generated. Optionally, the first indication indicates whether a value related to a prediction of emotional response to the first segment reaches a first predetermined threshold. Optionally, the second indication indicates whether a value related to a prediction of emotional response to the second segment reaches a second predetermined threshold. It is to be noted that when stated that a value reaches a threshold, it is meant that the value equals the threshold or exceeds it. Below are listed examples of embodiments which describe different types of predetermined thresholds and how they may be utilized.

In one embodiment, the first and second predetermined thresholds represent first and second confidence levels for predictions of emotional response, respectively. That is, the first predetermined threshold represents the first confidence level, and the second predetermined threshold represents the second confidence level. Optionally, the first predetermined threshold and the second predetermined threshold may be the same, in which case the both represent the same confidence level. In this example, the first and second indications, indicate values representing confidence in predictions of emotional response to the first and second segments, respectively. That is, the first indication indicates confidence in the prediction of emotional response to the first segment, and similarly the second indication indicates confidence in the prediction of emotional response to the second segment. Optionally, a user's affective response may be processed and/or measured more extensively when the predictions of emotional response to the segments of content are made with high confidence. If the prediction of emotional response to a segment of content is made with low confidence, the system may elect not to measure the user's affective response to the segment, or to devote fewer resources for that purpose.

In one embodiment, based on the first indication 106a, it is determined that confidence in the prediction of the emotional response to the first segment 102a does not reach the first predetermined threshold. Accordingly, the first mode of operation 110a is selected for the device 112 for measuring affective response of the user 114 to the first segment 102a. Additionally, based on the second indication 106b, it is determined that confidence in the prediction of the emotional response to the second segment 102b does reach the second predetermined threshold. Accordingly, the second mode of operation 110b is selected for the device 112 for measuring affective response of the user 114 to the second segment 102b.

In another embodiment, based on the first indication 106a, it is determined that confidence in the prediction of the emotional response to the first segment 102a does not reach the first predetermined threshold. Accordingly, the first processing level 155a is selected for the processor 156 to process measurements of affective response of the user 114 to the first segment 102a. Additionally, based on the second indication 106b, it is determined that confidence in the prediction of the emotional response to the second segment 102b does reach the second predetermined threshold. Accordingly, the second processing level 155b is selected for the processor 156 to process measurements of affective response of the user 114 to the second segment 102b.

In yet another embodiment, based on the first indication 174a, it is determined that confidence in the prediction of the emotional response to the first segment 172a does not reach the first predetermined threshold. Accordingly, the first measuring rate 176a is selected for the device 177 for measuring affective response of the user 114 to the first segment 172a. Additionally, based on the second indication 174b, it is determined that confidence in the prediction of the emotional response to the second segment 172b does reach the second predetermined threshold. Accordingly, the second measuring rate 176b is selected for the device 177 for measuring affective response of the user 114 to the second segment 172b.

In still embodiment, based on the first indication 203a, it is determined that confidence in the prediction of the emotional response to the first segment 172a does not reach the first predetermined threshold. Accordingly, the first processing level 205a is selected for the processor 206 to process measurements of affective response of the user 114 to the first segment 172a. Additionally, based on the second indication 203b, it is determined that confidence in the prediction of the emotional response to the second segment 172b does reach the second predetermined threshold. Accordingly, the second processing level 205b is selected for the processor 206 to process measurements of affective response of the user 114 to the second segment 172b.

In another example, the first and second predetermined thresholds represent first and second magnitudes of affective response and/or change in affective response, respectively. That is, the first predetermined threshold represents the first magnitude, and the second predetermined threshold represents the second magnitude. Optionally, the first predetermined threshold and the second predetermined threshold may be the same, in which case the both represent the same magnitude of change in affective response. In this example, the first and second indications, indicate values representing expected magnitudes and/or expected magnitude of change in affective response due to exposure to the first segment and the second segments, respectively. The expected magnitude and/or magnitudes of change may be derived from predictions of emotional response to the first and second segments. Optionally, the predictions are performed by the content ERA, a semantic analyzer and/or a content ERP.

In one example, more power may be typically devoted to measure the user's affective response to a segment of content when a there is expected to be a noticeable change to the user's affective response; while in other cases, when the change to the user's affective response is not predicted to be significant, the user's affective response may be cursorily measured (e.g., takes noisy and/or sporadic measurements).

In another example, a user's affective response may be measured more extensively when the user is expected to feel a certain type of emotion. For instance, a computer game may provide the user with segments of content that may be intense, possibly frightening, action sequences. When a user is exposed to a segment, the user's affective response may be measured in order to determine more precisely how much the segment influenced the user, and possibly identify what elements in the content influenced the user substantially. In this example, affective response of the user to a segment may be measured (or measured more extensively) if analysis of the segment indicates that the user is expected to be frightened or excited by the segment (e.g., analysis of the segment may reveal it to be intense and action packed). In this example, the first and second indications may indicate whether the segments are predicted to frighten and/or excite the user. If it is determined that a segment is likely not to frighten and/or excite the user, measurements may be taken more extensively and/or processed more extensively. In this example, the indications may indicate how discernable measurements of affective response, which reflect a certain emotion (e.g., fright), are likely to be.

In one embodiment, based on the first indication 106a, it is determined that expected magnitude of change in affective response due to exposure to the first segment 102a does not reach the first predetermined threshold. Accordingly, the first mode of operation 110a is selected for the device 112 for measuring affective response of the user 114 to the first segment 102a. Additionally, based on the second indication 106b, it is determined that expected magnitude of change to affective response due to exposure to the second segment 102b does reach the second predetermined threshold. Accordingly, the second mode of operation 110b is selected for the device 112 for measuring affective response of the user 114 to the second segment 102b.

In another embodiment, based on the first indication 106a, it is determined that expected magnitude of change in affective response due to exposure to the first segment 102a does not reach the first predetermined threshold. Accordingly, the first processing level 155a is selected for the processor 156 to process measurements of affective response of the user 114 to the first segment 102a. Additionally, based on the second indication 106b, it is determined that expected magnitude of change to affective response due to exposure to the second segment 102b does reach the second predetermined threshold. Accordingly, the second processing level 155b is selected for the processor 156 to process measurements of affective response of the user 114 to the second segment 102b.

In yet another embodiment, based on the first indication 174a, it is determined that expected magnitude of change in affective response due to exposure to the first segment 172a does not reach the first predetermined threshold. Accordingly, the first measuring rate 176a is selected for the device 177 for measuring affective response of the user 114 to the first segment 172a. Additionally, based on the second indication 174b, it is determined that expected magnitude of change to affective response due to exposure to the second segment 172b does reach the second predetermined threshold. Accordingly, the second measuring rate 176b is selected for the device 177 for measuring affective response of the user 114 to the second segment 172b.

In still another embodiment, based on the first indication 203a, it is determined that expected magnitude of change in affective response due to exposure to the first segment 172a does not reach the first predetermined threshold. Accordingly, the first processing level 205a is selected for the processor 206 to process measurements of affective response of the user 114 to the first segment 172a. Additionally, based on the second indication 1203b, it is determined that expected magnitude of change to affective response due to exposure to the second segment 172b does reach the second predetermined threshold. Accordingly, the second processing level 205b is selected for the processor 206 to process measurements of affective response of the user 114 to the second segment 172b.

In another example, the first and second predetermined thresholds represent first and second benefit levels, respectively. That is, the first predetermined threshold represents the first benefit level, and the second predetermined threshold represents the second benefit level. Optionally, the first predetermined threshold and the second predetermined threshold may be the same, in which case the both represent the same benefit level. In this example, the first and second indications, indicate how beneficial it is to measure the affective response to the first and second segments, respectively. That is, the first indication indicates a benefit expected from measuring affective response of the user to the first segment, and the second indication indicates a benefit expected from measuring affective response of the user to the second segment.

In one embodiment, affective response of a user to segments of content are measured more extensively and/or processed more extensively when it is beneficial to determine the user's emotional response. In one example, there may be a benefit to determine a user's emotional response to content if there are opportunities to customize the content and/or offer services to the user based on the user's emotional response. In another example, determining an emotional response of a user to content may be more beneficial if the corresponding measurement data is required to generate a model of the user (e.g., to train a content ERP personalized for the user). If the user already has a well-trained model, it may be less beneficial to measure the user. However, if the user has an incomplete model, or lacks a model altogether, it may be more beneficial to measure the user in order to obtain training data to train a model for the user.

In one embodiment, based on the first indication 106a, it is determined that a benefit of measuring affective response to the first segment does not reach the first predetermined threshold. Accordingly, the first mode of operation 110a is selected for the device 112 for measuring affective response of the user 114 to the first segment 102a. Additionally, based on the second indication 106b, it is determined that a benefit from measuring affective response to the second segment 102b does reach the second predetermined threshold. Accordingly, the second mode of operation 110b is selected for the device 112 for measuring affective response of the user 114 to the second segment 102b.

In another embodiment, based on the first indication 106a, it is determined that a benefit of measuring affective response to the first segment does not reach the first predetermined threshold. Accordingly, the first processing level 155a is selected for the processor 156 to process measurements of affective response of the user 114 to the first segment 102a. Additionally, based on the second indication 106b, it is determined that a benefit from measuring affective response to the second segment 102b does reach the second predetermined threshold. Accordingly, the second processing level 155b is selected for the processor 156 to process measurements of affective response of the user 114 to the second segment 102b.

In yet another embodiment, based on the first indication 174a, it is determined that a benefit of measuring affective response to the first segment 172a does not reach the first predetermined threshold. Accordingly, the first measuring rate 176a is selected for the device 177 for measuring affective response of the user 114 to the first segment 172a. Additionally, based on the second indication 174b, it is determined that a benefit from measuring affective response to the second segment 172b does reach the second predetermined threshold. Accordingly, the second measuring rate 176b is selected for the device 177 for measuring affective response of the user 114 to the second segment 172b.

In still another embodiment, based on the first indication 203a, it is determined that a benefit of measuring affective response to the first segment 172a does not reach the first predetermined threshold. Accordingly, the first processing level 205a is selected for the processor 2066 to process measurements of affective response of the user 114 to the first segment 172a. Additionally, based on the second indication 203b, it is determined that a benefit from measuring affective response to the second segment 172b does reach the second predetermined threshold. Accordingly, the second processing level 205b is selected for the processor 206 to process measurements of affective response of the user 114 to the second segment 172b.

Affective Response Measurements

In some embodiments, a device used to measure affective response of a user may include one or more sensors, be a sensor, and/or be part of a sensor. Optionally, a sensor may include, without limitation, one or more of the following: a physiological sensor, an image capturing device, a microphone, a movement sensor, a pressure sensor, and/or a magnetic sensor.

Herein, a "sensor" may refer to a whole structure housing a device used for measuring a physical property, or to one or more of the elements comprised in the whole structure. For example, when the sensor is a camera, the word sensor may refer to the entire structure of the camera, or just to its CMOS detector.

A physiological signal is a value that reflects a person's physiological state. Some examples of physiological signals that may be measured include: Heart Rate (HR), Blood-Volume Pulse (BVP), Galvanic Skin Response (GSR), Skin Temperature (ST), respiration, electrical activity of various body regions or organs such as brainwaves measured with electroencephalography (EEG), electrical activity of the heart measured by an electrocardiogram (ECG), electrical activity of muscles measured with electromyography (EMG), and electrodermal activity (EDA) that refers to electrical changes measured at the surface of the skin.

A person's affective response may be expressed by behavioral cues, such as facial expressions, gestures, and/or other movements of the body. Behavioral measurements of a user may be obtained utilizing various types of sensors, such as an image capturing device (e.g., a camera), a movement sensor, an acoustic sensor, an accelerometer, a magnetic sensor, and/or a pressure sensor.

In one embodiment, images of the user are captured with an image capturing device such as a camera. In another embodiment, images of the user are captured with an active image capturing device that transmits electromagnetic radiation (such as radio waves, millimeter waves, or near visible waves) and receives reflections of the transmitted radiation from the user. Optionally, captured images are in two dimensions and/or three dimensions. Optionally, captured images are comprised of one or more of the following types: single images, sequences of images, video clips.

Affective response measurement data, such as the data generated by a device used to measure affective response, may be processed in many ways. The processing of the affective response measurement data may take place before, during and/or after the data is stored and/or transmitted. Optionally, at least some of the processing of the data is performed by a sensor that participates in the collection of the measurement data. Optionally, at least some of the processing of the data is performed by a processor that receives the data in raw (unprocessed) form, or partially processed form. There are various ways in which affective response measurement data may be processed in the different embodiments, some of them are described in the following embodiments and examples:

In some embodiments, at least some of the affective response measurements may undergo signal processing, such as analog signal processing, discrete time signal processing, and/or digital signal processing.

In some embodiments, at least some of the affective response measurements may be scaled and/or normalized. For example, the measurement values may be scaled to be in the range $[-1,+1]$. In another example, the values of some of the measurements are normalized to z-values, which bring the mean of the values recorded for the modality to 0, with a variance of 1. In yet another example, statistics are extracted from the measurement values, such as statistics of the minimum, maximum, and/or various moments of the distribution, such as the mean, variance, or skewness. Optionally, the statistics are computed for measurement data that includes time-series data, utilizing fixed or sliding windows.

In some embodiments, at least some of the affective response measurements may be subjected to feature extraction and/or reduction techniques. For example, affective response measurements may undergo dimensionality-reducing transformations such as Fisher projections, Principal Component Analysis (PCA), and/or feature subset selection techniques like Sequential Forward Selection (SFS) or Sequential Backward Selection (SBS).

In some embodiments, affective response measurements comprising images and/or video may be processed in various ways. In one example, algorithms for identifying cues like movement, smiling, laughter, concentration, body posture, and/or gaze, are used in order to detect high-level image features. Additionally, the images and/or video clips may be analyzed using algorithms and/or filters for detecting and/or localizing facial features such as location of eyes, brows, and/or the shape of mouth. Additionally, the images and/or video clips may be analyzed using algorithms for detecting facial expressions and/or micro-expressions.

In another example, images are processed with algorithms for detecting and/or describing local features such as Scale-Invariant Feature Transform (SIFT), Speeded Up Robust Features (SURF), scale-space representation, and/or other types of low-level image features.

In some embodiments, processing affective response measurements involves compressing and/or encrypting portions of the data. This may be done for a variety of reasons, for instance, in order to reduce the volume of measurement data that needs to be transmitted. Another reason to use compression and/or encryption is that it helps protect the privacy of a measured user by making it difficult for unauthorized parties to examine the data. Additionally, the compressed data may be pre-processed prior to its compression.

In addition, the literature describes various algorithmic approaches that can be used for processing affective response measurements, acquired utilizing various types of sensors. Some embodiments may utilize these known, and possibly other yet to be discovered, methods for processing affective response measurements. Some examples include: (i) a variety of physiological measurements may be preprocessed according to the methods and references listed in van Broek, E. L., Janssen, J. H., Zwaag, M. D., D. M. Westerink, J. H., & Healey, J. A. (2009), Prerequisites for Affective Signal Processing (ASP), In Proceedings of the International Joint Conference on Biomedical Engineering Systems and Technologies, INSTICC Press, incorporated herein by reference; (ii) a variety of acoustic and physiological signals may be pre-processed and have features extracted from them according to the methods described in the references cited in Tables 2 and 4, Gunes, H., & Pantic, M. (2010), Automatic, Dimensional and Continuous Emotion Recognition, International Journal of Synthetic Emotions, 1 (1), 68-99, incorporated herein by reference; (iii) Pre-processing of Audio and visual signals may be performed according to the methods described in the references cited in Tables 2-4 in Zeng, Z., Pantic, M., Roisman, G., & Huang, T. (2009), A survey of affect recognition methods: audio, visual, and spontaneous expressions, IEEE Transactions on Pattern Analysis and Machine Intelligence, 31 (1), 39-58, incorporated herein by reference; and (iv) pre-processing and feature extraction of various data sources such as images, physiological measurements, voice recordings, and text based-features, may be performed according to the methods described in the references cited in Tables 1,2,3,5 in Calvo, R. A., & D'Mello, S. (2010). Affect Detection: An Interdisciplinary Review of Models, Methods, and Their Applications. IEEE Transactions on affective computing 1(1), 18-37, incorporated herein by reference.

In some embodiments, the duration in which devices operate in order to measure the user's affective response may differ depending on one or more of the following: (i) the type of content the user is exposed to, (ii) the type of physiological and/or behavioral signal being measured, and (iii) the type of sensor utilized for the measurement. In some cases, the user's affective response to a segment of content may be measured by a device substantially continually throughout the period in which the user is exposed to the segment of content. However, in other cases, the duration during which the user's affective response to the segment of content is measured need not necessarily overlap, or be entirely contained in the time in which the user is exposed to the segment of content.

With some physiological signals, there is an inherent delay between the time in which a stimulus occurs and changes the user's emotional state, and the time in which the corresponding affective response is observed via a change in the physiological signal's measurement values. For example, an affective response comprising changes in skin temperature may take several seconds to be detected by a sensor. In addition, some physiological signals may depart very rapidly from baseline values, but take much longer to return to the baseline values.

In some cases, the physiological signal might change quickly as a result of a stimulus, but returning to the pervious baseline value (from before the stimulus), may take much longer. For example, the heart rate of a person viewing a movie in which there is a startling event may increase dramatically within a second; however, it can take tens of seconds and even minutes for the person to calm down and for the heart rate return to a baseline level.

The lag in time it takes affective response to be manifested in certain physiological and/or behavioral signals can lead to it that the period in which the affective response is measured occurs after the exposure to the content. Thus, in some embodiments, measuring the affective response of the user to the segment of content may end, and possibly even also start, essentially after the user is exposed to the segment of content. For example, measuring the user's response to a surprising short scene in a video clip (e.g., a gunshot lasting a second), may involve taking a GSR measurement a couple of seconds after the gunshot was played to the user. In another example, the user's affective response to playing a level in a computer game may include taking heart rate measurements lasting even minutes after the game play is completed.

In some embodiments, determining the user's affective response to the segment of content may utilize measurement values corresponding to a fraction of the time the user was exposed to the segment of content. The user's affective response to the segment of content may be measured by obtaining values of a physiological signal that is slow to change, such as skin temperature, and/or slow to return to baseline values, such as heart rate. In such cases, measuring the user's affective response to a segment of content does not have to involve continually measuring the user throughout the duration in which the user is exposed to the segment of content. Since such physiological signals are slow to change, reasonably accurate conclusions regarding the user's affective response to the segment of content may be reached from samples of intermittent measurements taken at certain periods during the exposure (the values corresponding to times that are not included in the samples can be substantially extrapolated). In one example, measuring the user's affective response to playing a computer game involves taking measurements during short intervals spaced throughout the user's exposure, such as taking a GSR measurement lasting two seconds, every ten seconds. In another example measuring the user's response to a video clip with a GSR, heart rate and/or skin temperature sensor may involve operating the sensor mostly during certain portions of the video clip, such as a ten-second period towards the end of the clip.

In some embodiments, determining the user's affective response to the segment of content may involve measuring a physiological and/or behavioral signal of the user before and/or after the user is exposed to the segment of content. Optionally, this is done in order to establish a baseline value for the signal to which measurement values of the user taken during the exposure to the segment of content, and/or shortly after the exposure, can be compared. For example, the user's heart rate may be measured intermittently throughout the duration, of possibly several hours, in which the user plays a multiplayer game. The values of these measurements are used to determine a baseline value to which measurements taken during a short battle in the game can be compared in order to compute the user's affective response to the battle. In another example, the user's brainwave activity is measured a few seconds before displaying an exciting video clip, and also while the clip is played to the user. Both sets of values, the ones measured during the playing of the clip and the ones measured before it, are compared in order to compute the user's affective response to the clip.

Eye Tracking

In some embodiments, "eye tracking" is a process of measuring either the point of gaze of the user (where the user is looking) or the motion of an eye of the user relative to the head of the user. An eye tracker is a device for measuring eye positions and/or movement of the eyes. Optionally, the eye tracker and/or other systems measure positions of the head and/or movement of the head. Optionally, an eye tracker may be head mounted, in which case the eye tracking system measures eye-in-head angles. However, by adding the head position and/or direction to eye-in-head direction, it is possible to determine gaze direction. Optionally, the eye tracker device may be remote relative to the user (e.g., a video camera directed at the user), in which case the eye tracker may measure gaze angles.

Those skilled in the art may realize that there are various types of eye trackers and/or methods for eye tracking that may be used. In one example, eye tracking is done using optical tracking, which track the eye and/or head of the user; e.g., a camera may focus on one or both eyes and record their movement as the user looks at some kind of stimulus. In another example, eye tracking is done by measuring the movement of an object, such as a contact lens, attached to the eye. In yet another example, eye tracking may be done by measuring electric potentials using electrodes placed around the eyes.

In some embodiments, an eye tracker generates eye tracking data by tracking the user 114, for a certain duration. Optionally, eye tracking data related to a segment of content is generated by tracking the user 114 as the user 114 is exposed to the segment. Optionally, the segment of content includes visual content, and the user 114 is exposed to the segment by viewing the segment on a display (e.g., on a screen or on a head-mounted display). Optionally, tracking the user 114 is done utilizing an eye tracker that is part of a content delivery module through which the user is exposed to content (e.g., a camera embedded in a phone or tablet, or a camera or electrodes embedded in a head-mounted device that has a display).

There may be various formats for eye tracking data, and eye tracking data may provide various insights. For example, eye tracking data may indicate a direction and/or an object the user 114 was looking at, a duration the user 114 looked at a certain object and/or in certain direction, and/or a pattern and/or movement of the line of sight of the user 114. Optionally, the eye tracking data may be a time series, describing for certain points in time a direction and/or object the user 114 was looking at. Optionally, the eye tracking data may include a listing, describing total durations and/or time intervals, in which the user was looking in certain directions and/or looking at certain objects.

In one embodiment, eye tracking data is utilized to determine a gaze-based attention. Optionally, the gaze-based attention is a gazed-based attention of the user 114 and is generated from eye tracking data of the user 114. Optionally, the eye tracking data of the user 114 is acquired while the user is consuming content and/or in temporal vicinity of when a user consumes the content. Optionally, gaze-based attention may refer to a level of attention the user 114 paid to the segment of content the user 114 consumed.

For example, if the user looks in a direction of the content and focuses on the content while consuming the segment, the gaze-based attention level at that time may be considered high. However, if the user only glances cursorily at the content, or generally looks in a direction other than the content while being exposed to the segment, the gaze-based attention level to the segment at that time may be low. Optionally, the gaze-based attention level may be determined for a certain duration, such as a portion of the time a segment of content is displayed to the user 114. Thus, for example, different durations that occur within the presentation of a certain segment of content may have different corresponding gaze-based attention levels according to eye tracking data collected in each duration.

In one example, a gaze-based attention level of the user to a segment of content may be computed, at least in part, based on difference between the direction of sight of the user, and the direction from the eyes of the user to a display on which the segment is presented. Optionally, the gaze-based attention level of the user to a segment of content is computed according to the difference between the average direction the user was looking at during a duration in which the segment was being displayed, compared to the average direction of the display (relative to the user), during the duration. Optionally, the smaller the difference between the direction of sight and the direction of the content, the higher the gazed-based attention level. Optionally, the gaze-based attention level may be expressed by a value inversely proportional to the difference in the two directions (e.g., inversely proportional to the angular difference).

In another example, a gaze-based attention level of the user 114 to a segment of content may be computed, at least in part, based on the portion time, during a certain duration, in which the user 114 gazes in the direction of the segment of content (e.g., looking at a module on which the content is displayed). Optionally, the gazed-based attention level is proportional to the time spent viewing the content during the duration. For example, if it is determined that the user 114 spent 60% of the duration looking directly at the content, the gaze-based attention level may be reported as 60%.

In still another example, a gaze-based attention level of the user 114 to a segment of content may be computed, at least in part, based on the time the user 114 spent gazing at certain objects belonging to the content. For example, certain objects in the segment may be deemed more important than others (e.g., a lead actor, a product being advertised). In such a case, if the user 114 is determined to be gazing at the important objects, it may be considered that the user is paying attention to the content. However, if the user 114 is determined to be gazing at the background or at objects that are not important, it may be determined that the user 114 is not paying attention to the content (e.g., the user 114 is daydreaming). Optionally, the gaze-based attention level of the user 114 to the segment of content is a value indicative of the total time and/or percent of time that the user 114 spent during a certain duration gazing at important objects in the segment of content.

In yet another example, a gaze-based attention level of the user 114 to a segment of content may be computed, at least in part, based on a pattern of gaze direction of the user 114 during a certain duration. For example, if the user gazes away from the content many times, during the duration, which may indicate that there were distractions that made it difficult for the user 114 to pay attention to the segment. Thus, the gaze-based attention level of the user 114 to the segment may be inversely proportional to the number of times the user 114 changed the direction at which the user 114 gazed, e.g., looking and looking away from the content), and/or the frequency at which the user looked away from the content.

In one example, a gaze-based attention level of the user 114 to a segment of content may be computed, at least in part, based on physiological cues of the eyes of the user. For example, the size of the pupil is known to be linked to the attention level; pupil dilation may indicate increased attention of the user in the content. In another example, a blinking rate and/or pattern may also be used to determine attention level of the user. In yet another example, if the eyes of the user are shut for extended periods during the presentation of content, which may indicate a low level of attention (at least to visual content).

In one embodiment, a gaze-based attention level of the user 114 to a segment is computed by providing one or more of the data described in the aforementioned examples (e.g., values related to direction and/or duration of gaze, pupil size), are provided to a function that computes a value representing the gaze-based attention level. For example, the function may be part of a machine learning predictor (e.g., neural net, decision tree, regression model). Optionally, computing the gaze-based attention level may rely on additional data extracted from sources other than eye tracking. In one example, values representing the environment are used to predict the value, such as the location (at home vs. in the street), the number of people in the room with the user (if alone it is easier to pay attention than when with company), and/or the physiological condition of the user (if the user is tired or drunk it is more difficult to pay attention). In another example, values derived from the content may be used in computing the attention level, such as the type or genre of content, the duration of the content, may also be factors that may be considered in the computation. In yet another example, prior attention levels of the user and/or other users to similar content may be used in the computation (e.g., a part that many users found distracting may also be distracting to the user).

In one embodiment, a gaze-based attention level is represented by one or more values. For example, the attention level may be a value between 1 and 10, with 10 representing the highest attention level. In another example, the attention level may be a value representing the percentage of time the user was looking at the content. In yet another example, the attention level may be expressed as a class or category (e.g., "low attention"/"medium attention"/"high attention", or "looking at content"/"looking away"). Optionally, a classifier (e.g., decision tree, neural network, Naive Bayes) may be used to classify eye tracking data, and possibly data from additional sources, into a class representing the gaze-based attention level.

Content

Content the user consumes during interactions with a digital device can take many forms. Optionally, a user consumes content by being exposed to the content and/or from gaining and/or learning information due to the exposure to the content. The content may also originate from various sources. One thing common to the various forms of content is that content conveys information, and by being exposed to the content, the user may gain and/or learn certain information. Additionally, in some cases, gaining the information conveyed by the content may cause the user to have an affective response; such an affective response is considered an affective response of the user to the content (or phrased alternatively, "the user's affective response to the content").

In one embodiment, the user is exposed to a segment of content that is generated as part of a conversation between entities, such as humans and/or computers (e.g., an artificial intelligence). The conversation may be between same types of entities (e.g., a conversation between humans), or different types of entities (e.g., a conversation between a user and a computer). Optionally, one of the sides to the conversation may be the user 114. The conversation may take place utilizing one or more channels for conveying information, such as a voice conversation, video conversation, exchange of instant messages, and dialogue between characters in a virtual environment (e.g., characters in a multi-player game).

In one embodiment, the user is exposed to content comprising a text message. The text message may be one or more of the following: an instant message, an e-mail, blog post, an article, and/or status update on a social network site.

In one embodiment, the user is exposed to content comprising images such as still images and/or video. In one example, the content originates from a computerized source, such as a video clip from an Internet site, and/or a video content generated by a computer game (e.g., depicting characters in a virtual world).

In one embodiment, the user is exposed to content comprising non-verbal audio sounds. In one example, the content includes music. In another example, the content includes sound effects, such as sound effects accompanying a computer game (e.g., noises corresponding to shots and/or explosions).

In one embodiment, the user is exposed to content in the form of messages and/or feedback from a computerized system the user interacts with. For example, these messages can be system messages such as an indication that the user received a message, an event reminder, a hardware-related message (e.g., no wireless signal). In another example, the content may include feedback from a message composition system, such as highlighting spelling and/or grammar mistakes in a text being composed by a user.

In some embodiments, the segment of content includes one or more portions of content that the user may be exposed to over a period of time. In some cases, a portion of content may belong to multiple segments, for example, a scene from a movie may belong to several segments of the movie, having different lengths and/or starting times in the movie.

The segment of content may possess varying lengths and sizes, optionally depending on the type of content the segment includes and the context in which the segment is used. In one example, the segment of content includes a portion of video lasting a fraction of a second (e.g., a portion of video depicting a gunshot). In another example, the segment of content involves a whole movie, and in this case the segment may span hours.

In some embodiments, the segment of content may involve a single item to which the user may be exposed. For example, the segment of content may be a message, a sentence, a conversation, a video clip, a video generated while playing a level in a computer game, or a whole movie. In other cases, the segment of content may be a portion of a content item. For example, the segment of content may include part of an uttered sentence, a few seconds from a video clip, video comprising a few play moves in a computer game, or a single correction suggested by a system in text composition. And in yet other cases, the segment of content may include multiple content items. For example, the segment of content may include multiple commercials the user views, an email or text message thread, and/or computer game content from playing multiple games.

In some embodiments, the segment of content may include multiple items, and the user may be concurrently exposed to more than one of the items included in the segment of content.

For example, a user viewing content on a social network site may be exposed simultaneously to several status posts, images, and/or videos, which together can be considered a segment of social network content, or multiple segments of content, optionally depending on the context in which the content is examined.

Predictor

In one embodiment, a module that receives a query that includes a sample (e.g., a vector of feature values), and predicts a label for that sample (e.g., a class associated with the sample), is referred to as a "predictor". A sample provided to a predictor in order to receive a prediction for it may be referred to as a "query sample". Additionally, the pair that includes a sample and its corresponding label may be referred to as a "labeled sample".

In some embodiments, a sample for a predictor (e.g., a sample used as training data and/or a query sample) includes one or more feature values. Optionally, at least some of the feature values are numerical values. Optionally, at least some of the feature values may be categorical values that may be represented as numerical values (e.g., via indexes for different categories).

In some embodiments, a label that may serve as prediction value for a query sample provided to a predictor, may take one or more types of values. For example, a label maybe include a discrete categorical value (e.g., a category), a numerical value (e.g., a real number), and/or a multidimensional value (e.g., a point in multidimensional space).

In one embodiment, a predictor utilizes a model in order to make predictions for a given query sample. There is a plethora of machine learning algorithms for training different types of models that can be used for this purpose. Some of the algorithmic approaches that may be used for creating the predictor are classification, clustering, function prediction, and/or density estimation. Those skilled in the art can select the appropriate type of model depending on the characteristics of the training data (e.g., its dimensionality), and/or the type of value used as labels (e.g., discrete value, real value, or multidimensional).

For example, classification methods like Support Vector Machines (SVMs), Naive Bayes, nearest neighbor, and/or neural networks can be used to create a predictor of a discrete class label. In another example, algorithms like a support vector machine for regression, neural networks, and/or gradient boosted decision trees can be used to create a predictor for real-valued labels, and/or multidimensional labels. In yet another example, a predictor may utilize clustering of training samples in order to partition a sample space such that new query samples can be placed in clusters and assigned labels according to the clusters they belong to. In somewhat similar approach, a predictor may utilize a collection of labeled samples in order to perform nearest neighbor classification (in which a query sample is assigned a label according to the labeled samples that are nearest to them in some space).

In one embodiment, semi-supervised learning methods are used to train a predictor's model, such as bootstrapping, mixture models and Expectation Maximization, and/or co-training. Semi-supervised learning methods are able to utilize as training data unlabeled samples in addition to the labeled samples.

In one embodiment, a predictor may return as a label other samples that are similar to a given query sample. For example, a nearest neighbor approach method may return one or more samples that are closest in the data space to the query sample (and thus in a sense are most similar to it.)

In one embodiment, in addition to a label predicted for a query sample, a predictor may provide a value describing a level of confidence in its prediction of the label. In some cases, the value describing the confidence level may be derived directly from the prediction process itself. For example, a predictor utilizing a classifier to select a label for a given query sample may provide a probability or score according to which the specific label was chosen (e.g., a Naive Bayes' posterior probability of the selected label, or a probability derived from the distance of the sample from the hyperplane when using an SVM).

In one embodiment, a predictor making a prediction for a query sample returns a confidence interval as its prediction or in addition to a predicted label. A confidence interval is a range of values and an associated probability that represents the chance that the true value corresponding to the prediction falls within the range of values. For example, if a prediction is made according to an empirically determined Normal distribution with a mean m and variance $s^2$, the range $[m-2s, m+2s]$ corresponds approximately to a 95% confidence interval surrounding the mean value m.

The type and quantity of training data used to train a predictor's model can have a dramatic influence on the quality of the predictions made by the predictor. Generally speaking, the more data available for training a model, and the more the training samples are similar to the samples on which the predictor will be used (also referred to as test samples), the more accurate the predictions for the test samples are likely to be. Therefore, when training a model that will be used to make predictions regarding a specific user, it may be beneficial to collect training data from the user (e.g., data comprising measurements of the specific user).

Emotional Response Predictors (ERP)

In the embodiments, a predictor that predicts a label that is related to an emotional response may be referred to as a "predictor of emotional response" or an Emotional Response Predictor (ERP). A predictor of emotional response that receives a query sample that includes features that describe a segment of content may be referred to as a predictor of emotional response from content, a "content emotional response predictor", and/or a "content ERP". Similarly, a predictor of emotional response that receives a query sample that includes features derived from measurements of a user, such as affective response measurements taken with a device and/or a sensor, may be referred to as a predictor of emotional response from measurements, a "measurement response predictor", and/or a "measurement ERP". Additionally, a model utilized by an ERP to make predictions may be referred to as an "emotional response model".

In some embodiments, a model used by an ERP (e.g., a content ERP and/or a measurement ERP), is primarily trained on data collected from one or more different users that are not the user 114; for instance, at least 50% of the training data used to train the model does not involve the user 114. In such a case, a prediction of emotional response made utilizing such a model may be considered a prediction of the emotional response of a representative user. It is to be noted that the representative user may in fact not correspond to an actual single user, but rather correspond to an "average" of a plurality of users. Additionally, under the assumption that the user 114 has emotional responses that are somewhat similar to other users' emotional responses, the prediction of emotional response for the representative user may be used in order to determine the likely emotional response of the user 114.

In some embodiments, a label returned by an ERP may represent an affective response, such as a value of a physiological signal (e.g., GSR, heart rate) and/or a behavioral cue (e.g., smile, frown, or blush).

In some embodiments, a label returned by an ERP may be a value representing a type of emotional response and/or derived from an emotional response. For example, the label my indicate a level of interest and/or whether the response can be classified as positive or negative (e.g., "like" or "dislike").

In some embodiments, a label returned by an ERP may be a value representing an emotion. In the embodiments, there are several ways to represent emotions (which may be used to represent emotional states and emotional responses as well). Optionally, but not necessarily, an ERP utilizes one or more of the following formats for representing emotions returned as its predictions.

In one embodiment, emotions are represented using discrete categories. For example, the categories may include three emotional states: negatively excited, positively excited, and neutral. In another example, the categories include emotions such as happiness, surprise, anger, fear, disgust, and sadness.

In one embodiment, emotions are represented using a multidimensional representation, which typically characterizes the emotion in terms of a small number of dimensions. In one example, emotional states are represented as points in a two dimensional space of Arousal and Valence. Arousal describes the physical activation and valence the pleasantness or hedonic value. Each detectable experienced emotion is assumed to fall in a specified region in that 2D space. Other dimensions that are typically used to represent emotions include: potency/control (refers to the individual's sense of power or control over the eliciting event), expectation (the degree of anticipating or being taken unaware), and intensity (how far a person is away from a state of pure, cool rationality). The various dimensions used to represent emotions are often correlated. For example, the values of arousal and valence are often correlated, with very few emotional displays being recorded with high arousal and neutral valence. In one example, emotions are represented as points on a circle in a two dimensional space pleasure and arousal, such as the circumflex of emotions.

In one embodiment, emotions are represented using a numerical value that represents the intensity of the emotional state with respect to a specific emotion. For example, a numerical value stating how much the user is enthusiastic, interested, and/or happy. Optionally, the numeric value for the emotional state may be derived from a multidimensional space representation of emotion; for instance, by projecting the multidimensional representation of emotion to the nearest point on a line in the multidimensional space.

In one embodiment, emotional states are modeled using componential models that are based on the appraisal theory, as described by the OCC model (Ortony, A.; Clore, G. L.; and Collins, A. 1988. The Cognitive Structure of Emotions. Cambridge University Press). According to this theory, a person's emotions are derived by appraising the current situation (including events, agents, and objects) with respect to the person goals and preferences.

In one embodiment, a measurement ERP is used to predict an emotional response of a user from a query sample that includes feature values derived from affective response measurements. Optionally, the affective response measurements are preprocessed and/or undergo feature extraction prior to being received by the measurement ERP. Optionally, the prediction of emotional response made by the measurement ERP is a prediction of the emotional response of the user 114. Alternatively or additionally, the prediction of emotional response made by the measurement ERP is a prediction of emotional response of a representative user.

There are various methods in which a measurement ERP may predict emotional response from measurements of affective response. Examples of methods that may be used in some embodiments include: (i) physiological-based predictors as described in Table 2 in van den Broek, E. L., et al. (2010) Prerequisites for Affective Signal Processing (ASP)—Part II. In: Third International Conference on Bio-Inspired Systems and Signal Processing, Biosignals 2010; and/or (ii) Audio- and visual-based predictors as described in Tables 2-4 in Zeng, Z., Pantic, M., Roisman, G. I., and Huang, T. S. (2009) A Survey of Affect Recognition Methods: Audio, Visual, and Spontaneous Expressions. IEEE Transaction on Pattern Analysis and Machine Intelligence, Vol. 31(1), 39-58.

In one embodiment, a measurement ERP may need to make decisions based on measurement data from multiple types of sensors (often referred to in the literature as multiple modalities). This typically involves fusion of measurement data from the multiple modalities. Different types of data fusion may be employed, for example feature-level fusion, decision-level fusion, or model-level fusion, as discussed in Nicolaou, M. A., Gunes, H., & Pantie, M. (2011), Continuous Prediction of Spontaneous Affect from Multiple Cues and Modalities in Valence-Arousal Space, IEEE Transactions on Affective Computing.

In one embodiment, a content ERP is used to predict an emotional response of a user from a query sample that includes feature values derived from a segment of content. Optionally, the segment of content is preprocessed and/or undergoes feature extraction prior to being received by the content ERP. Optionally, the prediction of emotional response to the segment of content made by the content ERP is a prediction of the emotional response of the user 114 to the segment of content. Alternatively or additionally, the prediction of emotional response to the segment of content made by the content ERP is a prediction of emotional response of a representative user.

In one embodiment, feature values are used to represent at least some aspects of a segment of content. Various methods may be utilized to represent aspects of a segment of content into feature values. For example, the text in a segment that includes text content can be converted to N-gram or bag of words representations, in order to set the values of at least some of the feature values. In another example, an image or video clip from a segment that includes visual content may be converted to features by applying various low-pass and/or high-pass filters; object, gesture and/or face recognition procedures; genre recognition; and/or dimension reduction techniques. In yet another example, auditory signals are converted to features values such as low-level features describing acoustic characteristics such as loudness, pitch period and/or bandwidth of the audio signal. In still another example, semantic analysis may be utilized in order to determine feature values that represent the meaning of the content of a segment.

There are many feature extraction methods mentioned in the literature that can be utilized to create features for audio-, image-, and/or video-containing content. For example, useful feature extraction methods are used in areas such as visual content-based video indexing and retrieval, automatic video highlighting, and affective video content representation and modeling.

In one embodiment, training data used to create a content ERP is collected from one or more users. Optionally, a sample used as training data is derived from a segment of content to which a user is exposed; the sample's corresponding label may be generated from measurements of the user's affective response to the segment of content, e.g., by providing the measurements to a measurement ERP. Optionally, at least a portion of the training data is collected from the user 114. Additionally or alternatively, at least a portion of the training data is collected from a set of users that does not include the user 114.

In one embodiment, to make its predictions, the content ERP utilizes feature values that describe aspects beyond the scope of the data conveyed in the content. These additional aspects can have an impact on a user's emotional response to the content, so utilizing feature values describing these values can make predictions more accurate.

In particular, in many cases, a prediction of a user's emotional response to content may depend on the context and situation in which the content is consumed. For example, for content such as an action movie, a user's emotional response might be different when viewing a movie with friends compared to when viewing alone (e.g., the user might be more animated and expressive with his emotional response when viewing with company). However, the same user's response might change dramatically to uneasiness and/or even anger if younger children are suddenly exposed to the same type of content in the user's company. Thus, context and situation, such as who is consuming content with the user can have a dramatic effect on a user's emotional response.

Similarly, a user's emotional state, such as a user's mood, can also influence a user's emotional response to content. For example, while under normal circumstances, a slapstick oriented bit of comedy might be dismissed by a user as juvenile, a user feeling depressed might actually enjoy it substantially more (as a form of a comedic "pick-me-up"), and even laugh heartily at the displayed comedic antics.

Therefore, in order to capture information regarding context and/or situation in which a user consumes the content, in some embodiments, samples that may be provided to an ERP include feature values describing the context in which the content is consumed and/or the user's situation. For example, these feature values may describe aspects related to the user's location, device on which the content is consumed, people in the user's vicinity, tasks or activities the user performed or needs to perform (e.g., work remaining to do), and/or the user's or other peoples emotional state as determined, for example, from analyzing communications of a log of the activities of the user and/or other people related to the user. In another example, the feature values describing context and/or situation may include physiological measurements and/or baseline values (e.g., current and/or typical heart rate) of the user and/or other people.

As well as consuming content, a user interacting with a digital device may also generate content that can undergo analysis. For example, messages created by a user (e.g., a spoken sentence and/or a text message), are user-generate content that may be analyzed to determine the user's emotional state (e.g., using voice stress analysis, and/or semantic analysis of a text message). In another example, information regarding the way a user plays a game, such as the number of times the user shoots in a shooter game and/or the type of maneuvers a user performs in a game that involves driving a vehicle, are also user-generated content that can be analyzed. Therefore, in one embodiment, one or more features derived from a segment of user-generated content are included in a sample for the content ERP, in order to provide further information on context in which the content is consumed and/or on the user's situation.

One source of data that has been found useful for predicting a user's emotional response to content has been the emotional responses of other users to content (an approach sometimes referred to as "collaborative filtering"). In one embodiment, a content ERP utilizes data regarding other users' emotional responses to content. For example, by comparing a user's emotional response to certain segments of content, with the emotional responses other users had to at least some of those segments, it is possible to find other users that respond similarly to the user in question. These users may be said to have a similar response profiles to the user. Thus, in order to predict the user's response to a previously unobserved segment of content, a content ERP may rely on the responses that other users, with a similar response profiles to the user, had to the unobserved segment.

Content ERA

In some embodiments, the content ERA (Emotional Response Analyzer) is used to analyze a segment of content. Optionally, the content ERA includes and/or utilizes a module that evaluates the segment of content to determine to what extent a user's affective response to the segment of content should be measured and/or to what extent measurements of the user's affective response to the segment of content should be processed. Additionally, the content ERA may generate an indication which is forwarded to the controller, and the controller may select a mode of operation for a device with respect to the indication.

In one embodiment, the content ERA includes a content ERP and/or utilizes a content ERP. In one example, the content ERA uses the content ERP to predict an emotional response to the content, such as whether the user will be interested in the content and/or to what degree the content is likely to make the user feel one or more feelings such as happiness, content, anxiousness, fear. In yet another example, the content ERA uses a predictor to predict a user's affective response to content, such as to what extent the user's heart-rate is expected to rise due to being exposed to the content, and/or whether the user expected to smile due to being exposed to the content.

In one embodiment, the content ERA evaluates whether determining a user's emotional response to the segment of content will be useful and/or beneficial. In this embodiment, determining the user's emotional response to the segment of content may involve measuring the user's affective response with a device and/or processing affective response measurements of the user. Based on its analysis, the content ERA may generate an indication that indicates to the controller whether it is worthwhile to select a mode of operation in which the user is substantially measured.

In one embodiment, the content ERA utilizes data related to the content and/or describing the content in its analysis of the segment of content. The content ERA may receive the data in addition to, or instead of, the segment of content. For example, the content ERA may receive information regarding the popularity of the content with certain demographics, information regarding the emotional response to the content by certain people or subsets of people, and/or information regarding the price and/or circumstances under which the content may be consumed. Optionally, at least some of the data received by the content ERA is provided to a measurement ERP in order to add context that may help the measurement ERP make more accurate predictions.

In some embodiments, the content ERA checks whether a value related to a prediction of emotional response to the segment of content is expected to reach a predetermined threshold. The content ERA may output an indication that is forwarded to the controller which is indicative of the whether or not the value, related to the prediction of the emotional response, reaches the predetermined threshold. Additionally, the indication may include information regarding the difference between the value and the predetermined threshold. Alternatively, the content ERA may elect not to send an indication to the controller if the value related to the emotional response to the segment of content does not reach the predetermined threshold.

In one embodiment, the predetermined threshold utilized by the content ERA includes a value representing a predicted emotional response of a user to the segment of content. Optionally, the emotional response may be expressed in terms of values of affective response. Given a prediction from a content ERP utilized by the content ERA, the content ERA compares the prediction to the predetermined threshold, and determines whether the predetermined threshold is reached. Optionally, the prediction of emotional response to the segment of content, which is compared to the predetermined threshold, is a prediction of the emotional response of the user 114 to the segment of content. Alternatively or additionally, the prediction of emotional response to the segment of content that is compared may be a prediction of emotional response of a representative user.

The predetermined threshold may represent an absolute level of emotional response that is expected to be expressed by the user due to being exposed to the segment of content and/or an expected level of change to the user's emotional response due to the exposure to the segment.

In one example, the content ERP is used to predict an increase in the user's heart rate in order to determine if the user is excited. In this case, a predetermined threshold of an (expected) increase of 10 beats per minute may be used to determine if exposure to content causes the user to be excited. Thus, if the content ERP predicts a change to the user's affective response that includes an expected increase of 20 beats per minute to the user's heart rate, this means that the prediction has reached the predetermined threshold. The indication that the content ERA outputs in this example may indicate to the controller to select a mode of operation that is appropriate for measuring the user with a device when the user is expected to have a noticeable affective response.

In another example, the content ERA may utilize a predictor to determine how long a segment of content is likely to hold a user's interest. The content ERA may utilize a threshold of a minimum duration of interest that depends on the type of content (e.g., 20 seconds for a video, 10 seconds for a short post on a social network). Thus, if a prediction of emotional response to content includes a duration in which the content is expected to hold the user's attention, the duration can be compared to the predetermined threshold in order to determine whether the predetermined threshold is reached. The indication that the content ERA may output in this example may indicate to the controller to select a mode of operation that is appropriate to the duration of predicted interest in the content (e.g., if the duration is below the threshold, there is no need to measure the user).

In one embodiment, the predetermined threshold utilized by the content ERA includes a value representing a threshold of minimal benefit that might be gained from determining a user's emotional response to the segment of content. Given the segment of content, for which a user's emotional response may be predicted and/or measured, the content ERA estimates how beneficial it would be to obtain substantiated information regarding the user's emotional response to the content. Optionally, the value representing the benefit that might be obtained from determining the emotional response to the segment of content refers to the benefit of determining the emotional response of the user 114 to the segment of content. Alternatively or additionally, the value representing the benefit may refer to the benefit of determining the emotional response of a representative user. The content ERA can then compare the estimated benefit to the predetermined threshold in order to determine whether the threshold is reached, and output an indication that is indicative of whether the benefit reaches the threshold. This indication may be forwarded to the controller that may use it in order to select an appropriate mode of operation for a device.

In one example, the content ERA utilizes a procedure that determines the type of content the user is to be exposed to, such as a procedure that determines the genre of video segments. The content ERA also has access to information regarding previous affective response measurements of the user, obtained for the purpose of training an emotional response model, while the user viewed various genres of content. In this example, the system needs to collect additional training data comprising the user's affective responses, in order to train a more personalized model for the user. The content ERA may determine that in some cases, the benefit of collecting additional measurements is likely to be low; such as when measuring the user's response to a segment of content belonging to genre for which there is already ample training data. In other cases, the content ERA might determine that the benefit to be obtained from additional measurements of the user, is likely to be high; such as when the user is viewing a segment of content from a genre for which there are few samples of the user's response. Thus, the content ERA can utilize a benefit threshold derived from the amount of previous data collected of a user's affective response to content of different genres, in order to determine whether a given segment of content that belongs to a certain genre, reaches the threshold. The content ERA can output an indication that is indicative of whether or not the benefit from measuring the user's affective response to the segment of content reaches the threshold. The controller may utilize the indication in order to select an appropriate mode of operation for a device, with respect to the benefit indicated in by the indication.

In another example, a user is monitored while consuming content in order to improve the user's experience (e.g., by modifying elements in the content such as rendering a personalized video). In such a case, the content ERA may be used to determine details regarding the content, such as the type of content, and whether the user experience can be enhanced with the type of content being consumed by the user. If the content ERA determines that the content cannot be enhanced (e.g., it does not contain elements for which there are suitable personalization services), the content ERA may determine that the content it analyzed does not warrant measuring of the user's affective response since there is nothing beneficial to do with the affective response measurement data. The indication generated by the content ERA in this case may indicate to the controller to select a mode of operation in which the user is substantially not measured.

Semantic Analysis

Semantic analysis is often used to determine the meaning of content from its syntactic structure. In some embodiments, semantic analysis may be used by the content ERA in its analysis of a segment of content. Optionally, semantic analysis of the segment of content may be used to create feature values that represent the meaning of a portion of the segment of content; such as features describing the meaning of one or more words, one or more sentences, and/or the full segment of content.

Providing insight into the meaning of the segment of content may help to predict the user's emotional response to the segment of content more accurately. For example, a segment of content that is identified as being about a subject that the user likes, is likely to cause the user to be interested and/or evoke a positive emotional response. In another example, being able to determine that the user received a message that expressed anger (e.g., admonition of the user), can help to reach the conclusion that the user is likely to have a negative emotional response to the content. Optionally, the semantic analysis is utilized in the prediction of emotional response of the user 114 to the segment of content. Alternatively or additionally, the semantic analysis is utilized in the prediction of emotional response of a representative user to the segment of content.

In one embodiment, the content ERA utilizes semantic analysis in order to create an indication that is forwarded to the controller. The indication may indicate to the controller to select an appropriate mode of operation for a device when measuring the user's affective response to the segment of content. For example, semantic analysis may determine that a segment of content includes statements of affection that the user is likely to appreciate, so the content ERA produces an indication that indicates to the controller to select a mode of operation in which the user's affective response to the content is measured by a device (as opposed to a mode of operation in which the device remains in a standby mode). In another example, semantic analysis may determine that the segment of content involves a subject that does not interest the user, so the content ERA produces an indication that indicates to the controller to select a mode of operation in which the user is not substantially measured (since there is not likely to be an interesting emotional response to the content).

Semantic analysis of content can utilize various procedures that provide an indication of the meaning of the content.

In one embodiment, Latent Semantic Indexing (LSI) and/or Latent Semantic Analysis (LSA) are used to determine the meaning of content comprising text (e.g., a paragraph, a sentence, a search query). LSI and LSA involve statistically analyzing the frequency of words and/or phrases in the text in order to associate the text with certain likely concepts and/or categories. The information regarding the concept and/or category of the segment of content can be utilized by the content ERA to generate an indication that is indicative of the extent at which the user's affective response should be measured. For example, the concepts or categories describing the text, which were determined using LSI may be encoded as feature values that are provided to an emotional response predictor. The content ERA can then use a prediction of the emotional response to produce an indication that indicates the controller to select an appropriate mode of operation for the device while it is used to measure the user's affective response to the segment of content.

In one example, the content ERA uses LSI in order to assign segments of a text with a label describing the subject of the text. The LSI involves a model that is trained on samples comprising a plurality of texts with their corresponding subjects. By comparing the frequencies of words and phrases in a new text with the frequencies of words and phrases in texts corresponding to different subjects, it is possible to determine a likely subject for the new text. Thus, using the LSI model the content ERA can detect if a segment of content is likely or not to involve a subject that interests the user, and generate an indication that indicates the controller to select an appropriate mode of operation for the device based on its determination of the user's interest in the subject of the segment (e.g., if the subject interests the user, the user should be measured extensively, and if it doesn't, the user should be measured rudimentarily).

In one embodiment, semantic analysis of a segment of content utilizes a lexicon that associates words and/or phrases with their core emotions. For example, the analysis may utilize a lexicon similar to the one described in "The Deep Lexical Semantics of Emotions" by Hobbs, J. R. and Gordon, A. S., appearing in Affective Computing and Sentiment Analysis Text, Speech and Language Technology, 2011, Volume 45, 27-34, which describe the manual creation of a lexicon that classifies words into 32 categories related to emotions. The information regarding the core emotions of words can be utilized by the content ERA in order to determine the user's likely emotional response to a segment of content. For example, the core emotion associated with words belonging to the segment of content can be provided as feature values to a predictor of emotional response to content. The content ERA can then utilize the prediction to create an indication that is indicative of the extent at which affective response of the user should be measured by a device.

In one embodiment, semantic analysis of content involves using an algorithm for determining emotion expressed in text. The information on the emotion expressed in the text may be used in order to provide analysis algorithms with additional semantic context regarding the emotional narrative conveyed by text. For example, algorithms such as the ones described in "Emotions from text: machine learning for text-based emotion prediction" by Alm, C. O. et al, in the Proceedings of Human Language Technology Conference and Conference on Empirical Methods in Natural Language (2005), pages 579-586, can be used to classify text into the basic emotions such as anger, disgust, fear, happiness, sadness, and/or surprise. The information on the emotion expressed in the text can be provided as feature values to a predictor of emotional response that is utilized by the content ERA in order to produce an indication that is indicative of the extent at which the user should be measured. The controller receives the indication and can then select an appropriate mode of operation for the device with respect to the indication.

In one example, the content ERA uses a predictor of emotional response to predict the user's emotional response to a received message that includes text, or a message that can be converted to text. The predictor receives feature values that include both the expressed emotions in the text (as determined by semantic analysis), and optionally, contextual features corresponding to the message, such as the identity of the sender of the message, the time the message was sent, and/or the location of the user upon receiving the message. The content ERA produces an indication according to the prediction of emotional response that is indicative of the extent at which the user's affective response should be measured. Optionally, the prediction of emotional response utilized by the content ERA is a prediction of the emotional response of the user 114 to the content. Alternatively or additionally, the prediction of emotional response may be a prediction of emotional response of a representative user.

In one embodiment, a segment of content to which the user is exposed includes information that can be converted to text. For example, vocal content such as a dialogue is converted to text using speech recognition algorithms, which translate spoken text into words. Optionally, the text of the converted content is subjected to semantic analysis methods.

Controller

In some embodiments, a controller, such as the controller 108, selects a mode of operation for a device used to measure affective response based on an indication provided by a content ERA. Optionally, the controller selects a mode of operation from amongst a plurality of modes of operation, where at least some of the modes of operation differ with respect to the power the device is configured to consume when operating in those particular modes of operation.

In one example, the content ERA provides an indication that is indicative of whether a predetermined threshold was reached by a value obtained from analyzing a segment of content. Depending on whether the threshold was reached, and/or the difference between the value and the threshold, the controller may select a mode of operation from a set comprising a plurality of different modes of operation, with possibly different power consumption rates.

In another example, the content ERA provides an indication that includes a value that is indicative of a level of importance that may be attributed to the need to measure the user's affective response to the content. For instance, the indication may include a predicted interest level of a user in content, and the controller selects a mode of operation, such as a resolution of images captured by a camera, according to the interest level. In this example, when the user is expected to be interested in content, it is important to take detailed measurement of the user's affective response; so for instance, the mode of operation of a camera used to capture images of the user could be set to a higher resolution when a user is expected to be interested.

In some embodiments, selecting a certain mode of operation for a device, such as the device 112, may cause the device to consume less power, compared to the power it consumes in one or more other modes of operation. There are different possibilities in which a certain mode of operation can cause the device to operate in a way that reduces its power consumption:

In one embodiment, the device can consume significantly less power by being in a mode in which it is substantially turned off (or one or more of its components are essentially turned off), and thus substantially does not consume power at all. Alternatively, the device may be put in a standby mode of operation. Optionally, when operating in the standby mode, the device does not consume the same power the way it consumes in a regular mode of operation, but rather it consumes significantly less, but sufficient to enable the device to return to normal operation when needed (e.g., upon receiving a signal to do so).

In another embodiment, the device may consume significantly less power by operating in a mode of operation in which measurement data produced by the device is of a lower quality, or in a mode of operation in which less measurement data is collected by the device, per unit of measurement time.

In one example, a device that is an image capturing device can consume significantly less power by capturing images at a lower resolution. Similarly, if the image capturing device is utilized to capture video, a significantly lower power consumption can be achieved by reducing the frame rate at which the video is captured.

In another example, a device such as a physiological sensor (e.g., an EEG sensor or a GSR sensor), can be configured to draw less power (e.g., by operating at a lower voltage). This can cause the measurements taken by the sensor to be noisier, e.g., they may contain more random fluctuations and artifacts.

Some devices contain components that perform processing of the data prior to it being sent to other elements. In order to conserve power, in some embodiments, the device may perform less processing operations on data it measures. For example, an image capturing device may have hardware components that are able to compress images and/or video prior to saving the file in a compressed format (such as jpeg, gif, avi). In order to conserve power, in a certain mode of operation, the image may be compressed using a simple lossy compression algorithm which significantly reduces the image quality (but requires relatively few computations to run).

In some embodiments, a device may include a component enabling it to transmit the data it collects, e.g., via wireless communication. In order to conserve power, in a certain mode of operation, the device may be configured not to transmit some or all of the data it collects in a certain time period. Power may also be conserved in a certain mode of operation by configuring the device to transmit data utilizing a weaker signal (which consumes a lower wattage but provides less protection against noise).

In one embodiment, when a controller, such as the controller 108, selects a mode of operation, it takes into consideration additional information that might not be conveyed in an indication received from a content ERA and/or a semantic analyzer. For example, the controller of a device that is battery operated sensor might take into consideration the current charge in the battery used by the sensor, when choosing a mode of operation to operate in.

In one embodiment, a controller, such as the controller 154 or the controller 204, is used to select a processing level for a processor that processes measurements of affective response. Being able to select different processing levels enables the system to reduce the computational load involved in processing measurements of affective response that are collected over time. The reduction in the computation load is achieved by causing the processor to operate in a mode that utilizes fewer computation cycles, per volume unit of measurement data, at least with measurement data collected during some of the periods during which a user is measured.

In some embodiments, a processing level for a processor is selected from a plurality of processing levels, where at least some of the processing levels differ with respect to the number of computation cycles they utilize per volume unit of measurement data available for processing (e.g., per kilobyte of data).

In one example, an indication that indicates whether a predetermined threshold was reached by a value related to a prediction of emotional response to a segment of content. Depending on whether the threshold was reached, and/or the difference between the value and the threshold, a specific processing level may be selected from amongst multiple different processing levels, possibly having different processing procedures invoked to process the data and/or with different operating parameters for the procedures invoked to process the data.

In another example, an indication, according to which a processing level is selected, may include a value that is indicative of a level of importance that may be attributed to the need to measure and/or process the user's affective response to a segment of content. For instance, the indication may include a predicted interest level of a user in content. Based on the value, a certain processing level may be selected, which determines what type of feature extraction is to be performed on affective response measurements that include images of a user's face acquired with a camera (the images record the user's reaction when viewing the segment of content). In this example, when the user is expected to be interested in the content, images may be processed more extensively and in order to detect facial expressions and micro-expressions.

Processing levels may differ in the computational load they impose on the processor for processing data, i.e., different processing levels may utilize, on average, different amounts of computation cycles to process a volume unit of measurement data that is available for processing. There may be different possibilities in which a processing level can cause a processor, such as the processor 156 or the processor 206, to operate in a way that reduces the computational load:

In one embodiment, the processor can reduce its computational load by not processing the available data (e.g., the processor is idle). Additionally, a certain processing level may indicate to a processor not to process affective response measurement data. For example, the processor might not access the data, or not retrieve it from memory storage.

In another embodiment, the processor may reduce its computational load by processing only a portion of the data at its disposal. For example, a certain processing level may indicate to the processor to sample and process 10% of the available measurement data (e.g., process every tenth second), even though the other 90% is available for it to process. In this case, the processor may utilize significantly fewer computational cycles to process the data that was provided to it, compared to a processing level in which it processes all the data provided to it.

Processing affective response measurement data may involve running various procedures on the data, such as performing various analyses. In one embodiment, the processor may be configured to be able to run a set of procedures that includes a plurality of data processing procedures, and the processing level chosen by the controller indicates to the processor which of the procedures to run on the data. For example, the processor may be configured to process affective response measurement data that includes physiological measurements. One of the procedures the processor may run on the data performs simple averaging of values (e.g., in order to report a baseline value), while another procedure my involve normalizing, filtering, and performing signal analysis on the data in order to submit the data to further analysis such as emotional response prediction. Thus, a first processing level that indicates to the processor to perform the former procedure is likely to cause the processor to utilize, per volume unit of data processed, a small number of computation cycles. In contrast, a second processing level that indicates to the processor to perform the latter procedure is likely to cause the processor to utilize, per volume unit of measurement data, a much larger number of computation cycles.

In one embodiment, processing levels can indicate to a processor what models and/or what features of data are to be utilized by the processor to process affective response measurements. For example, a first processing level may be used for basic processing of the data, and utilize models that involve a small subset of the data's features (e.g., a small set of important features). A second processing level may be utilized for comprehensive processing and involve the full set of features that is available. Optionally, the processor receives measurements of affective response that include data that comes from multiple types of sources; for instance, data collected from a plurality of sensors. In such cases, the processing level may indicate which of the sources to use. For example, in one case, measurements of a user include EEG, GSR and heart rate values; a first processing level may indicate to process essentially only the heart rate data, while a second processing level indicates to the processor to process all three sources. Thus, per volume unit of measurement data, a processor operating at the first processing level utilizes significantly less computation cycles compared to the processor operating at the second processing level, since in the latter case, the processor performs many more operations on the data.

In one embodiment, the processing level may indicate to the processor whether to perform certain manipulations on data of affective response measurements. For example, a first processing level may indicate to the processor that the data should not be encrypted and/or compressed, while a second processing level may indicate to the processor that the data should be encrypted and/or compressed. Thus, a processor processing the data while operating at the first processing level is likely to utilize significantly less computation cycles, compared to when it operates at the second processing level.

In some embodiments, a controller, such as the controller 175 or the controller 195 selects a measuring rate for a device used to measure affective response based on an indication provided by a semantic analyzer and/or a content ERA. Optionally, the controller selects the measuring rate from amongst a plurality of measuring rates, where at least some of the measuring rates differ with respect to the amount of measurements the device is configured to take.

In one example, the semantic analyzer provides an indication that is indicative of whether a predetermined threshold was reached by a value related to a prediction of emotional response to a segment of content. Depending on whether the threshold was reached, and/or the difference between the value and the threshold, different measuring rates may be selected possibly having power consumption rates, sampling frequencies, and/or dimensionality of measurement results.

In another example, the semantic analyzer provides an indication that includes a value that is indicative of a level of importance that may be attributed to the need to measure the user's affective response to the content. For instance, the indication may include a predicted interest level of a user in content, and the controller selects a measuring rate, such as a resolution of images captured by a camera, according to the interest level. In this example, when the user is expected to be interested in content, it is important to take detailed measurement of the user's affective response; so for instance, the measuring rate of a camera used to capture images of the user could be set to a higher resolution when a user is expected to be interested.

In one embodiment, when the controller selects a measuring rate, it takes into consideration additional information that might not be conveyed in an indication received from the semantic analyzer and/or content ERA. For example, the controller of a device that is a battery operated sensor might take into consideration the current charge in the battery used by the sensor, when choosing a measuring rate to operate the device at.

In some embodiments, the controller selects a measuring rate for a device, which causes the device to take fewer measurements, compared to the measurements it takes when operating at one or more other measuring rates. For example, when configured to operate at a selected measurement rate, per unit of measurement time, the device takes a significantly lower number of measurements, produces a significantly lower amount of measurement data, processes a significantly lower amount of data, transmits a significantly lower amount of data, and/or consumes a significantly less power. Optionally, by "significantly lower" it is meant at least 50% less. There are different possibilities in which a measuring rate selected by the controller can cause the device to operate in a way that reduces the measurements the device takes.

In one embodiment, a device may take fewer measurements by being configured to operate at a measuring rate of substantially zero (and thus essentially the device does not measure the user). For example, the device, or certain components belonging to the device, may be substantially turned off or operating in a standby mode.

In one embodiment, a device takes fewer measurements by being configured to generate less data per unit of measurement time. For example, parameters such as resolution or frame rate (e.g., for a camera), or the number of channels to measure (e.g., for EEG), can be set, such that per unit of measurement, the device generates less data.

In another embodiment, a device may take fewer measurements by operating at a measuring rate in which measurement data produced by the device is of a lower quality; thus, it may generate both fewer measurements, since noise may be filtered out, and/or fewer useful measurements. For example, a device such as a physiological sensor (e.g., an EEG sensor or a GSR sensor), can be configured to draw less power. This can cause the measurements made by the device to be noisier, e.g., they may contain more random fluctuations and artifacts so the data might contain less useful measurement information.

In yet another embodiment, a device may be considered to take fewer measurements by processing and/or transmitting less data. For example, while a sensor belonging to the device may measure the user at a normal rate, the device may be configured to process less data and/or transmit less data, thus effectively reducing the measuring rate of the device, as far as other components in the system may be concerned.

While the above embodiments described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, including hand-held devices, multiprocessor systems, microprocessor-based or programmable consumer electronics, minicomputers, mainframe computers, and comparable computing devices. The embodiments may also be practiced in a distributed computing environment where tasks are performed by remote processing devices that are linked through a communications network. In a distributed computing environment, program components may be located in both local and remote memory storage devices.

Embodiments may be implemented as a computer-implemented process, a computing system, or as an article of manufacture, such as a computer program product or computer readable media. The computer program product may be a computer storage medium readable by a computer system and encoding a computer program that comprises instructions for causing a computer or computing system to perform example processes. The computer-readable storage medium can for example be implemented via one or more of a volatile computer memory, a non-volatile memory, a hard drive, a flash drive, a disk, a compact disk, and/or comparable media.

Throughout this specification, references are made to services. A service as used herein describes any networked/online applications that may receive a user's personal information as part of its regular operations and process/store/forward that information. Such applications may be executed on a single computing device, on multiple computing devices in a distributed manner, and so on. Embodiments may also be implemented in a hosted service executed over a plurality of servers or comparable systems. The term "server" generally refers to a computing device executing one or more software programs typically in a networked environment. However, a server may also be implemented as a virtual server (software programs) executed on one or more computing devices viewed as a server on the network. Moreover, embodiments are not limited to personal data. Systems for handling preferences and policies may be implemented in systems for right management and/or usage control using the principles described above.

Herein, a predetermined value, such as a predetermined confidence level or a predetermined threshold, is a fixed value and/or a value determined any time before performing a calculation that compares its result with the predetermined value. A value is also considered to be a predetermined value when the logic used to determine a threshold is known before start calculating the threshold.

In this description, references to "one embodiment" mean that the feature being referred to may be included in at least one embodiment of the invention. Moreover, separate references to "one embodiment" or "some embodiments" in this description do not necessarily refer to the same embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements.

While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in one embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, it is intended to embrace all such alternatives, modifications, and variations that fall within the spirit and scope of the appended claims and their equivalents.

What is claimed is:

1. A system configured to reduce power consumption of a sensor according to analysis of content, comprising:
 a content emotional response analyzer (content ERA) configured to: receive a first segment of content, analyze the first segment, and output a first indication indicating that a first value related to an emotional response to the first segment does not reach a first predetermined threshold; and
 a hardware-based controller configured to select, based on the first indication, a first mode of operation for a sensor for measuring affective response of a user to the first segment;

wherein the content ERA is further configured to: receive a second segment of content, analyze the second segment, and output a second indication indicating that a second value related to an emotional response to the second segment reaches a second predetermined threshold; and the hardware-based controller is further configured to select, based on the second indication, a second mode of operation for the sensor for measuring affective response of the user to the second segment;

wherein the sensor is configured to consume at least 50% less power while operating at the first mode of operation compared to the power it is configured to consume while operating at the second mode of operation.

2. The system of claim 1, wherein the first and second indications indicate confidence in predictions of emotional response to the first and second segments, respectively; whereby based on the first indication, it is determined that confidence in the prediction of the emotional response to the first segment does not reach the first predetermined threshold, and based on the second indication, it is determined that confidence in the prediction of the emotional response to the second segment does reach the second predetermined threshold.

3. The system of claim 1, wherein the first and second indications indicate expected magnitudes of change in affective response due to exposure to the first and second segments, respectively; whereby based on the first indication, it is determined that expected magnitude of change in affective response due to exposure to the first segment does not reach the first predetermined threshold, and based on the second indication, it is determined that expected magnitude of change to affective response due to exposure to the second segment does reach the second predetermined threshold.

4. The system of claim 1, wherein the first and second indications indicate how beneficial it is to measure the affective response to the first and second segments, respectively; whereby based on the first indication, it is determined that benefit from measuring the affective response to the first segment does not reach the first predetermine threshold, and based on the second indication it is determined that benefit from measuring affective response to the second segment does reach the second predetermined threshold.

5. The system of claim 1, wherein the first and second segments comprise visual content, and being exposed to the first and second segments is achieved by viewing the first and second segments.

6. The system of claim 1, wherein the first and second segments comprise data representing text, and the content ERA utilizes semantic analysis of the text to produce the first and second indications.

7. The system of claim 1, wherein the sensor is battery powered and is one or more of the following: a physiological sensor, and an image capturing device.

8. The system of claim 1, further comprising a measurement emotional response predictor (measurement ERP) configured to predict emotional response of the user from data comprising the measurements of the sensor.

9. The system of claim 1, wherein the first and second segments are received from a computer game that further provides information about expected emotional response to the first and second segments.

10. A method for reducing power consumption of a sensor that measures affective response to content, comprising:

receiving a first indication derived from analysis of a first segment of content;

determining that the first indication indicates that a first value related to a prediction of emotional response to the first segment does not reach a first predetermined threshold;

selecting, based on the first indication, a first mode of operation for a sensor to measure affective response to the first segment;

receiving a second indication derived from analysis of a second segment of content;

determining that the second indication indicates that a second value related to a prediction of emotional response to the second segment reaches a second predetermined threshold; and selecting, based on the second indication, a second mode of operation for the sensor to measure affective response to the second segment;

wherein, per unit of measurement time, power consumed by the sensor for measuring the affective response of a user to the first segment, is at least 50% lower than power consumed for measuring the affective response of the user to the second segment.

11. The method of claim 10, wherein the first and second segments comprise text, or data that can be converted to text, and further comprising analyzing the first and second segments utilizing semantic analysis of the text to produce the first and second indications.

12. The method of claim 10, further comprising refraining from taking measurements of affective response of the user when operating the sensor in the first mode of operation.

13. The method of claim 10, further comprising forwarding, to a module that trains an emotional response model, a description of an expected emotional response to the second segment and data obtained from the measuring of the affective response of the user to the second segment.

14. The method of claim 10, further comprising forwarding data obtained from the measuring of the affective response of the user to the second segment to a measurement emotional response predictor (measurement ERP) that predicts emotional response.

15. The method of claim 10, wherein the sensor is battery powered, and further comprising measuring the affective response of the user by utilizing the sensor for at least one of: taking a physiological measurement of the user and capturing an image of the user.

16. The method of claim 10, further comprising receiving the second segment from an interactive computer game that further provides information about an expected emotional response to the second segment.

17. A non-transitory computer-readable medium for use in a computer to reduce power consumption of a sensor that measures affective response to content; the computer comprising a processor, and the non-transitory computer-readable medium comprising:

program code for receiving a first indication derived from analysis of a first segment of content;

program code for determining that the first indication indicates that a first value related to a prediction of emotional response to the first segment does not reach a first predetermined threshold;

program code for selecting, based on the first indication, a first mode of operation for a sensor to measure affective response to the first segment;

program code for receiving a second indication derived from analysis of a second segment of content;

program code for determining that the second indication indicates that a second value related to a prediction of emotional response to the second segment reaches a second predetermined threshold; and program code for selecting, based on the second indication, a second mode of operation for the sensor to measure affective response to the second segment;

wherein, per unit of measurement time, power consumed by the sensor for measuring the affective response of a user to the first segment, is at least 50% lower than power consumed for measuring the affective response of the user to the second segment.

18. The non-transitory computer-readable medium of claim 17, wherein the first and second segments comprise text, or data that can be converted to text, and further comprising program code for analyzing the first and second segments utilizing semantic analysis of the text to produce the first and second indications.

19. The non-transitory computer-readable medium of claim 17, further comprising program code for forwarding, to a module that trains an emotional response model, a description of an expected emotional response to the second segment and data obtained from the measuring of the affective response of the user to the second segment.

20. The non-transitory computer-readable medium of claim 17, wherein the sensor is battery powered, and further comprising program code for measuring the affective response of the user by utilizing the sensor for at least one of: taking a physiological measurement of the user and capturing an image of the user.

* * * * *